(12) United States Patent
Kim et al.

(10) Patent No.: US 8,588,740 B2
(45) Date of Patent: Nov. 19, 2013

(54) MOBILE TERMINAL AND METHOD OF CONTROLLING A MODE SCREEN DISPLAY THEREIN

(75) Inventors: Dongwoo Kim, Goyang-si (KR); Hyehyun Kim, Seoul (KR); Heejung Bae, Anyang-si (KR); Hyunah Cho, Goyang-si (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 13/290,909

(22) Filed: Nov. 7, 2011

(65) Prior Publication Data

US 2012/0157044 A1 Jun. 21, 2012

Related U.S. Application Data

(60) Provisional application No. 61/425,754, filed on Dec. 21, 2010.

(30) Foreign Application Priority Data

Feb. 18, 2011 (KR) .......................... 10-2011-0014724

(51) Int. Cl.
*H04M 1/00* (2006.01)
*H04B 1/38* (2006.01)
*G09G 5/00* (2006.01)

(52) U.S. Cl.
USPC ............. 455/410; 455/556.1; 455/566; 345/4

(58) Field of Classification Search
USPC .............. 345/629, 4, 530; 455/556, 566, 410; 715/778; 713/2, 100
See application file for complete search history.

(56) References Cited

U.S. PATENT DOCUMENTS

| | | | |
|---|---|---|---|
| 2003/0037243 A1 | 2/2003 | Gruteser et al. | |
| 2008/0303842 A1 | 12/2008 | Okamoto et al. | |
| 2008/0318616 A1 | 12/2008 | Chipalkatti et al. | |
| 2009/0111517 A1 | 4/2009 | Chen | |
| 2010/0293543 A1 | 11/2010 | Erhart et al. | |
| 2011/0166841 A1 | 7/2011 | Seto et al. | |

FOREIGN PATENT DOCUMENTS

| | | | |
|---|---|---|---|
| CN | 101128052 A | 2/2008 | |
| CN | 101754464 A | 6/2010 | |
| CN | 101807944 A | 8/2010 | |
| CN | 101888401 A | 11/2010 | |
| GB | 2448012 A | 10/2008 | |
| GB | 2470272 A | 11/2010 | |

OTHER PUBLICATIONS

U.S. Appl. No. 13/287,659, filed Nov. 2, 2011.

*Primary Examiner* — Nizar Sivji
(74) *Attorney, Agent, or Firm* — Birch, Stewart, Kolasch & Birch, LLP

(57) ABSTRACT

A mobile terminal including a memory configured to store at least a first and second operating system including at least first and second modes, respectively; and a controller configured to execute the first operating system and to activate the first mode corresponding to the first operating system, to display a first information screen on a display corresponding to the activated first mode, to receive a switching signal indicating the first mode is to be switched to the second mode, to activate the second mode and deactivate the first mode, and to display a second information screen on the display corresponding to the second mode and that is different than the first information screen. Further, the controller is further configured to selectively transmit information included on the first or second information screen to at least one external terminal based on a prescribed designated level.

18 Claims, 61 Drawing Sheets

| A | B | C | D |
|---|---|---|---|
| E | . . | . . | . . |
| . . | . . | . . | . . |
| . . | . . | . . | Z |

P mode (a)

| Q | W | E | . . | . . | P |
|---|---|---|---|---|---|
| A | S | . . | . . | . . | L |
| Z | X | . . | . . | . . | M |
| 1 | 2 | . . | . . | . . | O |

B mode (b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND METHOD OF CONTROLLING A MODE SCREEN DISPLAY THEREIN

This application claims the benefit of U.S. Provisional Application Ser. No. 61/425,754 filed on Dec. 21, 2010, which is hereby incorporated by reference as if fully set forth herein. This application also claims the benefit of the Korean Patent Application No. 10-2011-0014724 filed on Feb. 18, 2011, which is hereby incorporated by reference as if fully set forth herein.

BACKGROUND OF THE INVENTION

1. Field of the Invention

The present invention relates to a mobile terminal, and more particularly, to a mobile terminal and method of controlling a mode screen display therein. Although the present invention is suitable for a wide scope of applications, it is particularly suitable for the mobile terminal capable of implementing a plurality of modes.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example. Recently, there is an ongoing technology for sharing a currently displayed screen among a plurality of terminals.

SUMMARY OF THE INVENTION

Accordingly, the present invention is directed to a mobile terminal and method of controlling a mode screen display therein that substantially obviate one or more problems due to limitations and disadvantages of the related art.

An object of the present invention is to provide a mobile terminal and method of controlling a mode screen display therein, by which a plurality of modes can be implemented and activated for user's convenience and data security in a manner of being discriminated from each other.

Another object of the present invention is to provide a mobile terminal and method of controlling a mode screen display therein, by which a mode screen can be shared with external terminal(s) having activated a mode identical to a currently activated mode of my terminal.

A further object of the present invention is to provide a mobile terminal and method of controlling a mode screen display therein, by which information on a currently deactivated mode can be limitedly shared in sharing a mode screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal sharing information with at least one external terminal according to the present invention includes at least one operating system capable of implementing a plurality of modes including a first mode and a second mode, at least one application executed in at least one of a plurality of the modes, a controller activating the first mode, the controller controlling a screen of the first mode to be displayed on at least one external terminal to correspond to a prescribed level, a wireless communication unit performing a transmission operation of the screen of the first mode under the control of the controller, and a display unit displaying the screen of the first mode under the control of the controller. And, the prescribed level includes at least one of a level of a content displayed on the screen of the first mode, a level of the at least one external terminal and a level of the mobile terminal.

In another aspect of the present invention, a mobile terminal sharing information with at least one external terminal includes at least one operating system capable of implementing a plurality of modes including a first mode and a second mode, at least one application executed in at least one of a plurality of the modes, a display unit, if the first mode is activated, displaying a screen of the activated first mode, a wireless communication unit receiving a screen of a currently activated mode of the at least one external terminal, and a controller activating the first mode, the controller controlling the display unit to display the received screen to correspond to a prescribed level. And, wherein the prescribed level includes at least one of a level of a content displayed on the received screen, a level of the at least one external terminal and a level of the mobile terminal.

In another aspect of the present invention, a method of controlling a mode screen display in a mobile terminal, which implements a plurality of modes including a first mode and a second mode, includes the steps of if the first mode is activated, displaying a screen of the activated first mode, transmitting the screen of the first mode, and controlling the screen of the first mode to be displayed on at least one external terminal to correspond to a prescribed level. And, the mobile terminal includes at least one operating system capable of implementing a plurality of the modes and at least one application executable in at least one of a plurality of the modes. Moreover, the prescribed level includes at least one of a level of a content displayed on the screen of the first mode, a level of the at least one external terminal and a level of the mobile terminal.

In a further aspect of the present invention, a method of controlling a mode screen display in a mobile terminal, which implements a plurality of modes including a first mode and a second mode, includes the steps of if the first mode is activated, displaying a screen of the activated first mode, receiving a screen of a currently activated mode of at least one external terminal, and displaying the received screen to correspond to the prescribed level. And, the mobile terminal includes at least one operating system capable of implementing a plurality of the modes and at least one application executable in at least one of a plurality of the modes. Moreover, the prescribed level includes at least one of a level of a content displayed on the received screen, a level of the at least one external terminal and a level of the mobile terminal.

Accordingly, the present invention provides the following effects and/or advantages.

First of all, a screen of a currently activated mode can be shared with at least one external terminal.

Secondly, the present invention controls a mode screen to be shared with at least one external terminal to correspond to a prescribed level, whereby a same mode screen can be shared with all external terminals. And, a partial region of the mode screen can be shared with a specific external terminal to correspond to a prescribed level. Moreover, the mode screen itself may not be shared with a specific external terminal to correspond to a prescribed level.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
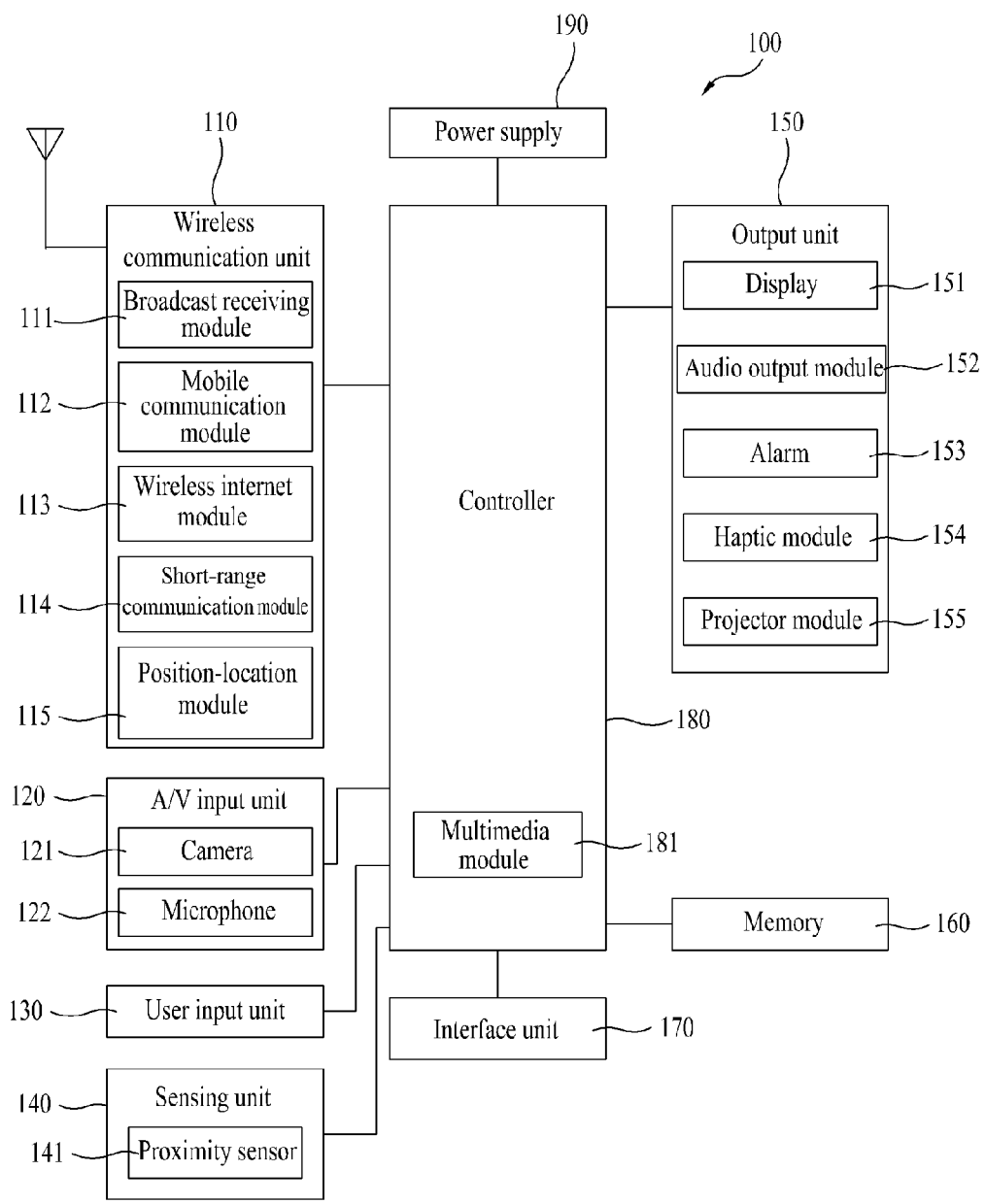
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transitive type, which can be named a transparent display. As a representative example for the transparent display, there is TOLED (transparent OLED) or the like. A rear configuration of the display unit 151 can be implemented in the optical transitive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor 141 using an electromagnetic field strength or infrared ray without mechanical contact. Hence, the proximity sensor 141 has durability longer than that of a contact type sensor and also has utility wider than that of the contact type sensor.

The proximity sensor 141 can include one of a transitive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. And, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
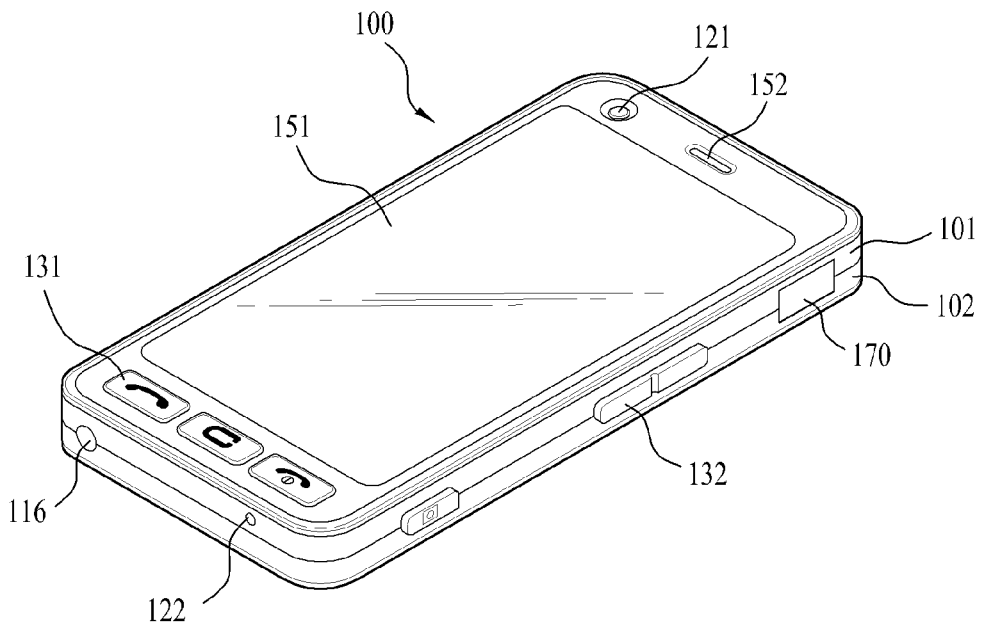
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. And, a command for a volume adjustment of sound outputted from the audio output unit 152, a command for a switching to a touch recognizing mode of the display unit 151 or the like can be input to the second manipulating unit 132.

Figure 2B:
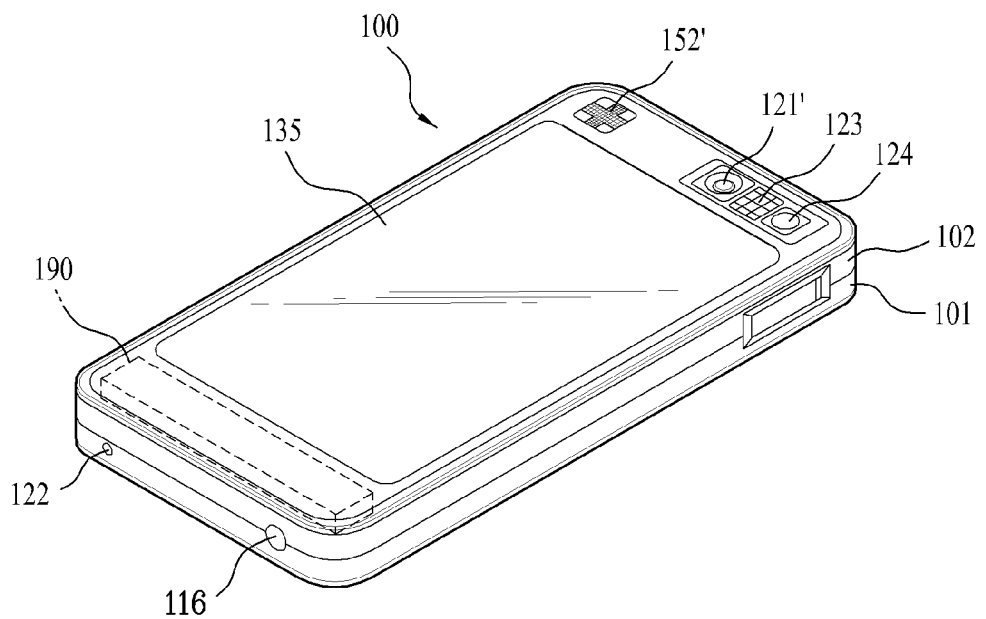
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transitive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. And, in order to perform an operation using the components (e.g., touchscreen, wireless communication unit, memory, etc.), the controller 180 is able to control an individual operation of each of the components or interconnected operations among a plurality of the components.

Applications mentioned in this disclosure are software programs drivable in a mobile terminal. If the application is driven, it is able to execute a corresponding function or operation. The application is basically stored in the mobile terminal (particularly, the memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways.

There can exist contents or data associated with the applications as well. In this case, the associated content or data is stored in the memory 160 or can be stored in an external server having a storage space.

For instance, the contents can include an audio file (associated with the music player), a video file (associated with the video player), a document file (associated with an e-book), and the like. And, the data can include a message content (associated with the message), a memo content (associated with the memo), a counterpart information (associated with the phonebook), a schedule content (associated with the schedule management), and the like.

According to the present invention, a mobile terminal is able to configure a plurality of modes differing from each other in application configuration for data security for one mode against another mode or data security between different modes. And, the mobile terminal according to the present invention is able to implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications can be called dedicated applications of the first mode, the third application can be called the common application of the first and second modes and the fourth and fifth applications can be called the dedicated applications of the second mode.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows.

First of all, according to the present invention, a mobile terminal is able to implement a plurality of modes and is also able to activate one of a plurality of the currently implemented modes. For instance, if a plurality of the modes includes a first mode and a second mode, the mobile terminal boots an operating system capable of implementing both of the first and second modes and can then activate the implemented first or second mode selectively.

In particular, if both of the first and second modes are already implemented, the mode for displaying an executed screen on a current screen, the mode for designating the currently executed application, the mode having a high priority or the like can be called an activated mode. In this case, a non-activated mode (or a deactivated mode) can be regarded as operating as a background despite being implemented in the mobile terminal. In particular, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components required for inter-mode switching for a plurality of the modes are explained in detail with reference to FIGS. 3A to 4C.

Figure 3A:
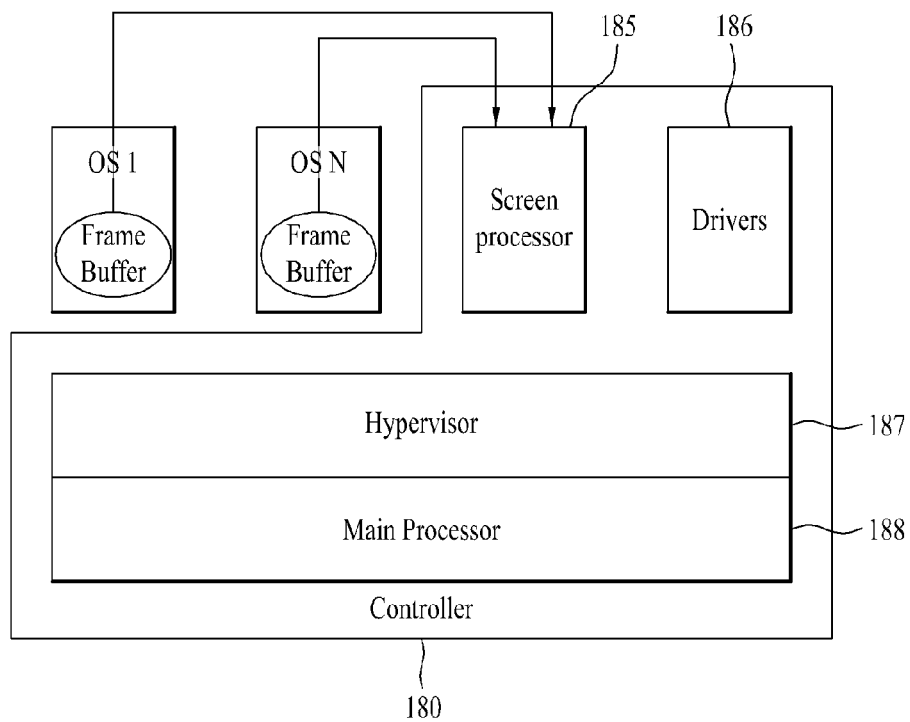
FIGS. 3A to 3C are block diagrams of components required for implementation of a plurality of modes and a mode switching among a plurality of the modes according to the present invention.
Figure 3B:
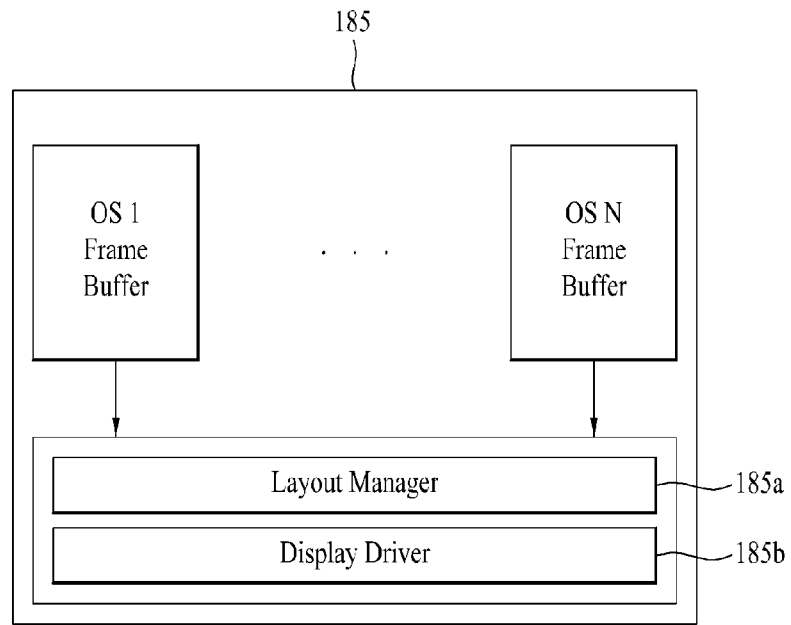
Figure 3C:
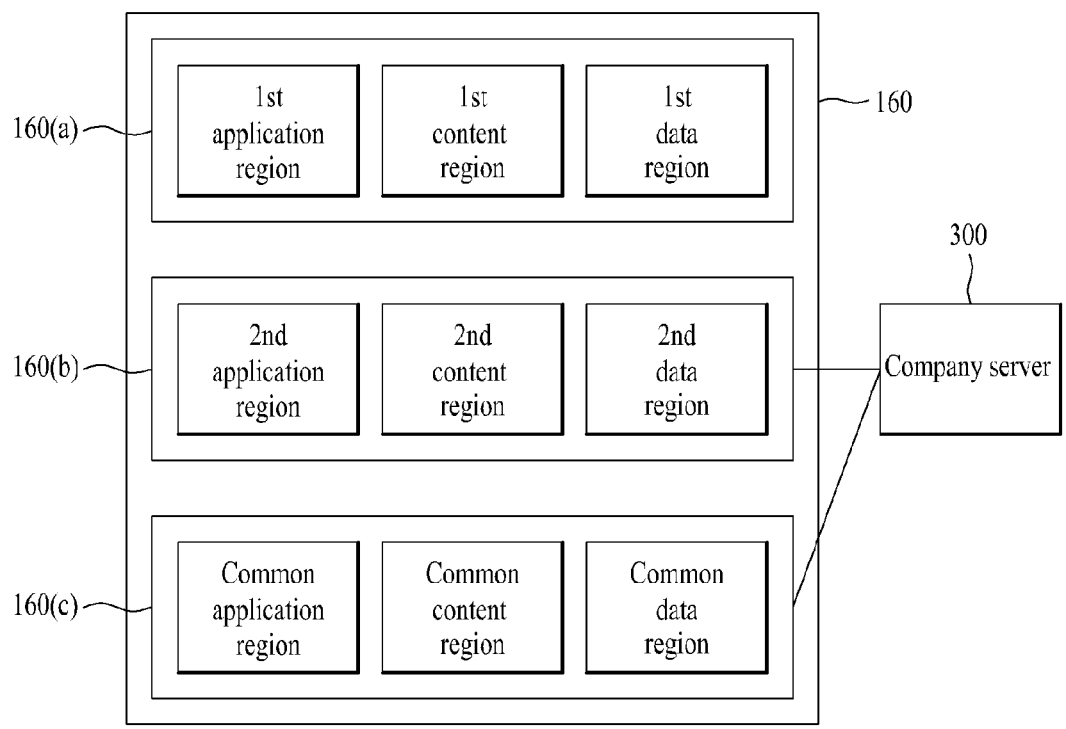

FIGS. 3A to 3C are block diagrams of components required for implementation of a plurality of modes and a mode switching among a plurality of the modes according to the present invention. In particular, FIG. 3A is a block diagram of the controller 180 for driving a plurality of operating systems (OSs) and configuring a dedicated screen of a plurality of operating systems. And, FIG. 3B is a block diagram of a screen processor 185 shown in FIG. 3A. In particular, FIG. 3A and FIG. 3B show a case that a plurality of the operating systems are provided in parallel with each other (cf. FIG. 4A (a), FIG. 4B).

According to the present invention, a plurality of the modes can be implemented by a plurality of the operating systems, respectively. In particular, the operating system for supporting implementation can differ per mode.

Referring to FIG. 3A, the controller 180 can include a screen processor 185, a driver 186, a hypervisor 187 and a main processor 188. In this case, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. And, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., in case of implementing one mode only). Alternatively, the screen processor 185 generates one integrated frame by combining and/or editing the frames received from the frame buffers and is then able to display an integrated dedicated screen including all the dedicated screens of a plurality of the operating systems (e.g., in case of implementing a plurality of the modes).

Referring to FIG. 3A, a plurality of the operating systems OS1, . . . OS N are prepared in parallel with each other, which can be described in detail with reference to FIG. 4A (a) and FIG. 4B as follows.

Figure 4A:
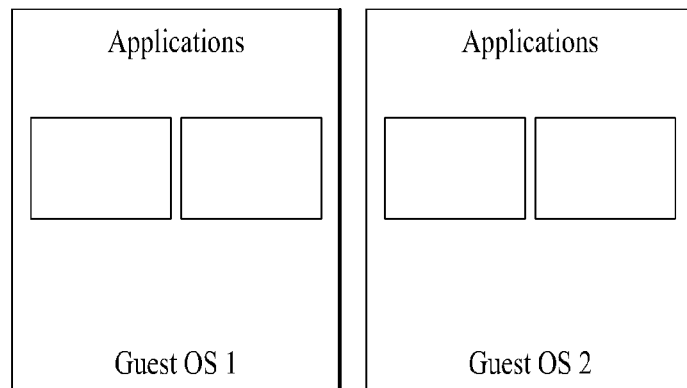
FIGS. 4A to 4C are block diagrams of components required for operating a plurality of operating system for implementing a plurality of modes according to the present invention.
Figure 4A:
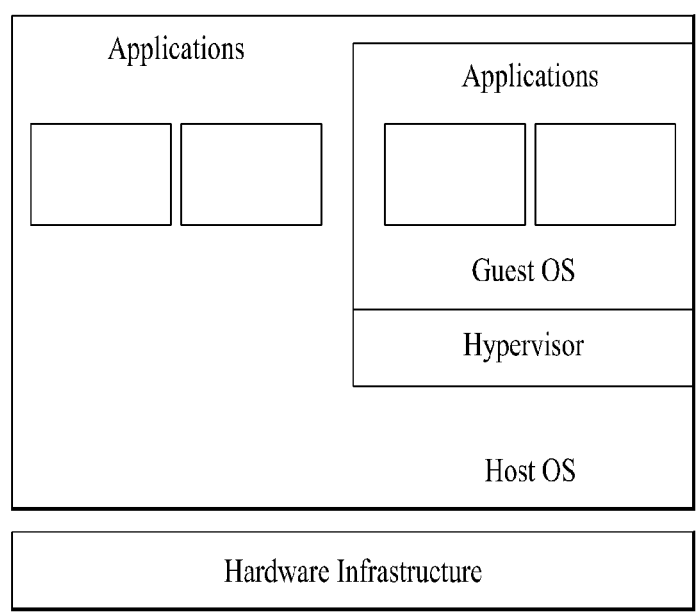
Figure 4B:
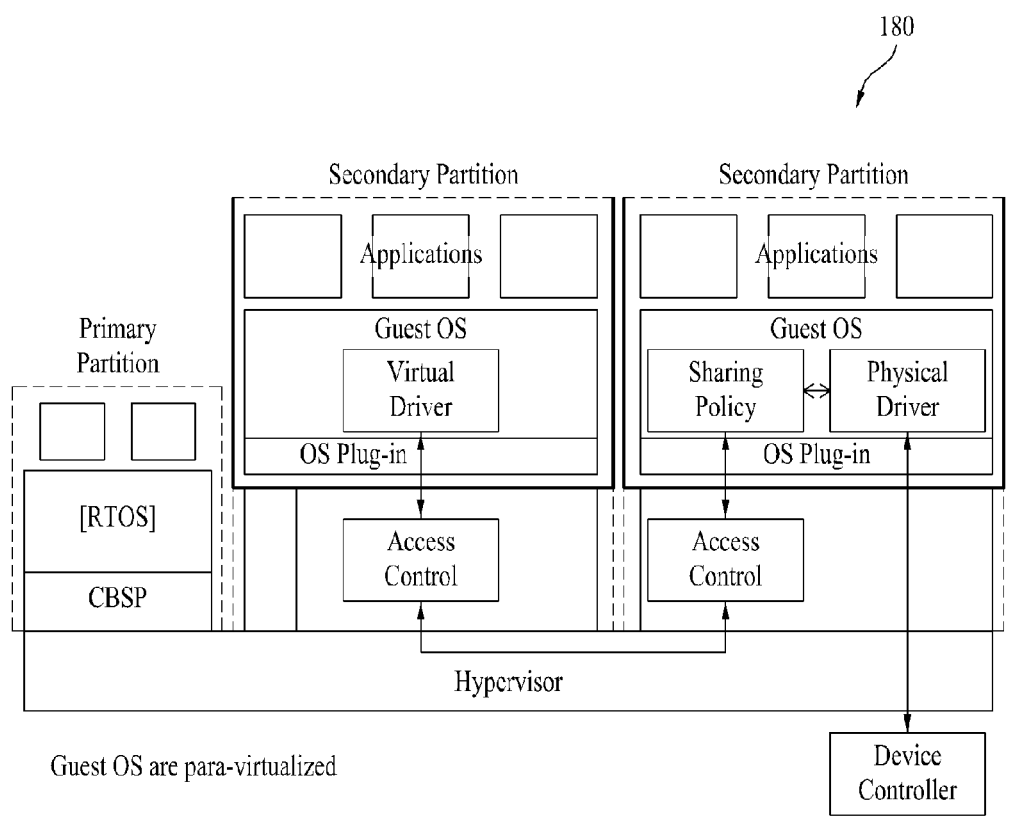

FIG. 4A (a) and FIG. 4B show a scheme of booting a plurality of operating systems Guest OS 1 and Guest OS 2 respectively supporting different modes in parallel by loading a hypervisor (hereinafter named a first scheme).

Referring to FIG. 4A (a) and FIG. 4B, the mobile terminal 100 is able to implement Guest OS 1 and Guest OS 2 selectively, sequentially or simultaneously. And, a different mode can be designated to each of the Guest OS 1 and the Guest OS 2. In this case, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in case (1) of activating a mode corresponding to the currently booted Guest OS 1 or Guest Os 2 or in case (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or is able to activate either the first or second mode despite implementing both of the first and second modes (2-2).

Referring now to FIG. 3, the screen processor 185, includes a layout manager 185a and a display driver 185b (FIG. 3B). Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to the present invention. And, the main processor 188 controls all operations related to the driving of a plurality of the operating systems according to the present invention.

As mentioned in the above description, the screen processor 185, the driver 186, the hypervisor 187 and the main processor 188 can be included in the controller 180 or can be stored as software in the memory 160.

FIG. 3C is a block diagram of the memory 160 having a database storage region corresponding to each of a plurality of the modes.

According to the present invention, the mobile terminal is able to manage the database storage regions of a plurality of the modes discriminatively. In particular, when a plurality of the modes is implemented by the different operating systems, respectively, the mobile terminal is able to manage the database storage regions of a plurality of the modes discriminatively.

Generally, when at least one operating system capable of implementing a first mode and a second mode is provided, the memory 160 is ale to store an application corresponding to each of the at least one operating system. Therefore, the provided at least one or more operating systems can be booted selectively or simultaneously under the control of the controller 180.

For instance, the operating system can include such a commercial OS as the Android OS, Linux based OS, Windows Mobile OS, Apple OS and the like. And, a dedicated application can be differently set for each of the operating systems. Further, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to the present invention, assuming that both of the first and second modes can be implemented, the memory 160 can include a first database storage region 160(a) corresponding to the first mode, a second database storage region 160(b) corresponding to the second mode, and a common database storage region 160(c) in common with the first mode and the second mode. Occasionally, the common database storage region 160(c) can be omitted. In this case, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or is able to discriminate the storage regions from each other using a storage partition per mode.

In this case, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(a) can include a region (i.e., a first application region) for storing at least one first application executable in the first mode, a region (i.e., a first content region) for storing a content associated with the first application and a region (i.e., a first data region) for storing data associated with the first application.

And, the second database storage region 160(b) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(c) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(b) and information corresponding to the second mode in the common database storage region 160(c) can be utilized only if the corresponding information is stored in a manner of being shared with a company server 300, the corresponding information is stored in the company server 300 (i.e., the second database storage region 160(b) is unnecessary) or the company server 300 is accessed. In this case, the company server 300 can include a server of a company, for which a user works, a server of a specific company designated by a user (or a company where the user works), or the like.

While the first mode is activated, the mobile terminal 100 is able to utilize the information stored in the first database storage region 160(a) and the information corresponding to the first mode in the common database storage region 160(c). While the second mode is activated, the mobile terminal 100 is able to utilize all the information stored in the first, second and common database storage regions 160(a), 160(b) and 160(c).

Alternatively, while the second mode is activated, the mobile terminal 100 is able to utilize the information stored in the first database storage region 160(a) and the information corresponding to the second mode in the common database storage region 160(c). While the first mode is activated, the mobile terminal 100 is able to utilize all the information stored in the first, second and common database storage regions 160(a), 160(b) and 160(c).

Optionally, it is able to control the mobile terminal 100 not to utilize the information on the first mode in the course of the activated second mode.

Besides, although the drawing shows that the application region, the content region and the data region are situated in the database storage region, the application region, the content region and the data region can be integrated together if necessary.

Figure 4C:
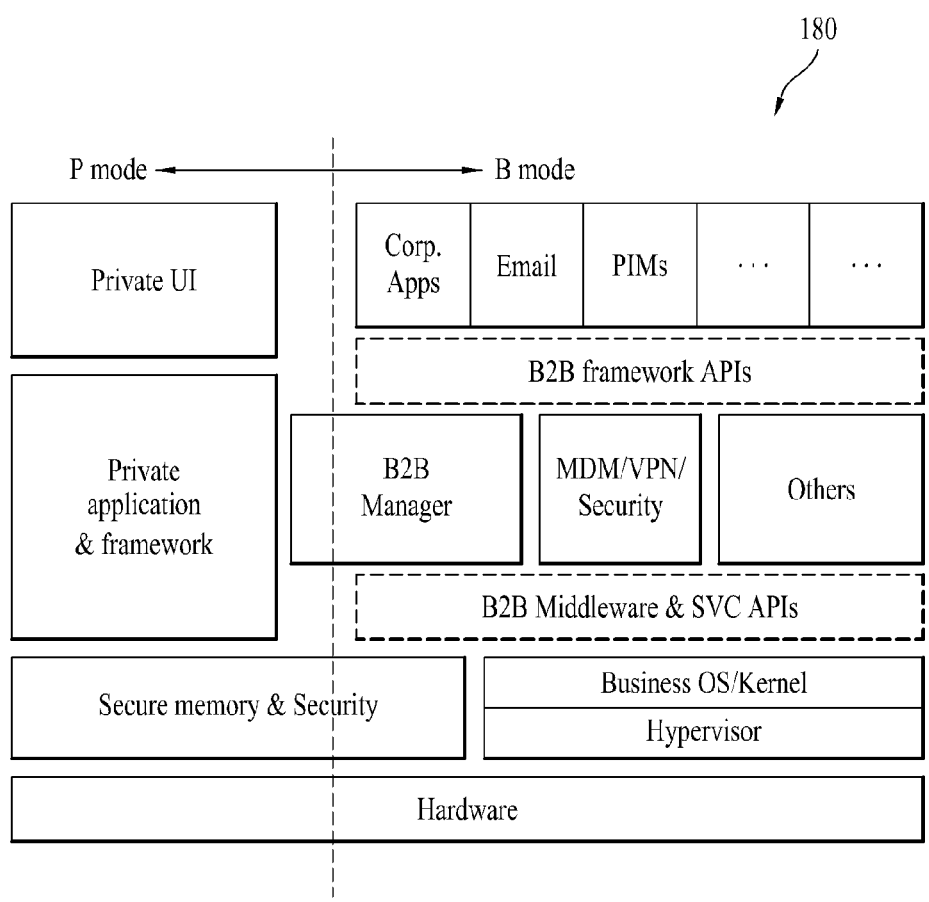

FIG. 4A (b) and FIG. 4C show a scheme of driving a hypervisor on a Host OS for supporting one mode to boot a Guest OS for supporting another mode (hereinafter named a second scheme). In particular, a mode supported by the Host OS can include a private mode. And, a mode supported by the Guest OS can include a business mode.

In particular, referring to FIG. 4C, a B2B manager is able to perform a switching operation between a private mode (hereinafter abbreviated a P mode) and a business mode (hereinafter abbreviated a B mode). Components shown in a P mode region of the two regions partitioned by a dotted line can operate in case of the private mode implementation, components shown in the B mode region can operate in case of the business mode implementation, and components included in both of the modes can operate in both of the modes.

According to the present invention, the mobile terminal 100 is able to implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if necessary.

First of all, when a common operating system is booted, the controller 180 implements and activates either the first mode or the second mode (1) or is able to activate either the first mode or the second mode despite implementing both of the first and second modes.

When an individual operating system is booted, the controller implements and activates a mode corresponding to a currently booted individual operating system (1), implements and activates a mode corresponding to one of he first mode and the second mode in case of booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail.

First of all, according to the present invention, each of a plurality of modes can be discriminated by at least one of a mode indicator, a database storage region, an operating system, a user access authority, an application configuration, a content configuration, a data configuration, an application feature, an application group, a group identifier and the like.

A case of discriminating a plurality of modes using a mode indictor according to a first embodiment is explained as follows.

First of all, each of a plurality of modes can have a different indicator to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. And, assume that either the private mode or the business mode is in an active state.

FIGS. 5A to 10C are diagrams for discriminating a plurality of modes according to the present invention.

Figure 5A:
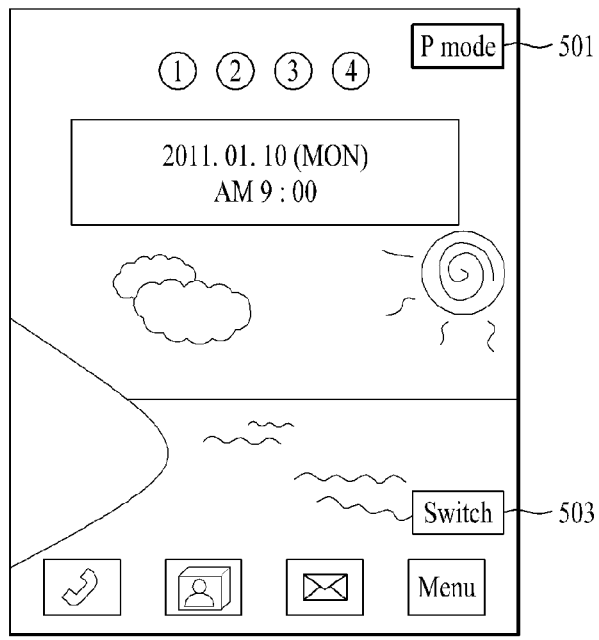
FIGS. 5A to 10C are diagrams for discriminating a plurality of modes according to the present invention.
Figure 5A:
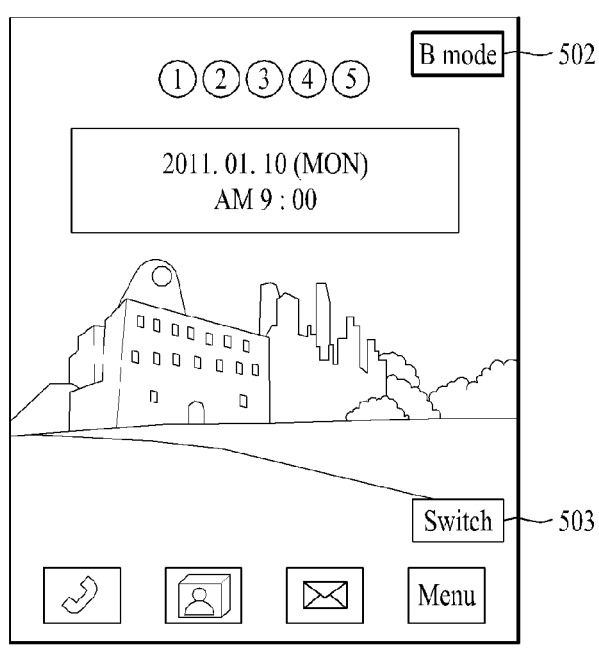

Referring to FIG. 5A (a), if a personal mode is currently activated, the mobile terminal 100 displays an icon (P mode) 501 corresponding to the private mode on a prescribed region of a screen. If a business mode is currently activated, the mobile terminal 100 is able to display an icon (B mode) 502 corresponding to the business mode on a prescribed region of a screen (FIG. 5A (b)).

Figure 5B:
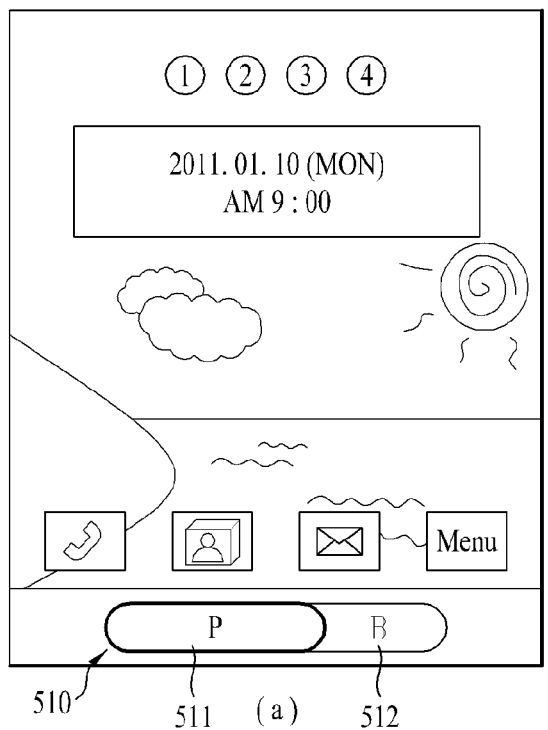
Figure 5B:
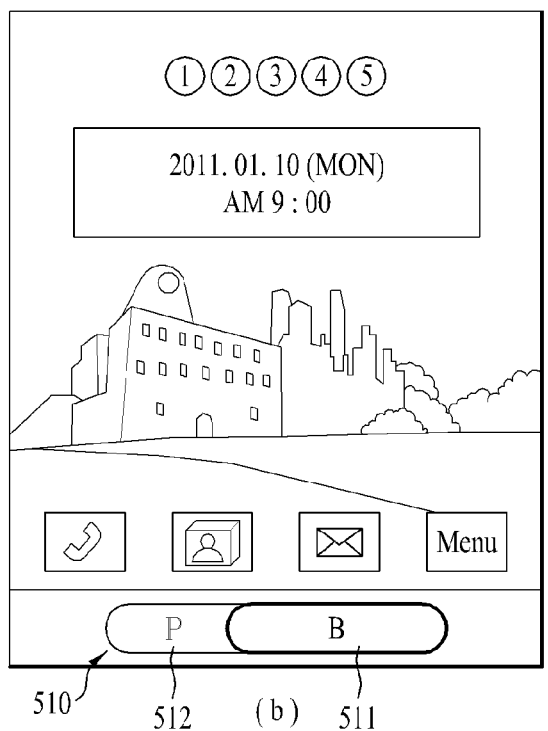

Referring to FIG. 5B, the mobile terminal 100 includes a mode switching key region 510 provided to a prescribed region of the screen. If the private mode is currently activated, the mobile terminal 100 discriminatively displays a zone (P) 511 corresponding to the private mode in the mode switching key region 510 (FIG. 5B (a)). If the business mode is currently activated, the mobile terminal 100 can discriminatively display a zone (B) 512 corresponding to the business mode in the mode switching key region 510 (FIG. 5B (b)).

Figure 5C:
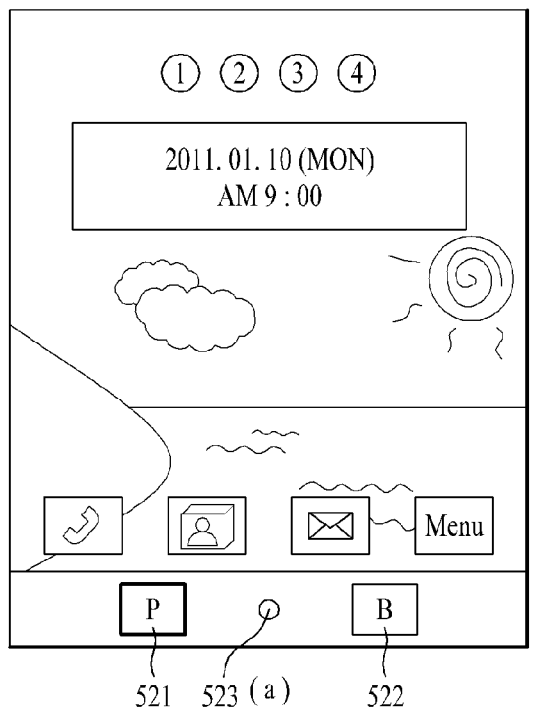
Figure 5C:
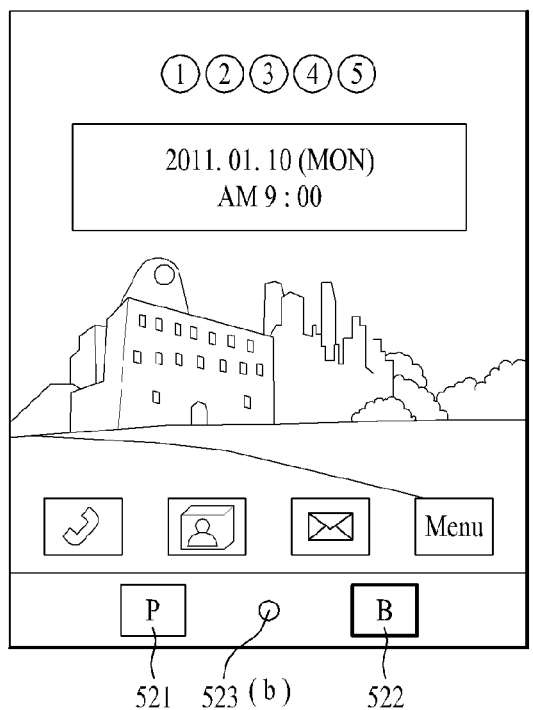

Referring to FIG. 5C, a private mode zone 521, a business mode zone 522 and a switching command zone 523 are provided to the screen of the mobile terminal 100. If the private mode is currently activated, the mobile terminal 100 discriminatively displays the private mode zone (P) 521 (FIG. 5C (a)). If the business mode is currently activated, the mobile terminal 100 can discriminatively display the business mode zone (B) 522 (FIG. 5C (b)).

Figure 5D:
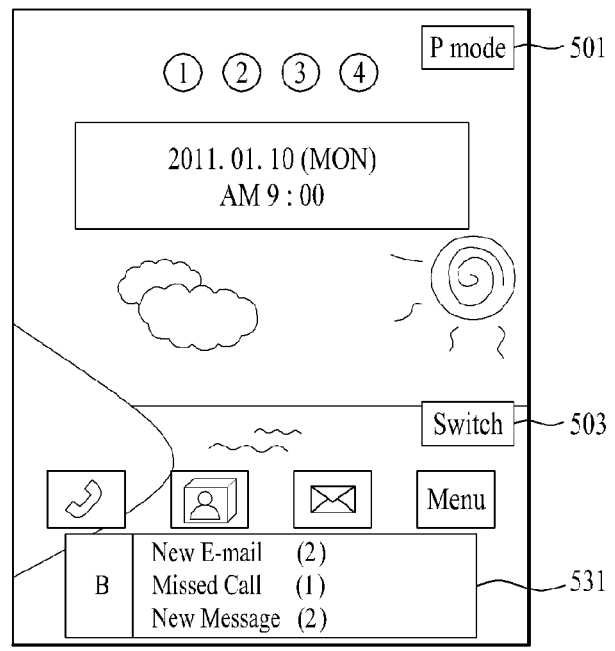
Figure 5D:
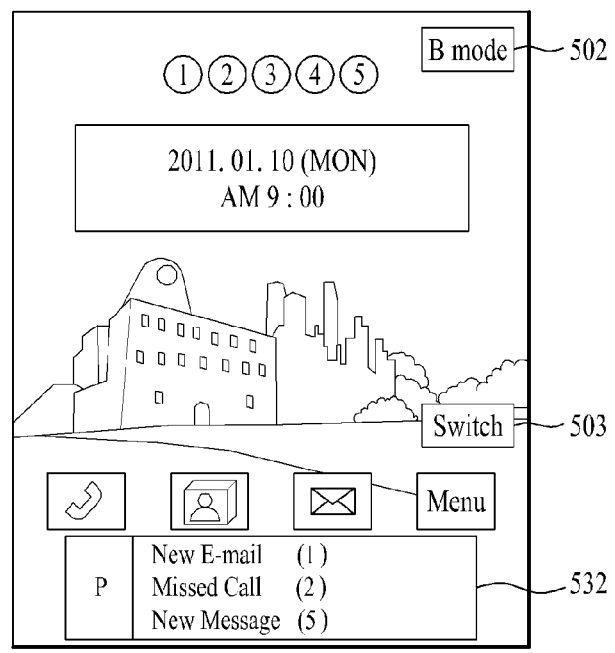

Referring to FIG. 5D, if the private mode is currently activated, the mobile terminal 100 displays an announcement window 531 for announcing events (e.g., email, message, call, etc.) occurring in association with the business mode or the number of the events (or, occurrence time, counterpart information, etc.) on a prescribed region of the screen (FIG. 5D (a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D (b)).

In the following description, a case of discriminating a plurality of modes using a database storage region according to a second embodiment is explained. First of all, a plurality of the modes can discriminatively have database storage regions within the memory 160, respectively (cf. FIG. 3C).

Each of a plurality of the modes is able to utilize the information stored in the corresponding database storage region or the corresponding information stored in the common database storage region only. Moreover, it is able to set the information on one mode not to be utilized in other modes. Besides, one (e.g., business mode) of a plurality of the modes is able to utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. 6A to 7B as follows. For clarity and convenience of the following description, assume that a first mode and a second mode include a private mode and a business mode, respectively. Assume that either the private mode or the business mode is in an active state. And, assume that a common application of the first and second modes is currently executed.

Figure 6A:
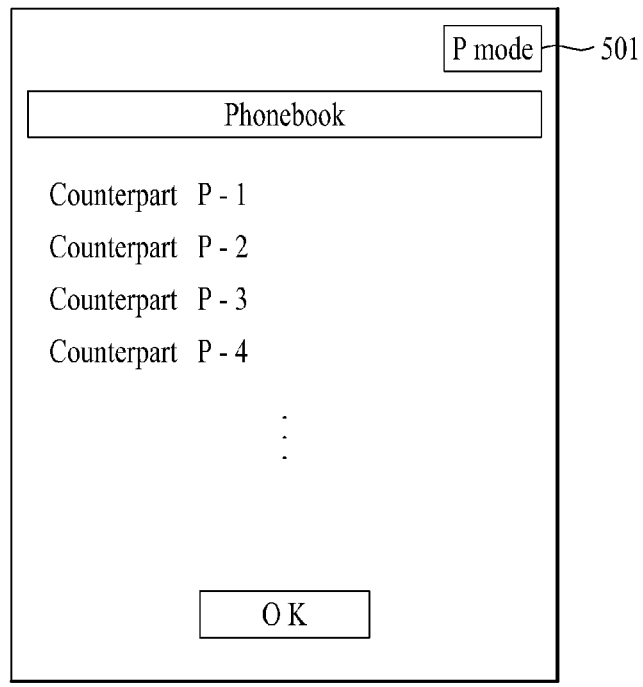

Referring to FIG. 6A, when a phonebook (example of a common application) is being executed in the private mode, the mobile terminal 100 extracts counterpart information corresponding to the private mode from counterpart information associated with the phonebook only and then displays the extracted counterpart information.

Figure 6B:
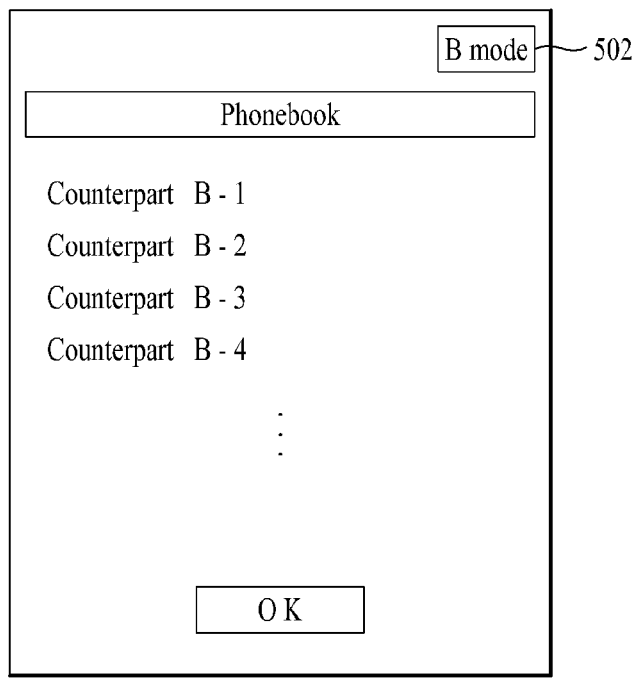
Figure 6B:
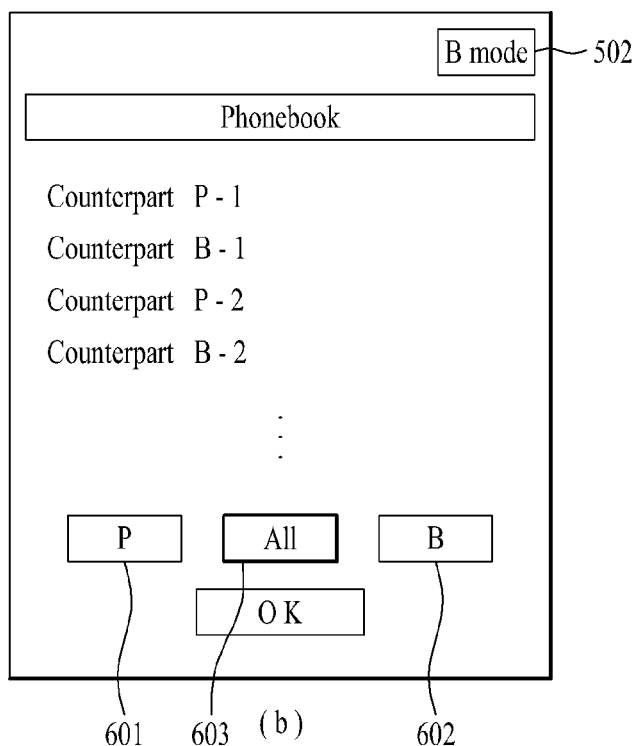

Referring to FIG. 6B, when executing a phonebook in the private mode, the mobile terminal 100 extracts counterpart information corresponding to the business mode from counterpart information associated with the phonebook and then displays the extracted counterpart information (FIG. 6B (a)). Alternatively, the mobile terminal 100 extracts counterpart information corresponding to either the private mode or the business mode and then displays the extracted counterpart information (FIG. 6B (b)).

In particular, FIG. 6B (b) shows a case that a zone (All) 603 is activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
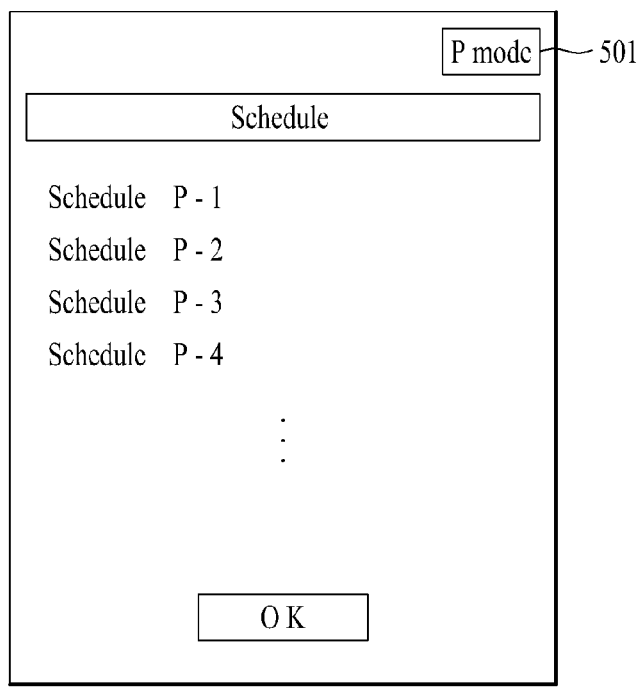

Referring to FIG. 7A, when a schedule management (example of a common application) is being executed in the private mode, the mobile terminal 100 extracts schedules corresponding to the private mode from schedules associated with the schedule management only and then displays the extracted schedules.

Figure 7B:
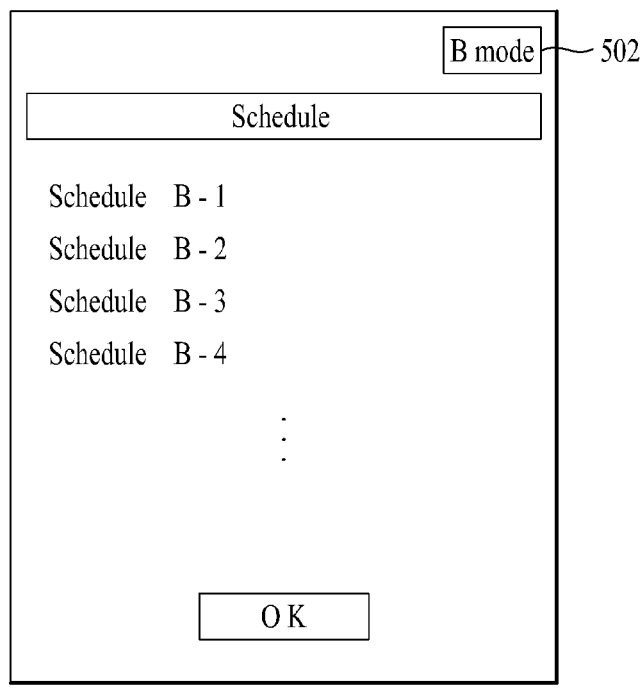
Figure 7B:
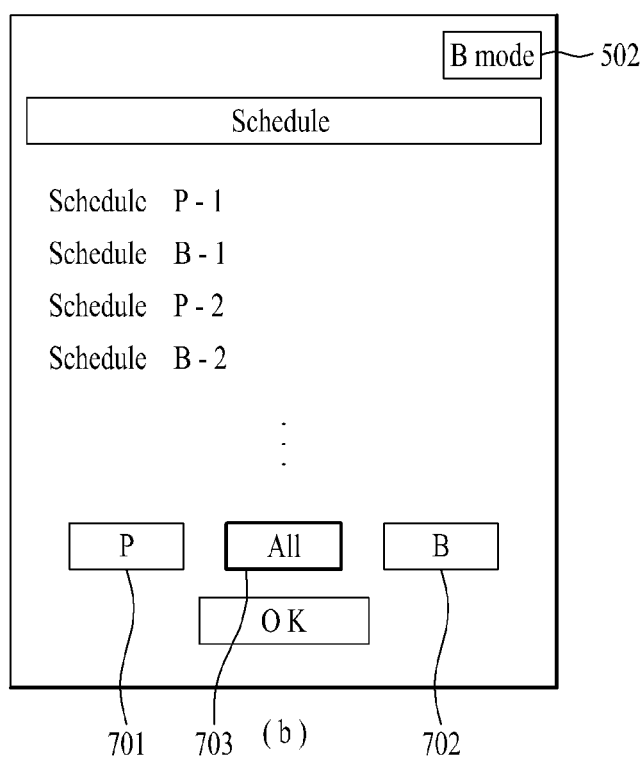

Referring to FIG. 7B, when executing a schedule management in the private mode, the mobile terminal 100 extracts schedules corresponding to the business mode from schedules associated with the schedule management and then displays the extracted schedules (FIG. 7B (a)). Alternatively, the mobile terminal 100 extracts schedules corresponding to either the private mode or the business mode and is then able to display the extracted schedules (FIG. 7B (b)).

In particular, FIG. 7B (b) shows a case that a zone (All) 703 is activated. If a privacy zone (P) 701 is activated, the mobile terminal 100 selectively displays the schedules corresponding to the private mode only. If a business zone (B) 702 is activated, the mobile terminal 100 selectively displays the schedules corresponding to the business mode only.

Specifically, referring to FIGS. 6A to 7B, although the private mode is unable to access the information on the business mode or the database storage region storing the information on the business mode, the business mode is able to freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2).

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

In case of entering or switching to a mode having a high user access authority, an input of a user authentication information is requested. If a valid user authentication information is input, the mobile terminal 100 can enter or switch to the mode having the high user access authority (example of an authentication procedure). In case of a mode having a low security level, the mobile terminal 100 is requested to input a user authentication information (e.g., name, social security number, etc.) of a low level. In case of a mode having a high security level, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

First of all, according to a first case, there can exist applications to which contents or data can be input regardless of a mode. For instance, the content or data inputtable application can include such an application for performing a basic function in using a terminal as a schedule management, a scheduler, an email, a message, a messenger, a conference call, a video call, an internet, a phonebook and the like.

According to a second case, like the first case, an information input is possible without mode discrimination. Yet, it is able to discriminate a database storage region per mode (cf. FIG. 3C).

In particular, inter-mode information exchange is impossible but unilateral information exchange is possible. For instance, an information transfer from a private mode to a business mode is possible but an information transfer from a business mode to a private mode is impossible. In another instance, by setting a plurality of modes to different security levels, respectively, an information transfer from a low level to a high level is possible but an information transfer from a high level to a low level is impossible.

In case of a specific situation, an external terminal having a predetermined authority in a remote place deletes information (e.g., application, content, data, etc.) on a specific mode only or is able to shut down the specific mode itself. For instance, the specific situation can include one of a case that an employee takes out a terminal without authorization, a case that a terminal is stolen, a case that a unregistered storage medium is loaded in a terminal, a case that a terminal accesses an unsubscribed network, and the like.

Furthermore, regarding a user access authority, it is able to differentiate an authority for accessing an application, a content, a data or the like, which is available for a business mode, in accordance with a user level (e.g., the user level is determined in consideration of rank in company, duty attribute in company, department in company, etc.) of the mobile terminal 100. And, it is also able to differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third case, there can exist application (e.g., dedicated applications) accessible to corresponding information as well as operable in either a first mode or a second mode.

For instance, for security matters in a business mode, a photographing function is restricted, a conditional access to a network is granted, or a print function is blocked. In case of the business mode, a business related application is provided. In case of a private mode, the business related application may not be provided. Of course, in case of the private mode, a privacy related application is provided. In case of the business mode, the privacy related application may not be provided.

Meanwhile, there can exist a content or application specialized in a unilateral mode only. For instance, the application specialized for the business mode can include a company business related application. And, the company business related application is able to perform a function of an upload to a company server, a function of a download to the company server and the like.

And, it is able to put an access restriction (or entry) per mode in accordance with a place or time. For instance, it is able to set a business mode not to be entered at home. In another instance, it is able to set a private mode not to be entered on a specific time zone. Occasionally, a separately authorized person is able to enter the business mode at home or the private mode at office on a specific time zone.

Moreover, since an interface is provided to be shared with users in the business mode, information can be shared with the users. If the business mode is switched to the private mode, the interface provided for the information sharing can be shut down.

Furthermore, there can exist one hardware module (e.g., a common module) usable for a plurality of modes in common or another hardware module (e.g., a dedicated module) usable for a specific one of a plurality of the modes. Hence, if a first mode is currently activated, a common module and a dedicated mode of the first mode are activated, while a dedicated module of a second module is not activated. In this case, the common module and the dedicated module are designated in accordance with a user selection or can be designated by a decision made by the controller 180 or the company server 300.

For instance, assuming that a first mode and a second mode are a private mode and a business mode, respectively, a common module can include one of the mobile communication module 112 for call and message transmission and reception, the power supply unit 190, the display unit 151, the memory 160 and the like. A dedicated module of the private mode can include one of the camera 121, the position location module 115 and the like. And, a dedicated module of the business mode can include the projector module 155 or the like. The above examples of the communication module and the dedicated module are just exemplary, by which the communication module and the dedicated module are non-limited. And, the communication module and the dedicated module can be configured in more various ways.

In the following description, a user access authority is explained in detail with reference to FIG. 8A and FIG. 8B. For clarity and convenience of the following description, assume a case that the same content is accessed.

Figure 8A:
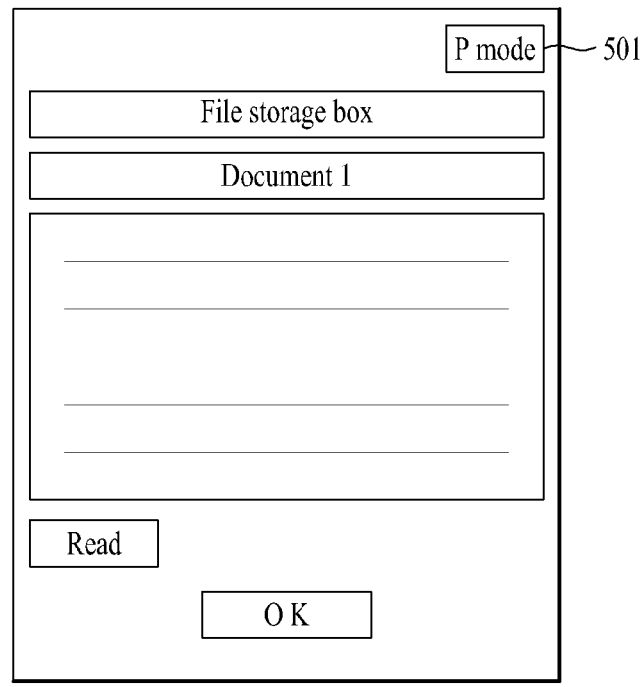
Figure 8A:
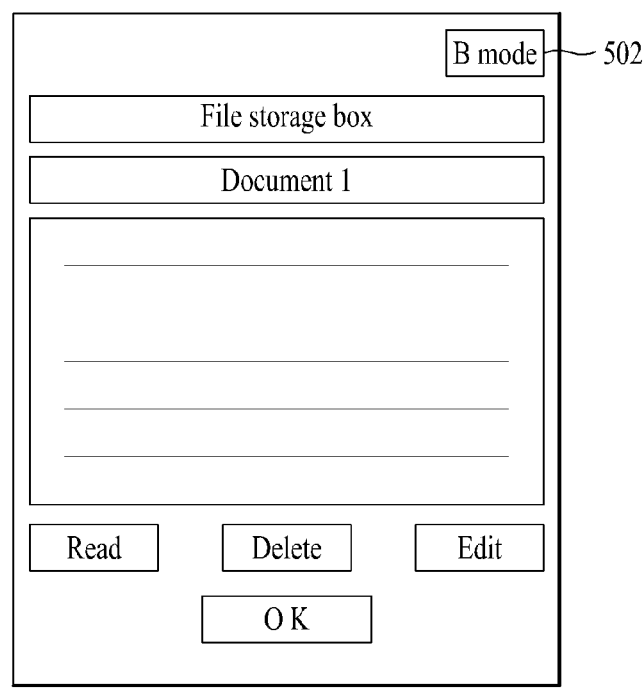

Referring to FIG. 8A (a), when a document 1 (example of content) is accessed in a private mode, the mobile terminal 100 can grant 'read authority' for the document 1. When the document 1 is accessed in a business, the mobile terminal 100 can grant 'read authority, delete authority, edit authority' for the document 1 (FIG. 8A (b)). Moreover, if a user is authorized over a predetermined level in a company, an approval authority can be granted to the user for the document 1 that requires approval or authorization.

Figure 8B:
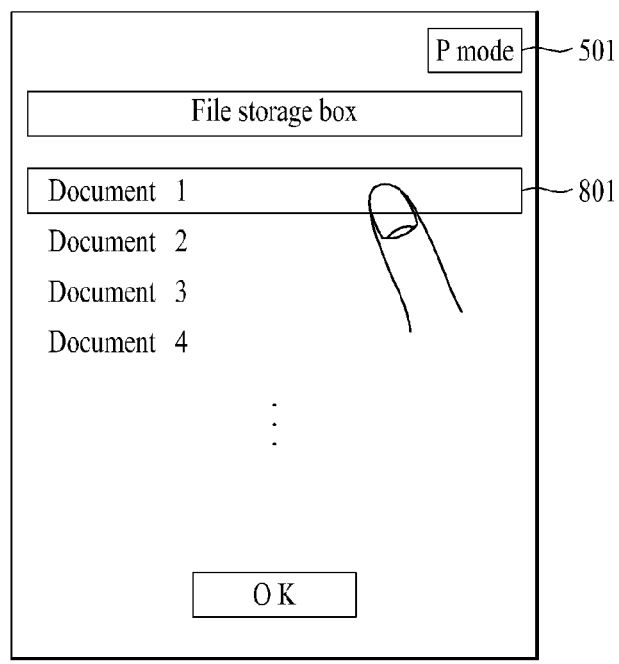
Figure 8B:
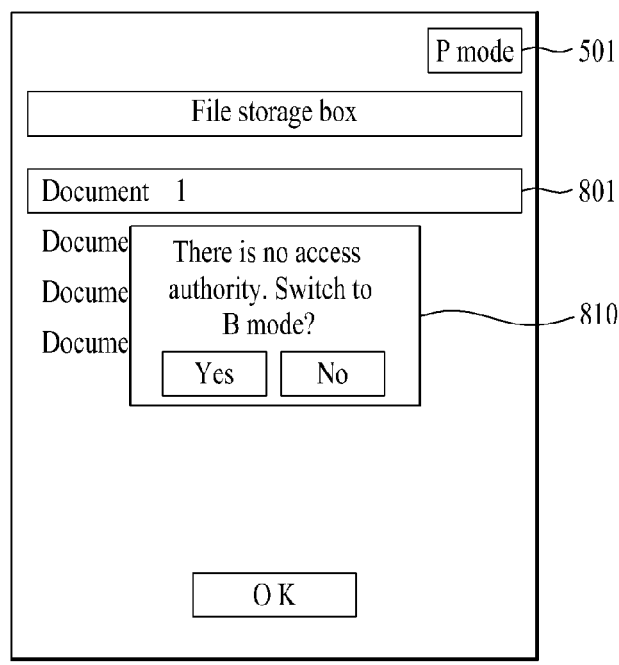

Referring to FIG. 8B, when a file 1 (example of content) corresponding to a business mode is selected from a file list in a private mode (FIG. 8B (a)), the mobile terminal 100 informs a user that there is no access authority on the file 1 and enables the user to select whether to switch the private mode to the business mode to check the file 1 (FIG. 8B (b)).

Of course, in case of the private mode in FIG. 8B, a file corresponding to the business mode may not be included in the file list. And, it is able to display an indictor, which indicates that the file corresponds to the privacy/business mode, on the file list.

Although the user access authority is set per mode in the above description, it can be set per application, content or data if necessary. Therefore, a user authorized with the user access authority is able to check the same content, whereas an unauthorized user is unable to check the same content.

According to a fourth embodiment, each of a plurality of modes can be discriminated in accordance with at least one of an application configuration, a content configuration and a data configuration.

Each of a plurality of the modes can configure an application different per mode. Even if an application is a common application, each of a plurality of the modes can configure a content or data corresponding to the application differently.

In this case, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both a case that a substance of the content/data is different and a case that a substance of the content/data is different in part. Specifically, the latter case can mean that a substance of a specific content corresponding to each of the first mode and the second mode is different even if the specific content is designated to both of the first mode and the second mode. This is enabled in a manner of configuring a data field different per mode for the same content or data.

This is explained in detail with reference to FIG. 9A and FIG. 9B as follows.

Figure 9A:
Figure 9A:

Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Figure 9B:
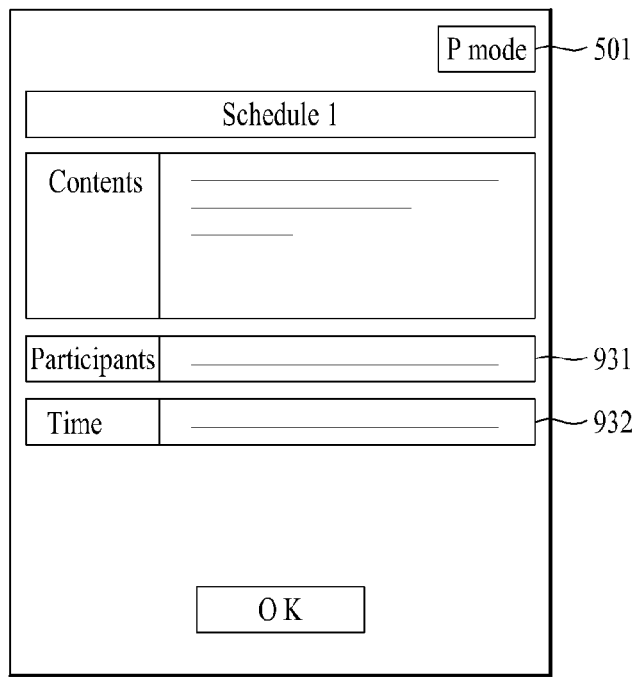
Figure 9B:
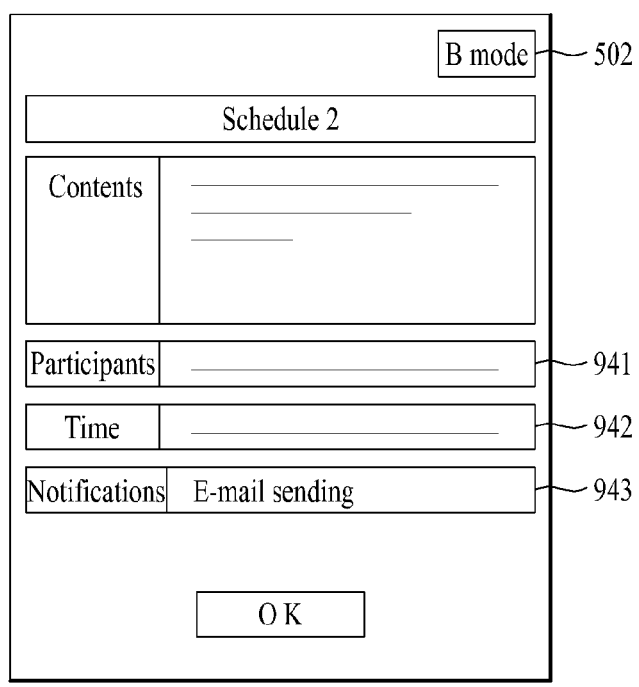

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10A:
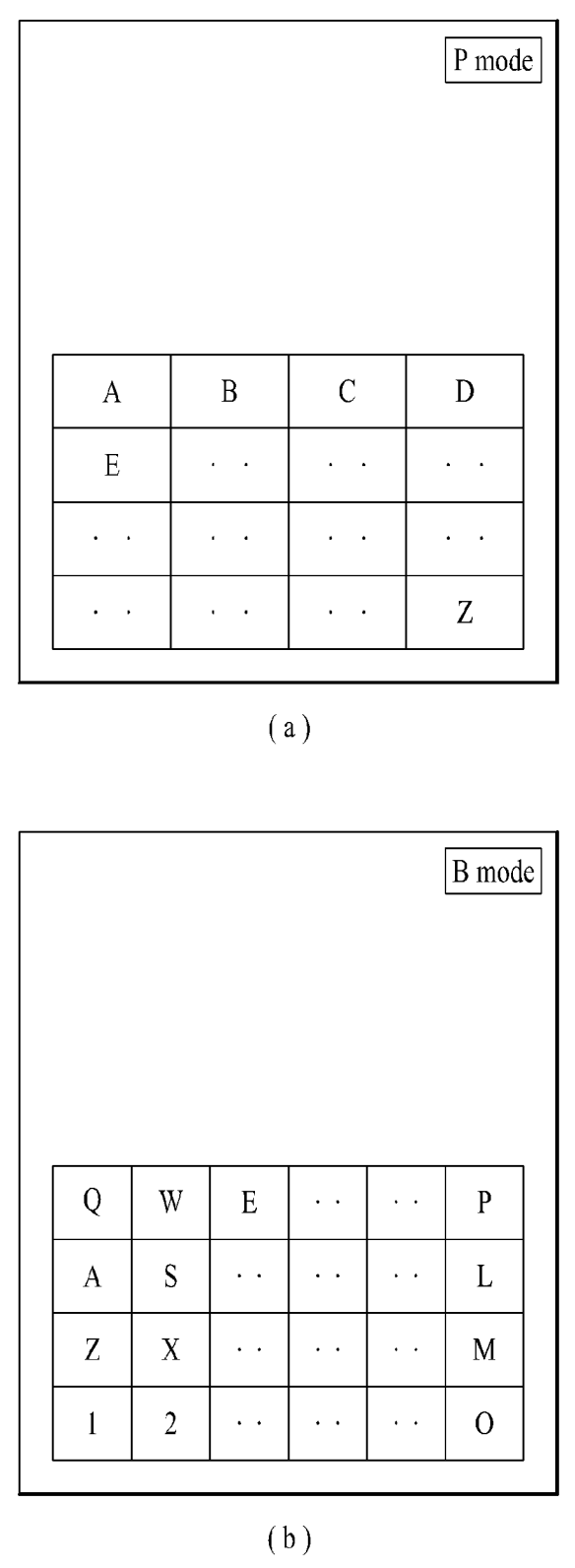
Figure 10B:
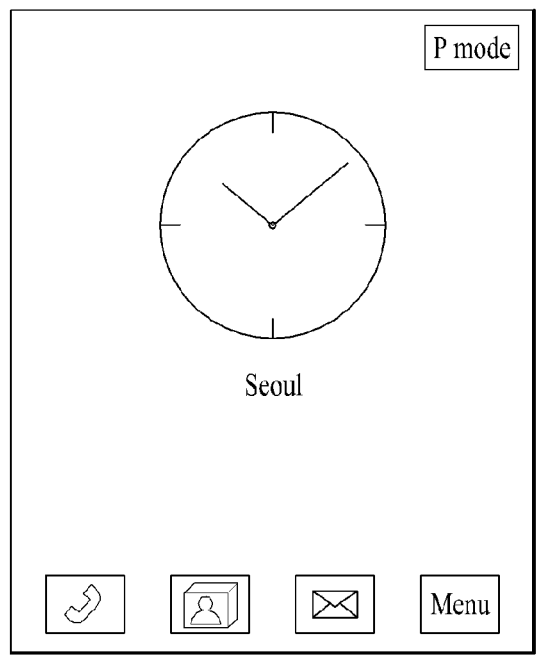
Figure 10B:
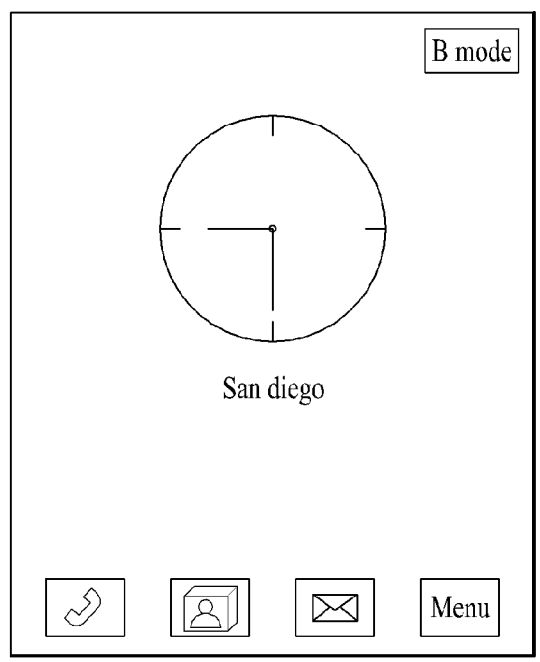

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and is then able to obtain the status of the counterpart terminal using the received information.

In the business mode, it is able to modify all previously-stored schedules to be fitted to a currently belonging time zone by reflecting a current time zone (for a case that a time zone is changed).

When there is no user input action made for a predetermined period of time in the business mode, it is able to lock or shut down the business mode automatically or in accordance with a user selection. In this case, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this case, if a feature varies per mode, it can mean that a configuration (e.g., a corresponding content/data configuration included), display or security of an application is varied.

For instance, if a feature varies per mode, it can mean that a structure (e.g., configuration of a corresponding menu item) of an application, an executed screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any case of configuring a common application to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode.

Figure 10C:
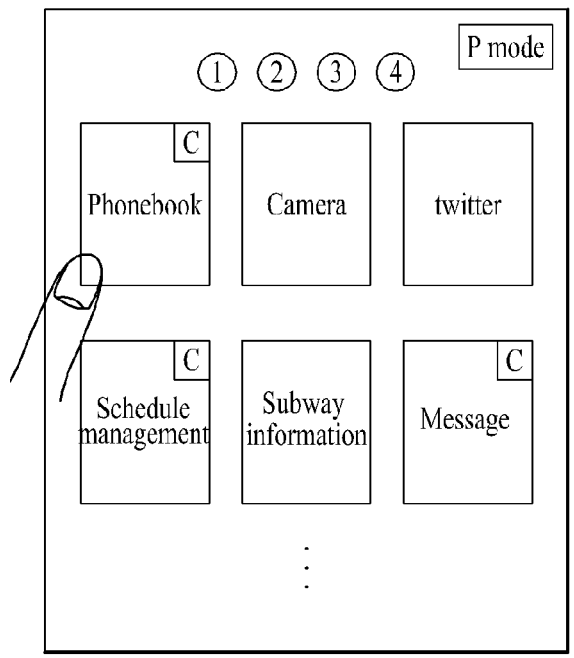
Figure 10C:
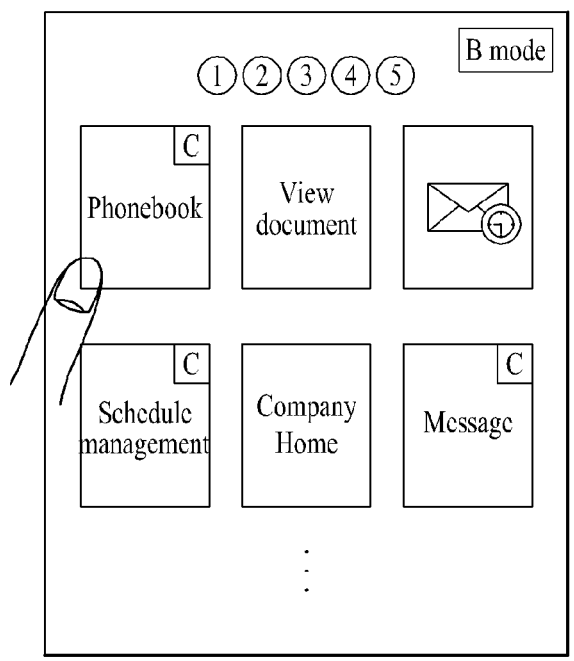

Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (cf. FIG. 6A or FIG. 9A (a)). On the contrary, if a business mode is activated, the mobile terminal 100 executes the phonebook in accordance with a feature corresponding to the business mode and then displays an executed screen of the phonebook (cf. FIG. 6B or FIG. 9A (b)).

For instance, a case that a security of an application is different is explained as follows. First of all, in case of attempting to execute a common application in a first mode, an authentication procedure is not requested or a low-level security set authentication information needs to be input. Yet, in case of attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this case, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. And, when a plurality of modes exists, the method of discriminating a plurality of the modes is explained as well.

According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or is able to switch a current mode to a mode corresponding to the specific group identifier (assuming that it is not a currently activated mode).

First of all, a mode screen mentioned in the following description can mean a screen in accordance with specific mode activation in case of activating a specific mode in a mobile terminal. For instance, in case of executing a specific application in the activated specific mode, the mode screen can include an executed screen of the specific application. In case of outputting a specific content, the mode screen can include a display screen of the specific content. In case of accessing a specific website, the mode screen can include a webpage provided by the specific website.

In the following description, a method of sharing a mode screen of a currently activated mode with a plurality of terminals capable of implementing a plurality of modes is explained in detail.

First of all, as a technology for sharing a mode screen with a plurality of terminals, there is N screen technology for example.

The N screen technology means the technology that enables a single content to be viewed on various devices in a manner that such an individual screen as a PC monitor, a TV, a mobile device (e.g., a mobile phone, etc.) and the like is usable as a single shared screen using a broadcasting network or a communication network. In particular, a single content is viewed on a plurality of devices or can be viewed on one device to another contiguously.

According to the N screen technology, contents can be shared with a plurality of terminals using various data communication schemes (e.g., WiMax, Wi-Fi, 3G based communication scheme, 4G based communication scheme, etc.). Contents are directly shared with a plurality of terminals. And, contents can be shared with a plurality of terminals via a medium device (e.g., set-top box).

Therefore, according to the present invention, the mobile terminal 100 can share a mode screen with at least one external terminal using the N screen technology. Of course, the N screen technology is one example of the technology for the mode screen sharing only. And, no limitation is put on a scheme or name if any method enables a mode screen to be shared.

In the following description, the mode screen sharing among a plurality of terminals is explained in detail with reference to FIGS. 11A to 11E.

FIGS. 11A to 11E are block diagrams of a plurality of terminals capable of sharing a mode screen according to an embodiment of the present invention.

Figure 11A:
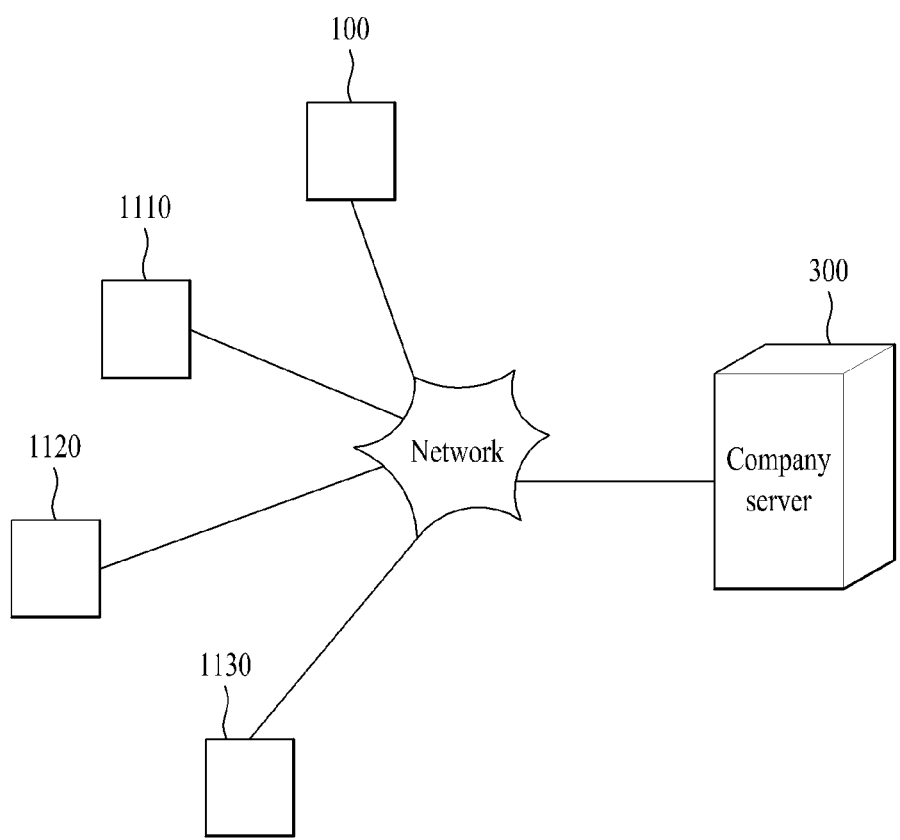
FIGS. 11A to 11E are block diagrams of a plurality of terminals capable of sharing a mode screen according to the present invention.

FIG. 11A shows a plurality of terminals including a mobile terminal 100, a plurality of terminals including a plurality of external terminals 1110, 1120 and 1130 and a company server 300 capable of communicating with a plurality of the terminals via a network if a currently activated mode is a business mode.

In order to enable a mode screen sharing among the mobile terminal 100 and each of the external terminals 1110, 1120 and 1130, the mobile terminal 100 previously registers the external terminals 1110, 1120 and 1130 as information sharing terminals or performs an authentication procedure for the information sharing with the external terminals 1110, 1120 and 1130, under the control of the controller 180. In doing so, the pre-registration or the authentication procedure can be performed by interoperating with the company server 300.

In the pre-registration process, the mobile terminal 100 or the company server 300 can store information on the pre-registered external terminals 1110, 1120 and 1130 (e.g., phone number, user name, user rank, etc.). Moreover, if the mobile terminal 100 pre-registers the first external terminal 1110 and a pre-registration is performed between the first external terminal 1110 and the second external terminal 1120, it is able to regard a pre-registration between the mobile terminal 100 and the second external terminal 1120 as performed.

In the authentication procedure performing step, the mobile terminal 100 or the company server 300 stores authentication information set individually or in common with the external terminals 1110, 1120 and 1130. If authentication information identical to the stored authentication information is input by a user, the mobile terminal 100 or the company server 300 can perform the authentication procedure validly. Moreover, if the mobile terminal 100 validly performs the authentication procedure with the first external terminal 1110 and the pre-registration is performed between the first external terminal 1110 and the second external terminal 1120, it is able to regard the authentication procedure as performed validly between the mobile terminal 100 and the second external terminal 1120.

Meanwhile, when all of the mobile terminal 100 and the external terminals 1110, 1120 and 1130 activate the same mode, a mode screen can be shared with each other without performing a separate pre-registration process or a separate authentication procedure. For instance, if the mobile terminal 100 and the external terminals 1110, 1120 and 1130 activate a specific mode (particularly, a business mode), the corresponding mode screen can be shared with each other.

Referring to FIG. 11A, the mobile terminal 100 and the external terminals 1110, 1120 and 1130 are able to share a mode screen via the company server 300. Alternatively, the mobile terminal 100 and the external terminals 1110, 1120 and 1130 can share a mode screen in direct without using the company server 300.

Figure 11B:
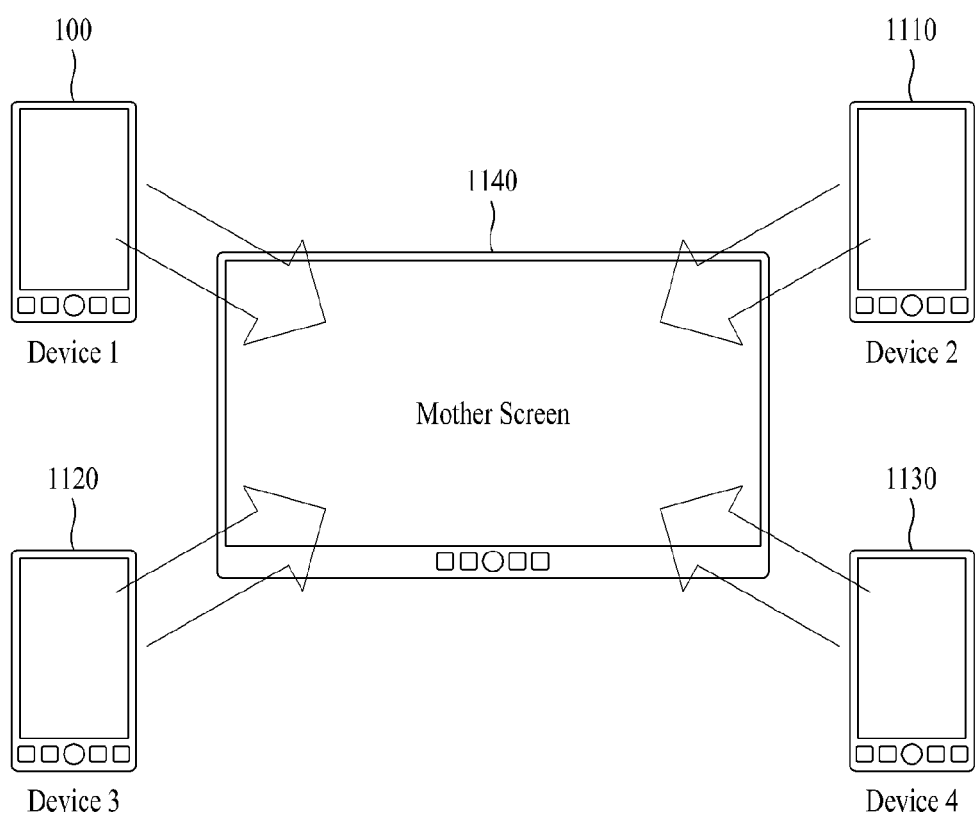
Figure 11C:
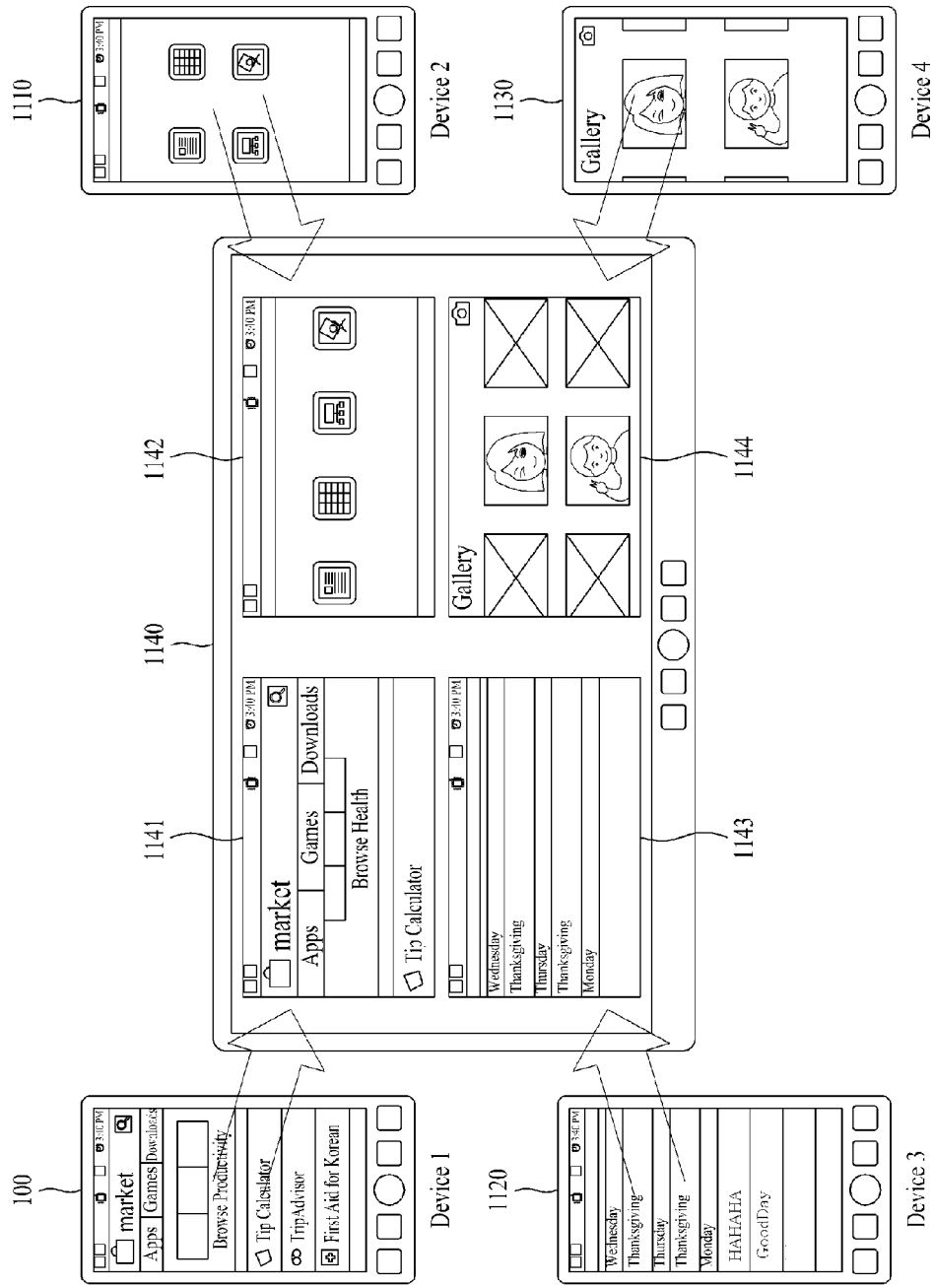
Figure 11D:
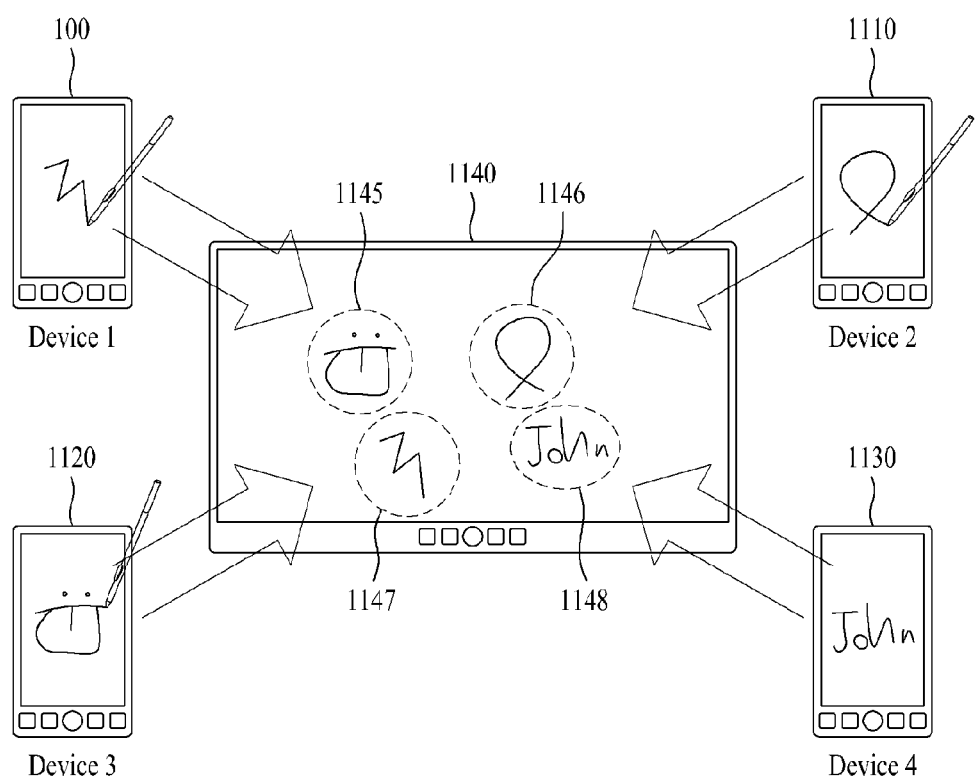

Referring to FIGS. 11B to 11D, when there are a plurality of terminals including the mobile terminal 100 and the plurality of external terminals 1110, 1120, 1130 and 1140, a specific one of the terminals displays screens of the rest of the terminals. Moreover, the specific terminal can support interactions among the screens of the rest of the terminals.

For instance, the $4^{th}$ external terminal 1140 (example of the specific terminal) plays a role as a mother screen and can receive and display the screens currently displayed on the mobile terminal 100 and the $1^{st}$ to $3^{rd}$ external terminals 1110, 1120 and 1130, respectively.

In particular, referring to FIG. 11C, if the mobile terminal 100 and the $1^{st}$ to $3^{rd}$ external terminals 1110, 1120 and 1130 execute $1^{st}$ to $4^{th}$ applications, respectively, the $4^{th}$ external terminal 1140 receives $1^{st}$ to $4^{th}$ executed screens of the $1^{st}$ to $4^{th}$ applications and is then able to display the received $1^{st}$ to $4^{th}$ executed screens on regions 1141 to 1144, respectively.

Referring to FIG. 11D, if the mobile terminal 100 and the $1^{st}$ to $3^{rd}$ external terminals 1110, 1120 and 1130 receive $1^{st}$ to $4^{th}$ handwritings from a user, respectively, the $4^{th}$ external terminal 1140 receives and displays the 1$^{st}$ to 4$^{th}$ handwritings on regions 1145 to 1148, respectively.

According to the above-described embodiment, when a plurality of user terminals participates in a conference, and assuming that screens of the plurality of the terminals are displayed on a mother screen, if each of the users inputs a specific opinion using his or her terminal, all opinions of the entire users can be displayed on a single screen using the mother screen.

Figure 11E:
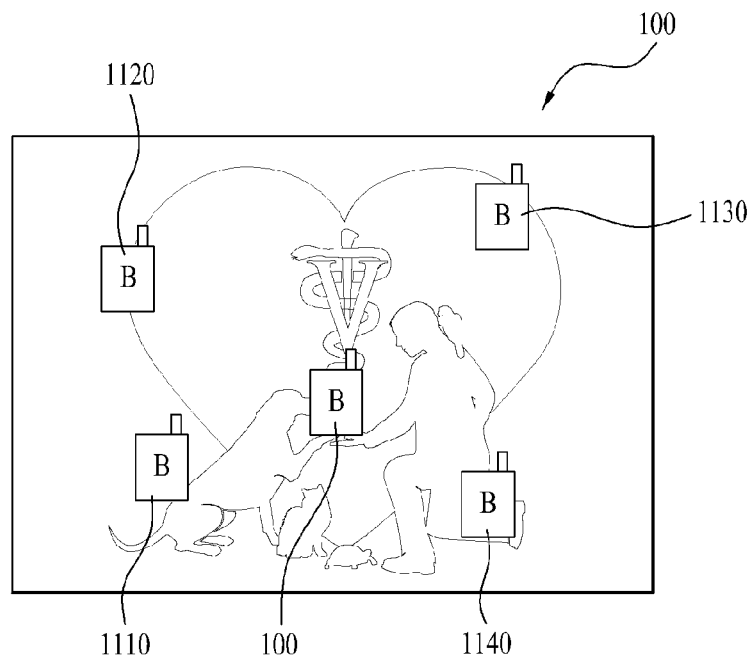
Figure 11E:
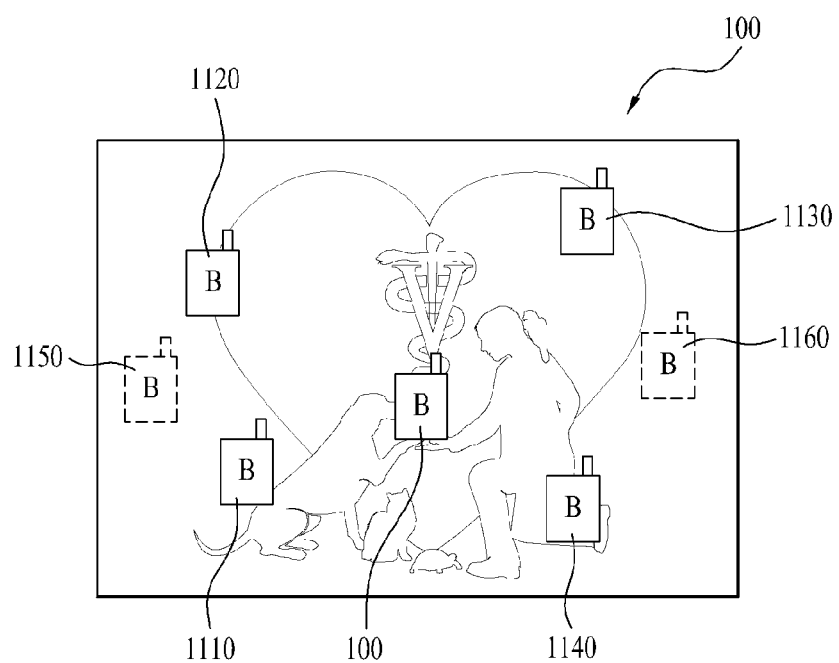

Referring to FIG. 11E, the mobile terminal 100 can display an indicator corresponding to an external terminal, which is available for a screen sharing with the mobile terminal 100, using the display unit 151 under the control of the controller 180.

For instance, the screen-sharing available external terminal can include one of an external terminal previously registered as an information sharing terminal, and external terminal having a valid authentication procedure performed for an information sharing, an external terminal having activated the same mode (particularly, a business mode) of the mobile terminal 100 and the like. And, the screen-sharing available external terminal can be situated within a predetermined distance from the mobile terminal 100.

Specifically, referring to FIG. 11E, if the mobile terminal 100 activates a business mode, it displays external terminals 1110, 1120, 1130 and 1140, each of which activates the business mode, only (FIG. 11E (a)). Alternatively, if the mobile terminal 100 activates a business mode, it displays all external terminals 1110, 1120, 1130, 1140, 1150 and 1160, each of which activates a private mode or a business mode, but displays the external terminals 1110, 1120, 1130 and 1140, each of which activates the business mode, identifiably (FIG. 11E (b)).

Moreover, the mobile terminal 100 activates the camera 121 and is then able to display a corresponding indicator at a position corresponding to a screen-sharing available external terminal on an image currently input via the camera 121 (using augmented reality). In doing so, a map image or a virtual image can be substituted for the image input via the camera 121.

Meanwhile, the mobile terminal 100 can display a list including an indicator of a screen-sharing available external terminal.

In the following description, while a mode screen is shared with a plurality of terminals capable of implementing a plurality of modes, and when a signal related to a deactivated mode is detected, a display controlling method is explained.

Figure 12:
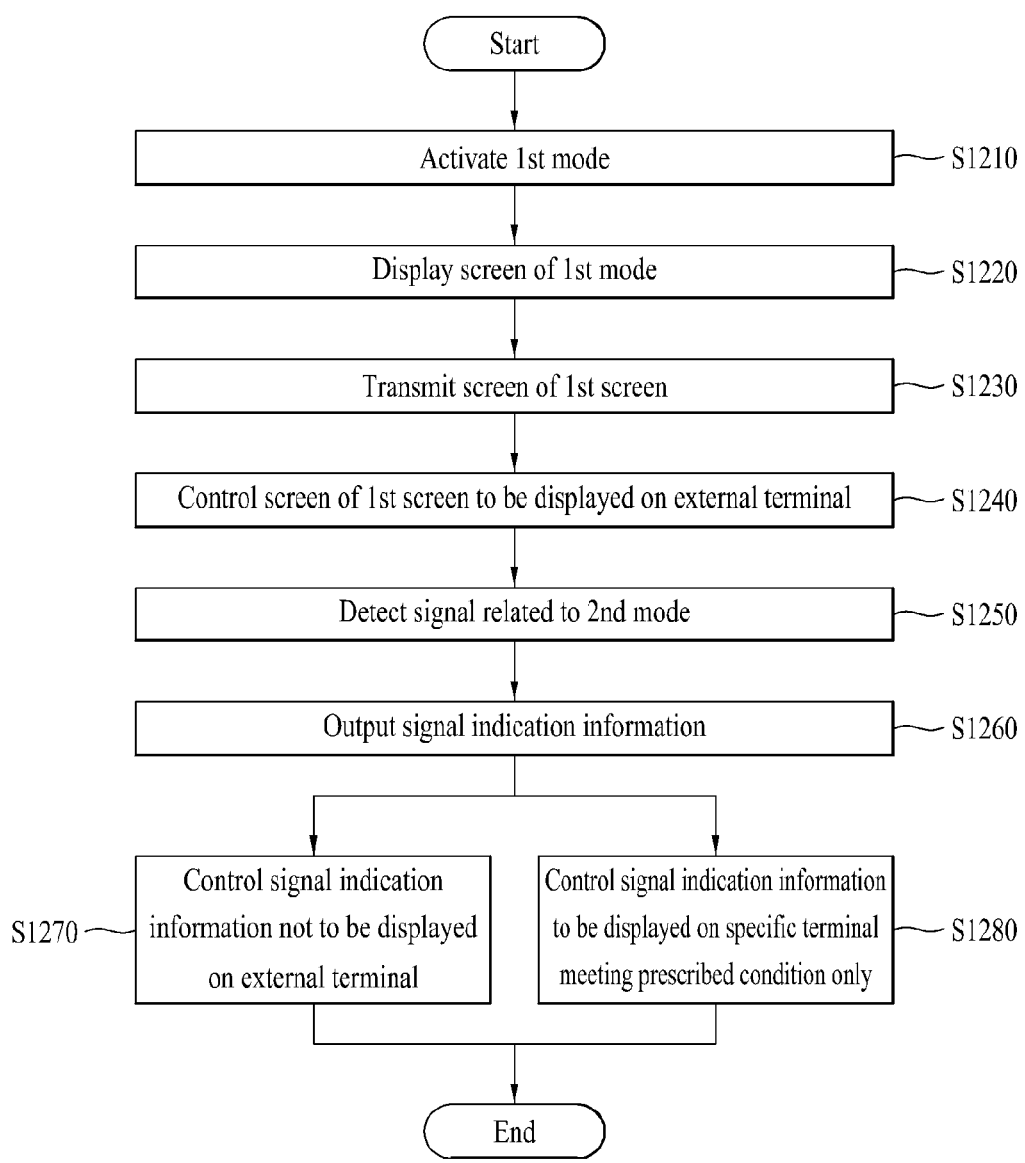
FIG. 12 is a first flowchart for a method of controlling a mode screen display in a mobile terminal according to one embodiment of the present invention.

FIG. 12 is a first flowchart for a method of controlling a mode screen display in a mobile terminal according to one embodiment of the present invention.

For clarity and convenience of the following description, a plurality of modes is limited to a first mode and a second mode. While both of the first and second modes are implemented, assume that the first or second mode is selectively activated in accordance with a mode switching. An application executed in the first and second modes is named a common application. And, an application executed in either the first mode or the second mode can be named a dedicated application.

Referring to FIG. 12, while a first mode and a second mode are implemented, the mobile terminal 100 activates the first mode under the control of the controller 180 (S1210). In doing so, if an operating system is designated per mode, the controller 180 can implement the first mode and the second mode using a first individual operating system and a second individual operating system (i.e., a first OS and a second OS in multi-OS) corresponding to the first mode and the second mode, respectively. If an operating system per mode is common, the controller 180 can implement the first mode and the second mode using a common operating system (i.e., a single OS).

In the first mode activating step S1210, in case of executing a common application, the mobile terminal 100 can execute the common application in accordance with a feature corresponding to the first mode. For instance, when the first mode and the common application are a private mode and a phonebook, respectively, the mobile terminal 100 can display a counterpart information list including counterpart information associated with the private mode or a specific counterpart information including a data field corresponding to the private mode.

In the following description, a mode activated in case of OS booting per multi-OS type (cf. FIGS. 4A to 4C) is explained in detail First of all, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme.). Assume that Guest OS 1 or Host OS corresponds to a private mode. And, assume that Guest OS 2 or Guest OS corresponds to a business mode.

According to the first multi-OS type, if the hypervisor included in the controller 180 is driven, the mobile terminal 100 can boot Guest OS 1 and Guest OS 2 simultaneously or sequentially. If a specific one of a private mode and a business mode is selected by a user or the controller 180, the mobile terminal 100 can activate the specific mode on the Guest OS corresponding to the selected specific mode. Meanwhile, when the specific mode selecting step is omitted, the mobile terminal 100 can activate the private mode using the Guest OS 1 designated as default.

According to the second multi-OS type, the mobile terminal 100 preferentially boots the Host OS corresponding to the private mode and is then able to preload the Guest OS corresponding to the business mode, under the control of the controller 180. The mobile terminal 100 activates the private mode on the Host OS. When the pre-loaded Guest OS is booted, the mobile terminal 100 can activate the business mode on the Guest OS. Meanwhile, the mobile terminal 100 can post-load the Guest OS.

In doing so, in case of pre-loading the Guest OS, an initial OS booting takes a considerable time. Yet, since two operating systems are already booted after completion of the booting, a mode switching can be quickly performed. In case of post-loading the Guest OS, an initial OS booting is quickly performed. Yet, in case of switching a current mode to a mode corresponding to the Guest OS, it may take a considerable time for a mode switching due to the time consumption attributed to the Guest OS booting.

Referring now to FIG. 12, in the activating step S1210, the mobile terminal 100 can activate either the first mode or the second mode in accordance with a user selection or a prescribed reference in case of an operating system booting, under the control of the controller 180.

For instance, in case of the single OS, any one of the first and second modes can be activated in accordance with the single OS booting. In another instance, in case of the multi-OS, a mode selected by a user from the first mode and the second mode or a firstly booting completed one of the first mode and the second mode is activated in accordance with the simultaneous booting of the multi-OS or a mode corresponding to the preferentially booted OS in accordance with the sequential booting of the multi-OS can be activated.

In particular, in case of the sequential booting of the multi-OS, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status. For instance, if a current terminal location corresponds to a specific place corresponding to a specific mode or a current hour belongs to a specific time corresponding to a specific mode, a specific mode can be preferentially activated in case of booting an operating system.

Meanwhile, under the control of the controller 180, the mobile terminal 100 displays a screen of a first mode (hereinafter named a first mode screen) using the display unit 151 while the first mode is activated (S1220).

For instance, the first mode screen can include one of an executed screen of a specific application in case of executing the specific application in the mobile terminal 100, a display screen of a specific content/data in case of outputting the specific content/data from the mobile terminal 100, a standby screen in a standby state of the first mode, and the like.

The mobile terminal 100 transmits the first mode screen using the wireless communication unit 110 under the control of the controller 180 (S1230).

In the transmitting step S1230, the mobile terminal directly transmits the first mode screen to at least one external terminal capable of sharing a mode screen (hereinafter named a sharable terminal) (1) or enables the company server 300 to transmit the first mode screen to at least one sharable terminal by transmitting the first mode screen to the company server 300 (2). Therefore, the first mode screen of the mobile terminal 100 can be shared with the sharable terminal.

The mobile terminal 100 directly receives a mode screen of a mode currently activated by at least one sharable terminal from the at least one sharable terminal or can receive the mode screen via the company server 300. Therefore, the mode screen of the sharable terminal can be shared with the mobile terminal 100.

Figure 15A:
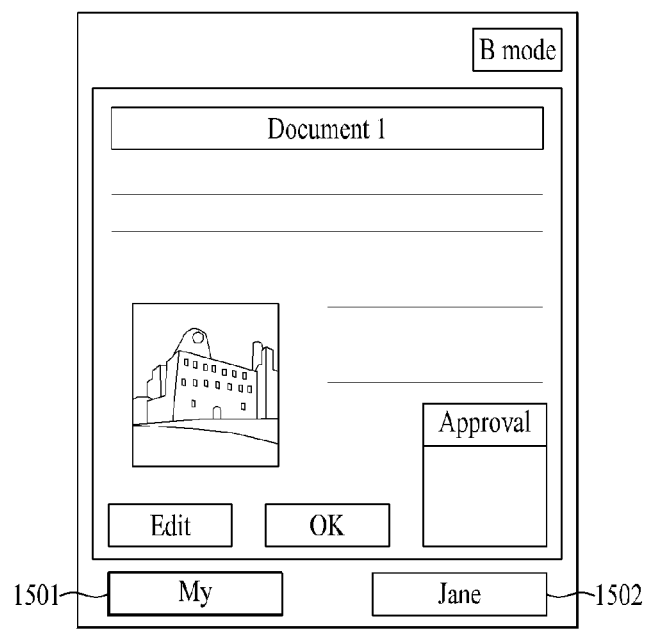
FIGS. 15A to 15D are diagrams of display configurations of a my-mode screen and a counterpart mode screen in a mobile terminal according to the present invention.
Figure 15B:
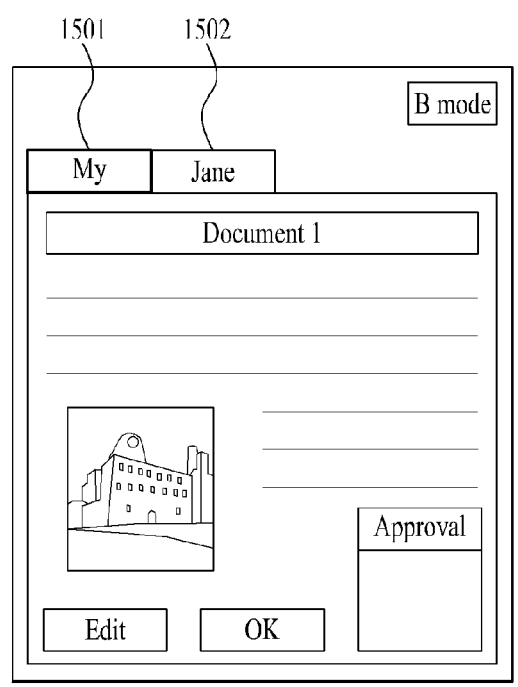

In this case, the mobile terminal 100 displays both of the first mode screen and the received mode screen on a single screen (1) (cf. FIG. 15C) or can selectively display the first mode screen or the received mode screen (2) (cf. FIG. 15A, FIG. 15B).

The mobile terminal 100 can select at least one sharable terminal in accordance with a selection made by a user, the controller 180 or the company server 300. The mobile terminal 100 is then able to share the mode screen with the selected at least one sharable terminal.

Regarding the case of the selection made by the user, the mobile terminal 100 displays indicators of a plurality of sharable terminals on a screen (cf. FIG. 11E). If a user selects a specific one of the displayed indicators, the mobile terminal 100 can share the mode screen with the sharable terminal corresponding to the selected specific indicator.

Regarding the case of the selection made by the controller 180, the controller 180 selects an external terminal, which activates the same mode of the mobile terminal 100, among external terminals located within a predetermined distance from the mobile terminal 100, an external terminal having transmitted a mode screen sharing request signal to the mobile terminal 100, or an external terminal having received a mode screen sharing request signal from the mobile terminal 100 as a sharable terminal and is then able to share a mode screen with the selected sharable terminal.

Regarding the case of the selection made by the company server 300, the company server 300 selects a business mode activated external terminal (particularly, an external terminal located within a predetermined distance (e.g., inside a company) from the company server 300) as a sharable terminal. And, the mobile terminal 100 can share a mode screen with the external terminal selected as the sharable terminal by the company server 300. In doing so, the mobile terminal 100 should activate the business mode as well.

Moreover, the mobile terminal 100 can transmit a mode switching request signal to an external terminal failing to activate the same mode of the mobile terminal 100 using the wireless communication unit 110 under the control of the controller 180.

For instance, the mode switching request signal can include information (e.g., first mode) on a switching target mode, information (e.g., phone number, rank, level, etc.) on a terminal making a switching request, information on a mode screen sharing request and the like. Therefore, if an external terminal receives a mode switching request signal, it activates the first mode like the mobile terminal 100 and is then able to set a state for sharing a mode screen with the mobile terminal 100.

In the process for transmitting and receiving a mode screen, the mobile terminal 100 can transmit or receive a mode screen to correspond to a prescribed level. This shall be described in detail with reference to the following drawings including FIG. 20 and the like.

The mobile terminal 100 controls the first mode screen of the activated first mode to be displayed on the at least one sharable terminal under the control of the controller 180 (S1240).

In this case, the sharable terminal can be regarded as activating the first mode like the mobile terminal 100. Moreover, the mobile terminal 100 transmits a mode switching request signal to an external terminal failing to activate the first mode, thereby leading the corresponding external terminal to switch its mode to the first mode, which shall be described later). Specifically, the first mode can include a business mode.

In the controlling step S1240, the mobile terminal 100 can control the first mode screen to be displayed on the corresponding sharable terminal to be suitable for a display configuration (e.g., a screen size, a screen resolution, etc.) of the sharable terminal that will display the first mode screen. In particular, if the mobile terminal 100 and the sharable terminal differ from each other in the display configuration, the first mode screen is modified to correspond to the display configuration of the sharable terminal. Therefore, the first mode screen can be displayed on the corresponding sharable terminal.

The step S1240 of controlling the display of the first mode screen is described in detail with reference to the accompanying drawings in the following description. For clarity and convenience of the following description, assume that both of the mobile terminal 100 and the sharable terminal have activated the business mode. And, assume that the sharable terminal sets a name of the mobile terminal 100 to Tom. Moreover, assume that the mobile terminal 100 sets a name of the sharable terminal to Jane.

Figure 13:
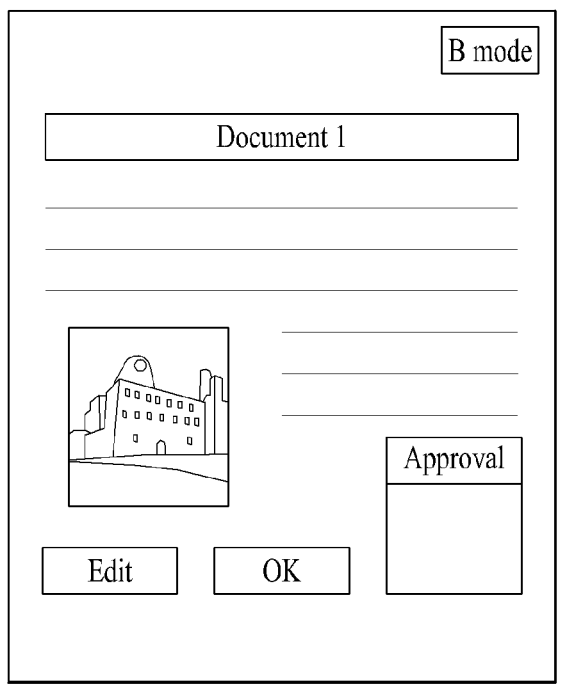
FIG. 13 is a diagram of a display configuration of a mode screen of a mobile terminal in a currently activated mode according to the present invention.

FIG. 13 is a diagram of a display configuration of a mode screen of a mobile terminal in a currently activated mode according to the present invention. In FIG. 13, as the mobile terminal 100 executes a document search/read application in a currently activated business mode, a screen corresponding to Document 1 is displayed as a mode screen.

Figure 14A:
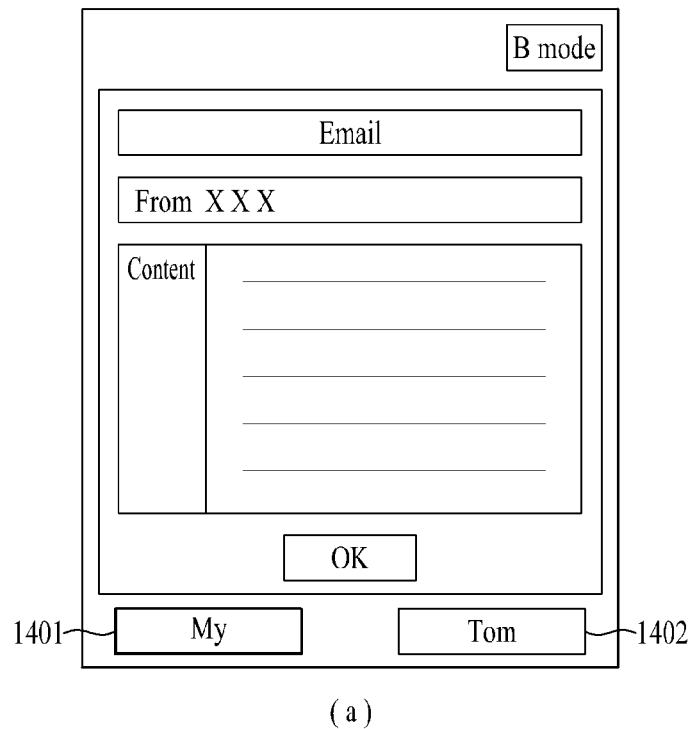
FIGS. 14A to 14C are diagrams of display configurations of a my-mode screen and a counterpart mode screen in an external terminal according to the present invention.
Figure 14A:
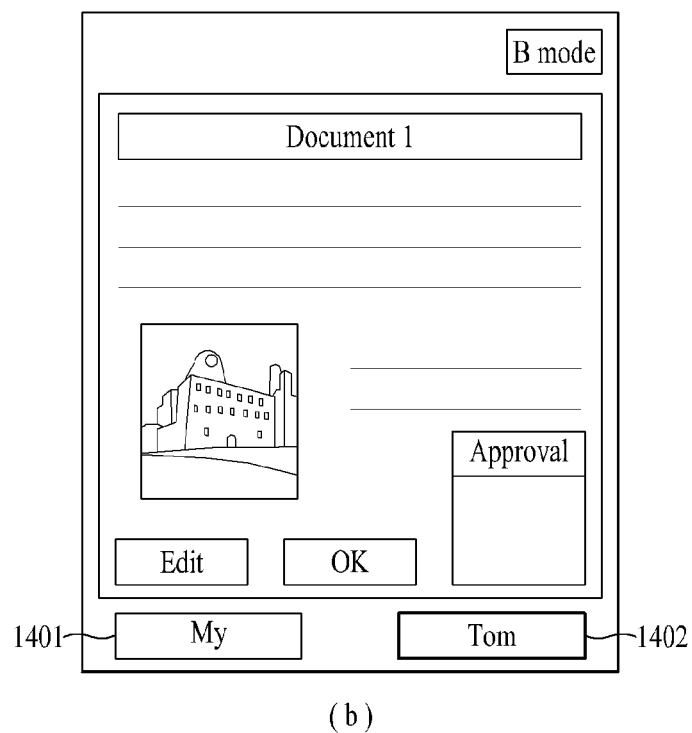
Figure 14B:
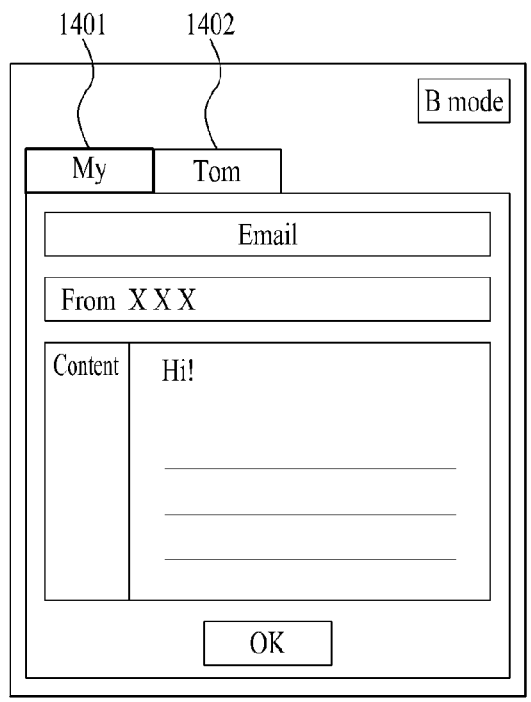
Figure 14B:
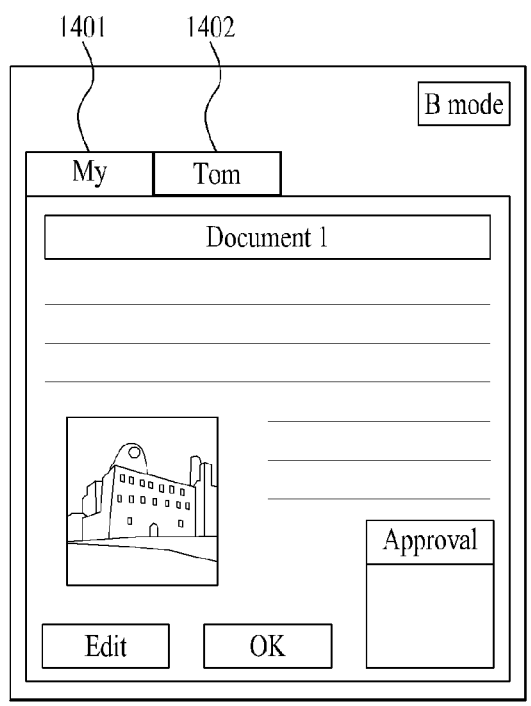
Figure 14C:
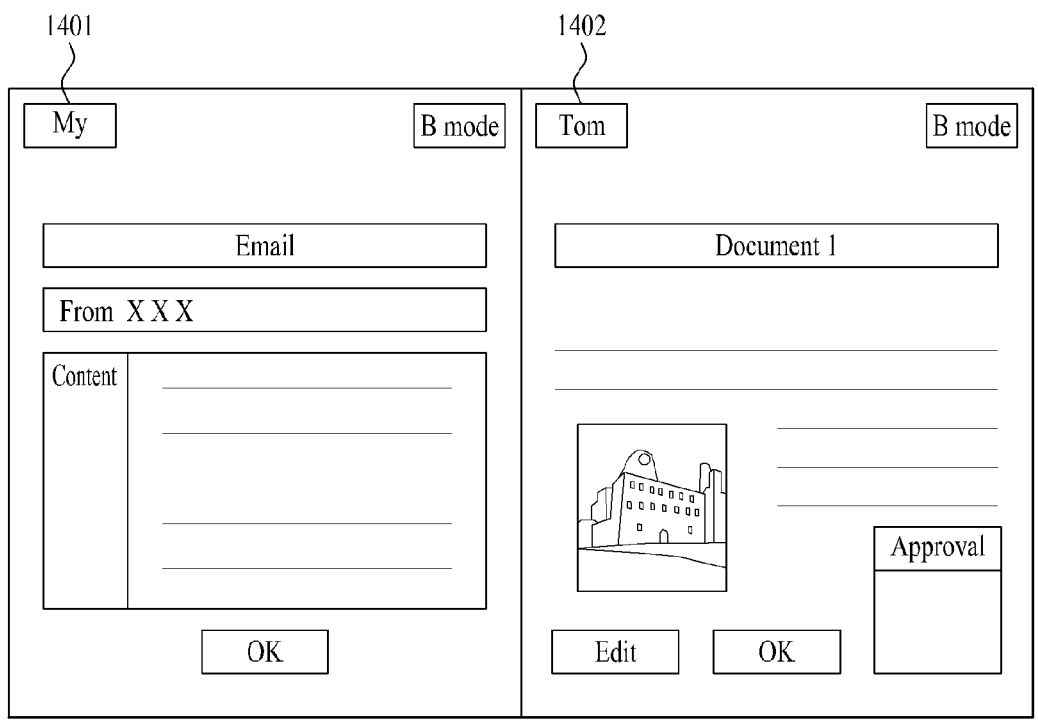

FIGS. 14A to 14C are diagrams of display configurations of a my-mode screen and a counterpart mode screen in a sharable terminal according to the present invention. In FIGS. 14A to 14C, the sharable terminal displays a received email check screen as a my-mode screen by executing an email application in a business mode and displays a screen corresponding to the Document 1 as a counterpart mode screen.

Referring to FIG. 14A, a sharable terminal includes a key zone 1401 for receiving a selection of a my-mode screen and a key zone 1402 for receiving a selection of a counterpart mode screen on a screen. If the key zone 1401 is selected, the sharable terminal can display a received email check screen (FIG. 14A (a)). If the key zone 1402 is selected, the sharable terminal can display a screen corresponding to Document 1 (FIG. 14A (b)).

Referring to FIG. 14B, a sharable terminal displays a tag 1401 indicating that a currently displayed mode screen is a my-mode screen and a tag 1402 indicating that a currently displayed mode screen is a counterpart mode screen on a screen. If the tag 1401 is activated, the sharable terminal can display a received email check screen (FIG. 14A (a)). If the tag 1402 is activated, the sharable terminal can display a screen corresponding to Document 1 (FIG. 14A (b)). Of course, using the tags 1401 and 1402, it is able to select a mode screen to display on the screen (cf. FIG. 14A).

Referring to FIG. 14C, a sharable terminal partitions a screen into a plurality of regions including a first region and a second region. The sharable terminal is then able to display a received email check screen and a screen corresponding to Document 1 on the first region and the second region, respectively. In this case, an indicator 1401 indicating a corresponding mode screen is a my-mode screen and an indicator 1402 indicating that a corresponding mode screen is a counterpart mode screen can be displayed on the first region and the second region, respectively.

Next, FIGS. 15A to 15D are diagrams of display configurations of a my-mode screen and a counterpart mode screen in a mobile terminal according to the present invention. In the drawings, the mobile terminal 100 displays a screen corresponding to Document 1 as a my-mode screen and a received email check screen as a counterpart mode screen.

Referring to FIG. 15A, the mobile terminal 100 includes a key zone 1501 for receiving a selection of a my-mode screen and a key zone 1502 for receiving a selection of a counterpart mode screen on the screen. If the key zone 1501 is selected, the mobile terminal 100 displays a screen corresponding to Document 1.

Referring to FIG. 15B, the mobile terminal 100 displays a tab 1501 indicating that a currently displayed mode screen is a my-mode screen or a tab 1502 indicating that a currently displayed mode screen is a counterpart mode screen on the screen. If the tab 1501 is activated, the mobile terminal 100 displays a screen corresponding to Document 1.

Figure 15C:
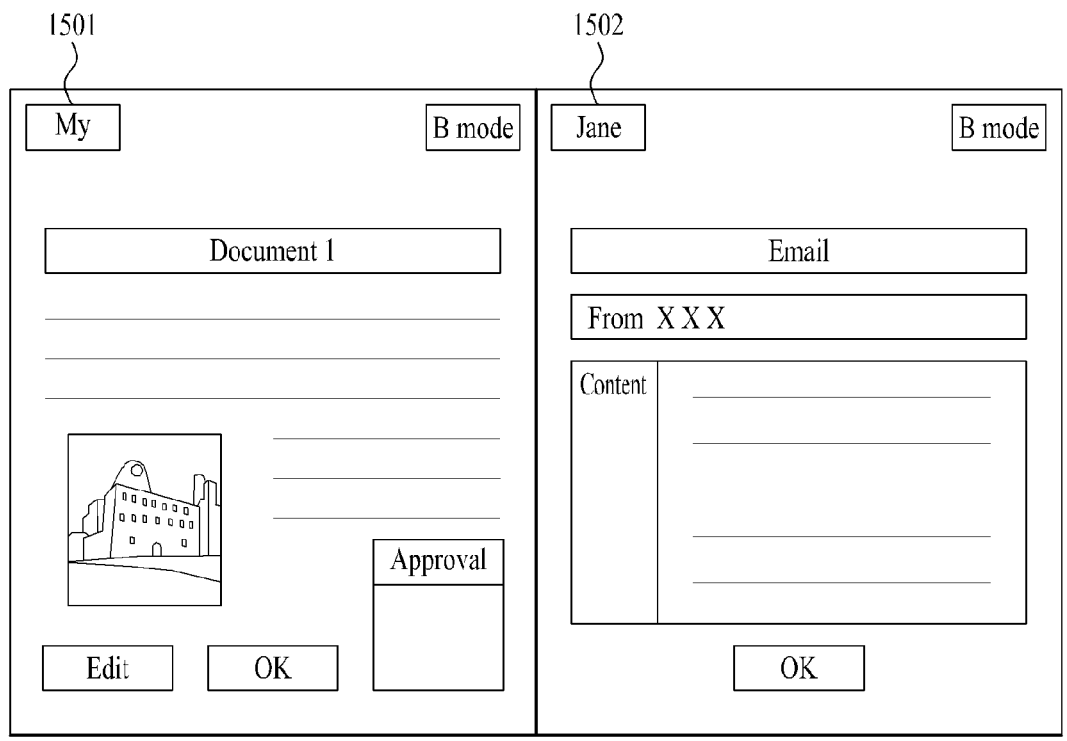

Referring to FIG. 15C, the mobile terminal 100 partitions a screen into a plurality of regions including a first region and a second region. The mobile terminal 100 is then able to display a screen corresponding to Document 1 and a received email check screen on the first region and the second region, respectively. In this case, an indicator 1501 indicating a corresponding mode screen is a my-mode screen and an indicator 1502 indicating that a corresponding mode screen is a counterpart mode screen can be displayed on the first region and the second region, respectively.

Figure 15D:
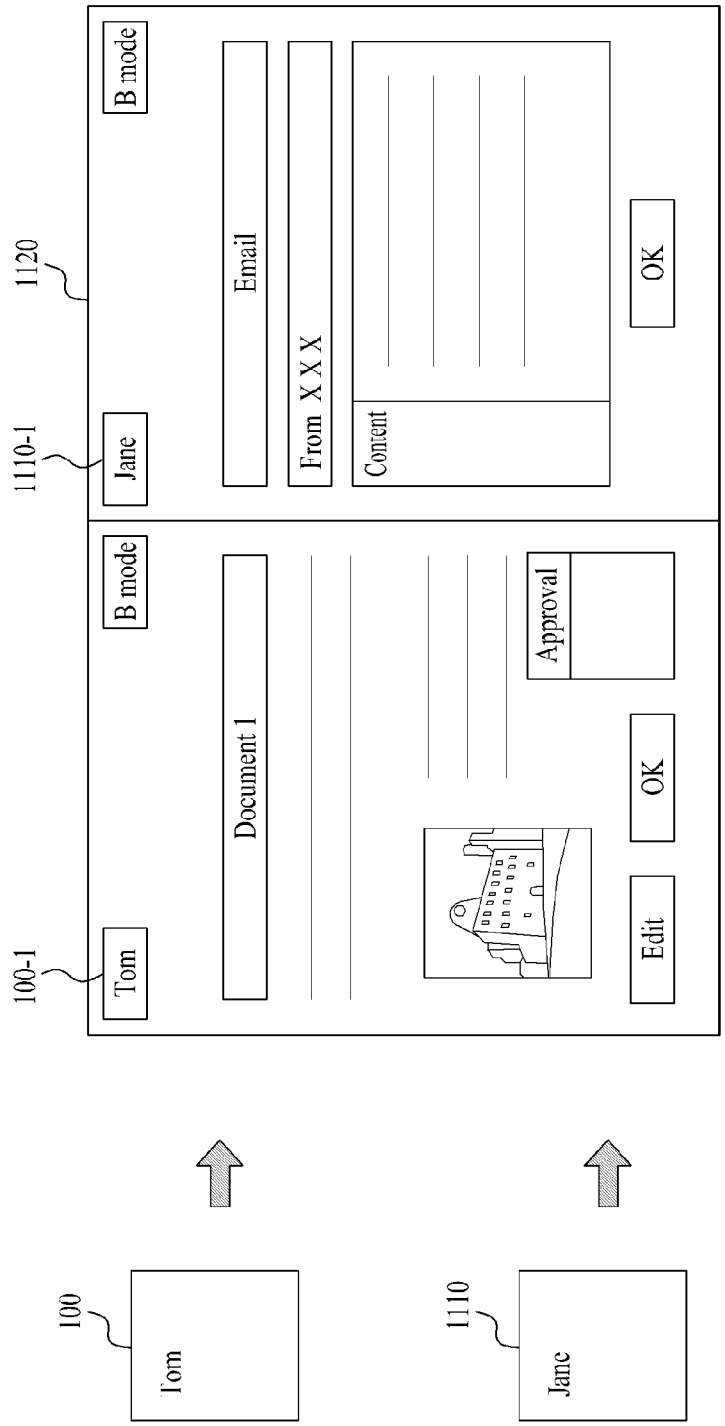

Furthermore, referring to FIG. 15D, when there exists a specific external terminal operating as a mother screen, the specific external terminal receives a screen corresponding to Document 1 as a mode screen of the mobile terminal 100 and a received email check screen as a mode screen of a sharable terminal 1110 and is then able to display the screen corresponding to the Document 1 and the received email check screen on first and second regions of a whole screen, respectively. In this case, an indicator 100-1/1110-1 indicating that a corresponding mode screen is the mode screen of a specific one of the terminals can be displayed on each of the regions.

Meanwhile, the mobile terminal 100 can check that the mode screen transmitted by the mobile terminal 100 itself is displayed on the sharable terminal by a prescribed scheme (cf. FIGS. 14A to 14C). In particular, when a partial region of the mode screen of the mobile terminal 100 is controlled to be displayed on the sharable terminal only, the mobile terminal 100 can confirm that the partial region is displayed as the mode screen of the mobile terminal 100 on the sharable terminal only. For instance, the checked scheme can include one of a popup window scheme, an overlay scheme, a screen partition scheme and the like. And, the confirmation operation can be performed in case of receiving an input of a confirm command from a user or can be performed arbitrarily by the controller 180.

Figure 16A:
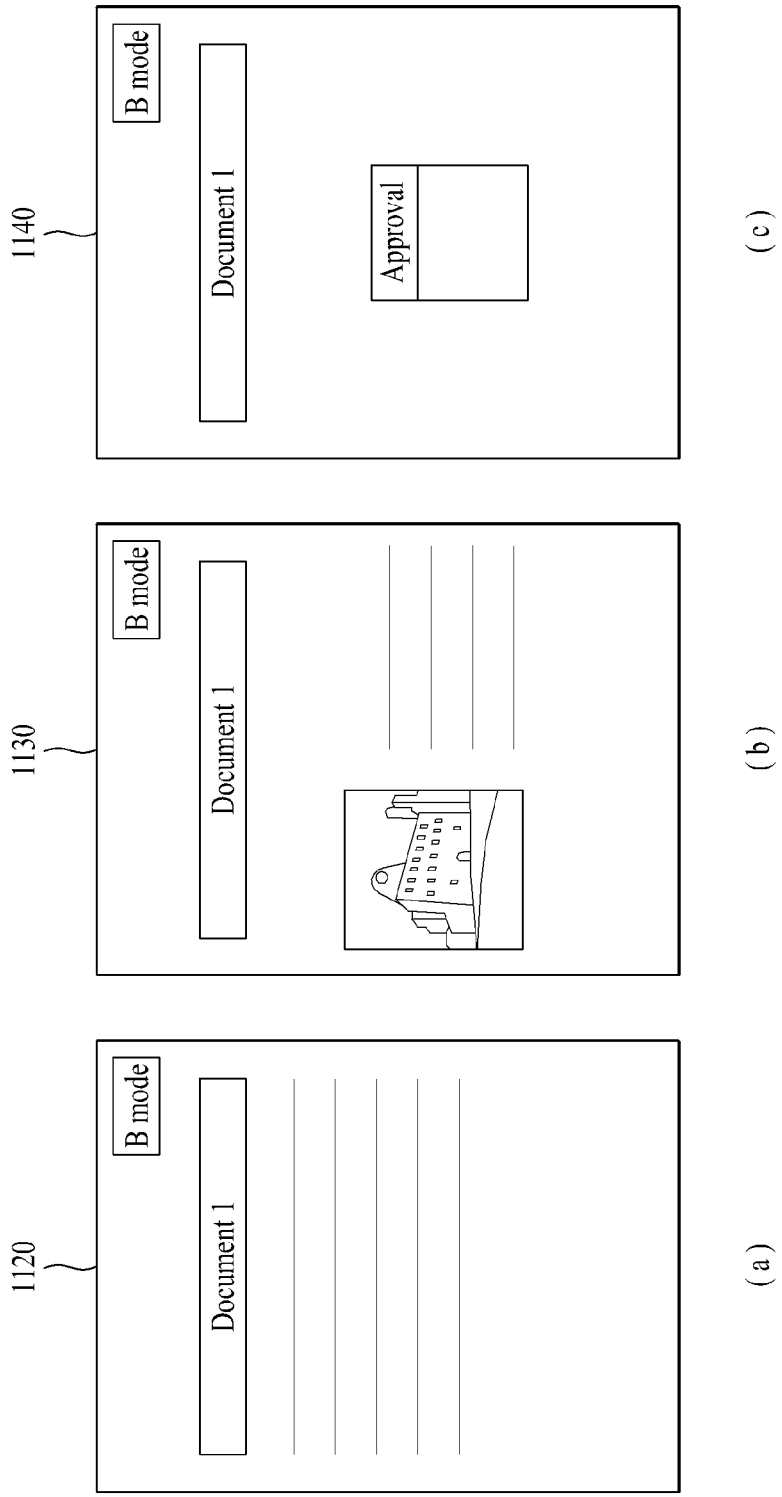
FIGS. 16A to 16C are diagrams for displaying a mode screen in a plurality of terminals by dividing the mode screen into a plurality of objects according to the present invention.
Figure 16B:
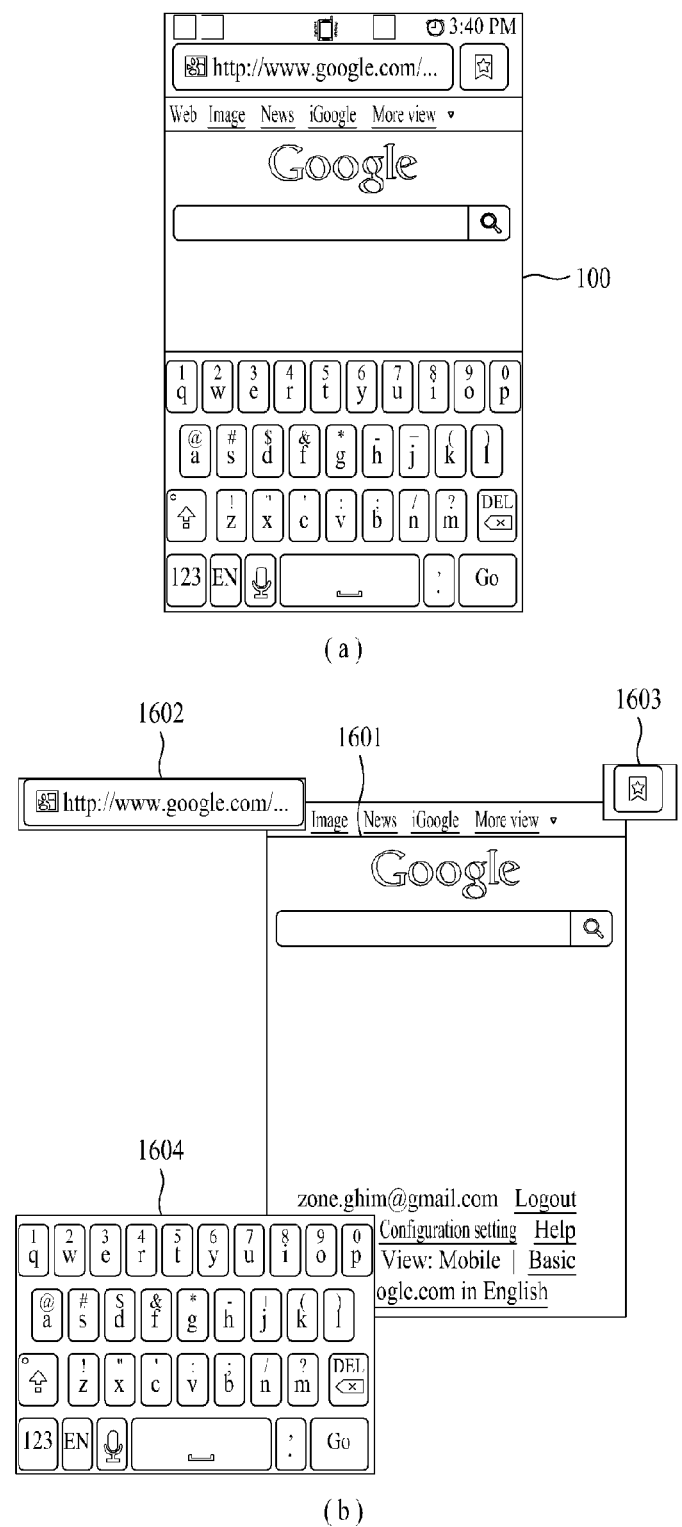
Figure 16C:
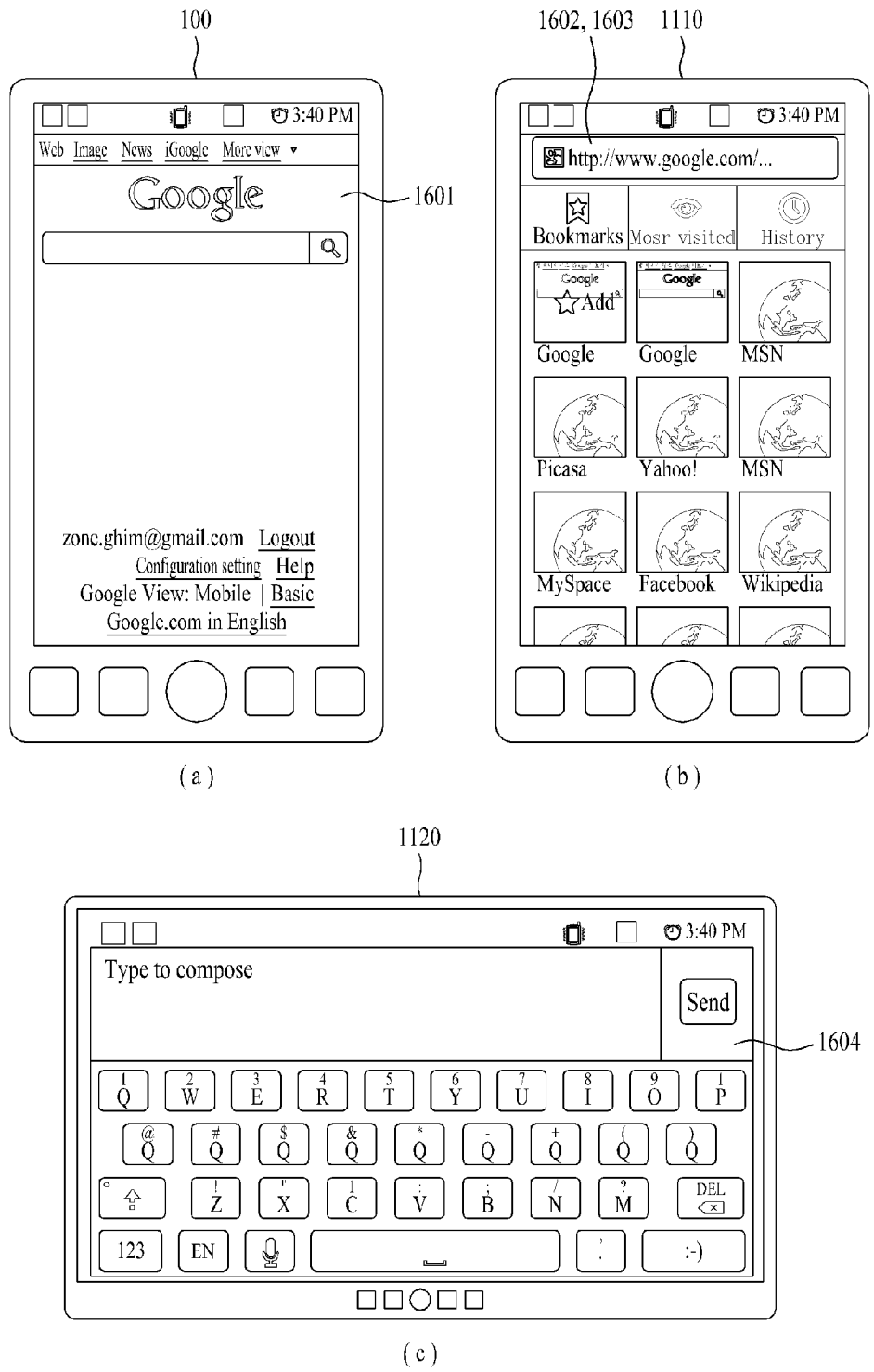

Next, FIGS. 16A to 16C are diagrams for displaying a mode screen in a plurality of terminals by dividing the mode screen into a plurality of objects according to the present invention.

According to the present invention, under the control of the controller 180, if a first mode screen includes a plurality of objects, the mobile terminal 100 controls a plurality of the objects to be displayed in a manner of being distributed on a plurality of sharable terminals, respectively (Case (1)), or is able to control a plurality of the objects to be displayed in a manner of being distributed on the mobile terminal 100 and at least one sharable terminal, respectively (Case (2)). In the case (1), the first mode screen is entirely displayed on the mobile terminal 100. In the case (2), a corresponding object included in the first mode screen can be displayed on the mobile terminal 100 only.

For the case (1), referring to FIG. 16A, the mobile terminal 100 controls a first object (e.g., a text region displayed on a screen top) in a screen (e.g., an example of the first mode screen) corresponding to Document 1 to be displayed on a first sharable terminal 1120 (FIG. 16A (a)), controls a second object (e.g., an image and text region displayed on a screen center) in the screen corresponding to Document 1 to be displayed on a second sharable terminal 1130 (FIG. 16A (b)), and controls a third object (e.g., an approval zone displayed on a screen bottom) in the screen corresponding to Document 1 to be displayed on a third sharable terminal 1130 (FIG. 16A (c)).

For the case (2), referring to FIG. 16B and FIG. 16C, the mobile terminal 100 recognizes a URL window 1602, a bookmark 1603, a webpage 1601 and a keyboard 1604 included in a webpage access screen (e.g., an example of the first mode screen) as objects and then displays the recognized objects 1602, 1603, 1601 and 1604 in a manner that the recognized objects 1602, 1603, 1601 and 1604 are distributed on a plurality of sharable terminals including the mobile terminal 100, respectively.

In particular, referring to FIG. 16C, the mobile terminal 100 controls the webpage 1601, the URL window 1602 and the bookmark 1603, and the keyboard 1604 to be displayed on the mobile terminal 100, the first sharable terminal 1110 and the second sharable terminal 1120, respectively.

Meanwhile, the mobile terminal 100 can recognize a my-image region, a counterpart image region, a substitute image region, a call time display region, a counterpart information display region and the like as objects of the first mode screen and then displays the recognized objects in a manner of distributing the recognized objects to a plurality of sharable terminals (possible to include the mobile terminal 100).

Meanwhile, a terminal (e.g., a sharable terminal or mobile terminal 100 included) for displaying a corresponding object can request an authentication procedure for displaying the corresponding object. And, the corresponding terminal can display the corresponding object only if the authentication procedure is validly completed. For instance, when a corresponding object itself or a mode screen including the corresponding object requires a security over a predetermined reference, the authentication procedure can be requested.

FIGS. 17A to 17D are diagrams for not displaying or identifiably displaying a partial region of a mode screen in a sharable terminal according to the present invention.

According to the present invention, the mobile terminal 100 can control at least one sharable terminal not to display a partial region of a first mode screen or to identifiably display the partial region under the control of the controller 180.

Figure 17A:
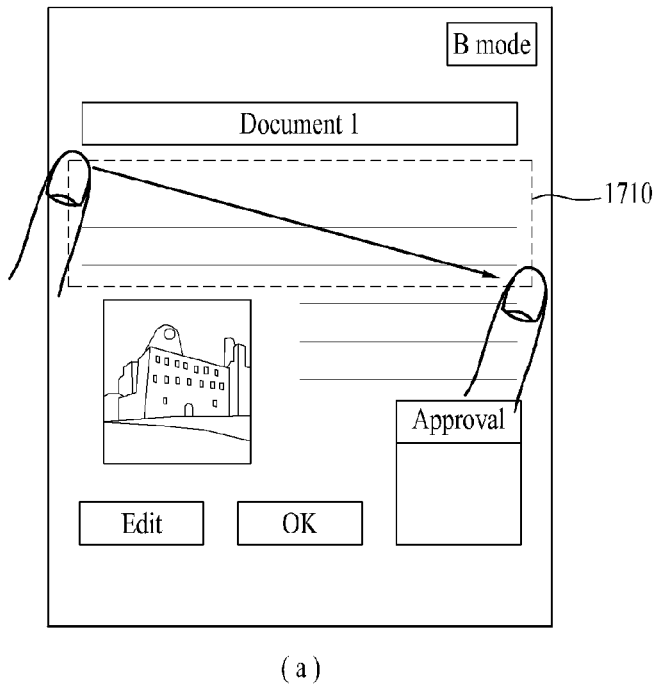
FIGS. 17A to 17D are diagrams for not displaying or identifiably displaying a partial region of a mode screen in an external terminal according to the present invention.
Figure 17A:
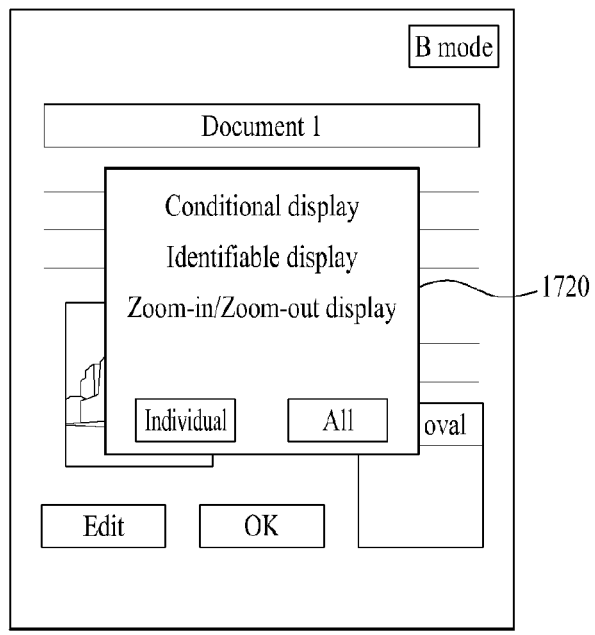

Referring to FIG. 17A, the mobile terminal 100 receives an input of a setting action on a partial region 1710 from a user (FIG. 17A (a)) and then displays a window 1720 for enabling the user to select a display effect on the partial region 1710 (FIG. 17A (b)).

For instance, the setting action on the partial region 1710 can include one of a touch & drag action from one corner of a diagonal line of the partial region 1710 to another corner, an action of drawing the partial region 1710, a touch action on a specific point belonging to the partial region 1710 for a predetermined period of time and the like. When the partial region 1710 is a specific object, a touch action on a prescribed point of the partial region 1710 can be included in the setting action. For instance, the selectable display effect can include at least one of a display restriction, an identifiable display, a zoom-in/zoom-out display and the like.

Figure 17B:
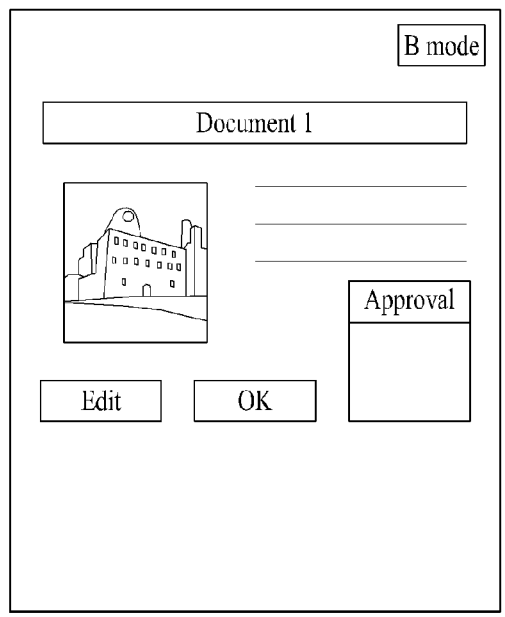

Referring to FIG. 17B, if the display restriction is selected in FIG. 17A, the mobile terminal 100 controls the rest of the first mode screen except the partial region 1710 to be displayed on the sharable terminal only.

Figure 17C:
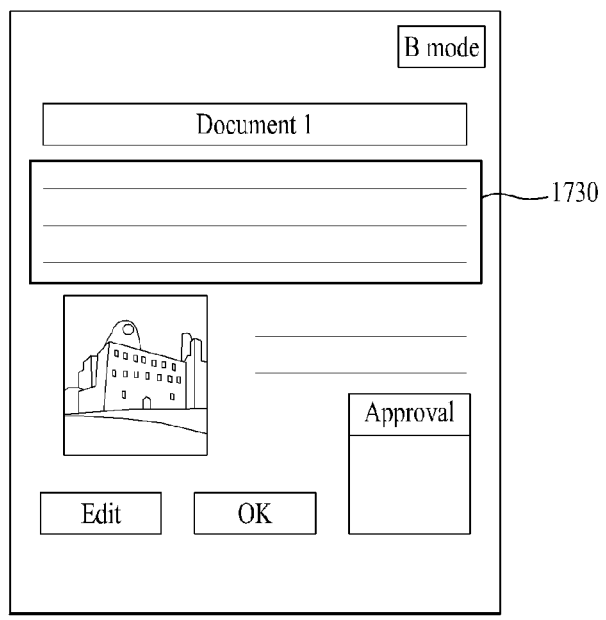

Referring to FIG. 17C, when the identifiable display is selected in FIG. 17A, the mobile terminal 100 can control the first mode screen having the partial region 1710 identifiably displayed to be displayed on the sharable terminal. For instance, the identifiable display can include one of a box treatment, a highlight treatment, a display in color different from that of the rest region, a display in font different from that of the rest region and the like.

Figure 17D:
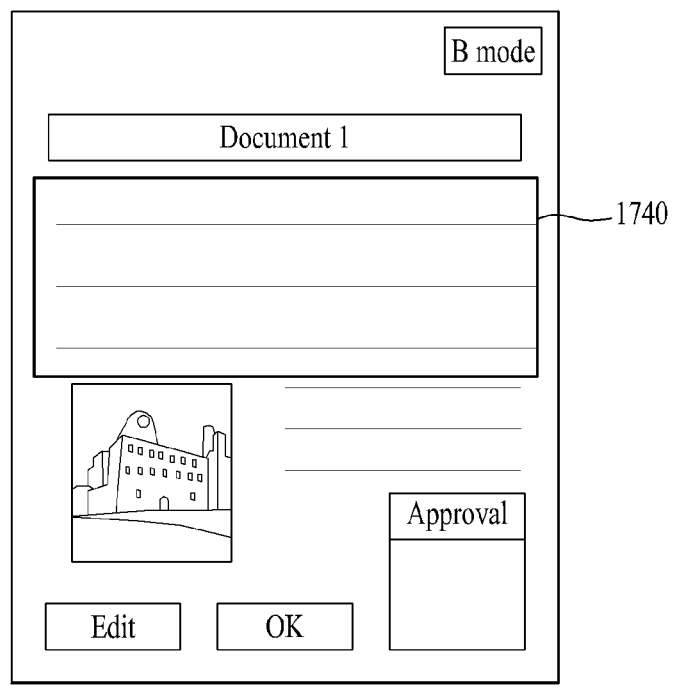

Referring to FIG. 17D, if the zoom-in/zoom-out display is selected in FIG. 17A, the mobile terminal 100 can control the first mode screen, in which the partial region 1710 is displayed by zoom-in or zoom-out, to be displayed on a sharable terminal.

Referring back to FIG. 12, in the controlling step S1240, the mobile terminal 100 controls a first mode screen to be displayed on at least one sharable terminal to correspond to a prescribed level (1-1) or controls a whole part or a portion of the first mode screen not to be displayed on the at least one sharable terminal to correspond to the prescribed level (1-2) (e.g., a case in which a my-mode screen is displayed on another terminal), under the control of the controller 180. Moreover, in the controlling step S1240, the mobile terminal 100 controls the display unit 151 to display a mode screen of at least one sharable terminal to correspond to a prescribed level (2-1) or controls the display unit 151 not to display a whole part or a portion of the mode screen of the at least one sharable terminal to correspond to the prescribed level (2-2) (e.g., a case in which a mode screen of another terminal is displayed on my terminal), under the control of the controller 180. This shall be described in detail with reference to the following drawings including FIG. 20.

Under the control of the controller 180, the mobile terminal 100 detects a signal related not to a currently activated first mode but to a second mode (e.g., example of a deactivated mode) (S1250). In particular, the controller 180 can further include a separate component for a signal detection or can include each component different in accordance with a type of a signal.

For instance, the signal related to the second mode can include a call transceiving, a message transceiving, a data transceiving via instant messaging service, or a data transceiving via a social networking service with a counterpart terminal corresponding to the second mode and can include a schedule alarm for a schedule corresponding to the second mode. Moreover, the signal related to the second mode can include a reception of call/message/others data in which a user information corresponding to the second mode is set to a transmitting side information.

In this case, the counterpart terminal corresponding to the second mode can include a counterpart terminal in which information (e.g., phone number, email address, ID subscribed to instant messaging service, ID subscribed to social networking service, etc.) is stored in a manner of being linked to a counterpart information management application (e.g., a phonebook, etc.) executed in the second mode. And, the schedule corresponding to the second mode can include a schedule stored in a manner of being linked to a schedule management application executed in the second mode. Moreover, the user information corresponding to the second mode can include user information (e.g., phone number, name, instant messaging service ID, email address, etc.) set for the second mode in consideration of a fact that a user information can be set different per mode on the mobile terminal 100.

In case of detecting the signal related to the second mode in the detecting step S1250, the mobile terminal 100 outputs a signal indication information via the output unit 150 under the control of the controller 180 (S1260).

For instance, the signal indication information is displayed on a prescribed region of the screen or within a popup window while the first mode screen keeps being displayed. The signal indication information is visually outputted using at least one of a text, an image, an icon, a lamp (e.g., LED lamp) and the like, is audibly outputted using at least one of an alarm sound, an alarm voice, an alarm bell sound and the like, or can be tactually outputted using vibration or the like.

Optionally, the outputting step S1260 is not performed in accordance with a user selection or can be interrupted in the course of being executed. And, an output type (this shall be described later) of the signal indication information can be determined in accordance with a user selection or a selection made by the controller 180.

Under the control of the controller 180, the mobile terminal 100 controls the signal indication information of the detected signal not to be displayed on at least one sharable terminal (S1270) or controls the signal indication information of the detected signal to be displayed on a specific terminal, which meets a prescribed condition, among at least one or more sharable terminals only (S1280).

In this case, the sharable terminal can include an external terminal currently displaying the first mode screen of the mobile terminal 100 under the control of the controller 180.

In the controlling step S1270, the controller 180 can control the sharable terminal not to display the signal indication information in order to avoid interrupting the display of the first mode screen in the sharable terminal or in order to keep the security of information on a mode in which a mode screen of the mobile terminal 100 is not shared.

In this case, the controller 180 can control the wireless communication unit 110 not to transmit the signal indication information to the sharable terminal or the company server 300. Alternatively, even if the company server 300 receives the signal indication information, it may not transmit the received signal indication information to the sharable terminal. Moreover, although the sharable terminal receives signal indication information, if it determines that the received signal indication information is the signal indication information on a mode different from its activated mode, it may not display the received signal indication information.

In the controlling step S1280, the controller 180 can control the wireless communication unit 110 to transmit the signal indication information to a specific terminal, which meets a prescribed condition, among the at least one or more sharable terminals only. The company server 300 receives the signal indication information from the mobile terminal 100 and then confirms a specific terminal that meets a prescribed condition. Only if the prescribed condition is met, the sharable terminal can display the received signal indication information.

For instance, the prescribed condition can include at least one of an external terminal having intimacy with the mobile terminal 100 over a predetermined level, an external terminal selected to share the signal indication information by a user of the mobile terminal 100, an external terminal related to the detected signal, and an external terminal stored as counterpart information corresponding to the second mode.

In particular, the external terminal having the intimacy with the mobile terminal 100 over the predetermined level can include one of a terminal having transceived a predetermined count of messages or calls with the mobile terminal 100 for a predetermined period of time, a terminal designated as a preferred counterpart by the mobile terminal 100 and the like. The external terminal related to the detected signal can include one of a terminal belonging to the same group of a counterpart terminal (this shall be described later) corresponding to the detected signal, a terminal of a participant of a schedule (this shall be described later) corresponding to the detected signal, a terminal transceiving a message with a counterpart terminal when the detected signal is a message transceiving, and the like. And, the external terminal stored as counterpart information corresponding to the second mode can include a terminal having its information (e.g., phone number, name, email address, instant messaging service ID, etc.) stored in a manner of being linked to a counterpart information management application executed in the second mode.

In the controlling step S1280, the mobile terminal 100 can set an open extent of the signal indication information to be different for at least one sharable terminal under the control of the controller 180. Of course, the open extent can be set in accordance with a user selection as well.

For instance, the signal indication information is set not to become open in the first sharable terminal, a signal type of the signal indication information is set to become open in the second sharable terminal, a generated hour and signal type of the signal indication information are set to become open in the third sharable terminal, and all the signal indication information can be set to become open in the fourth sharable terminal.

In the following description, the controlling step S1280 is explained in detail with reference to FIGS. 18A to 18D. For clarity and convenience of the following description, assume that a call signal related to a private mode is received in a business mode activated state.

FIGS. 18A to 18D are diagrams for displaying signal indication information in an external terminal when a mobile terminal detects a signal related to a deactivated mode according to the present invention.

Figure 18A:
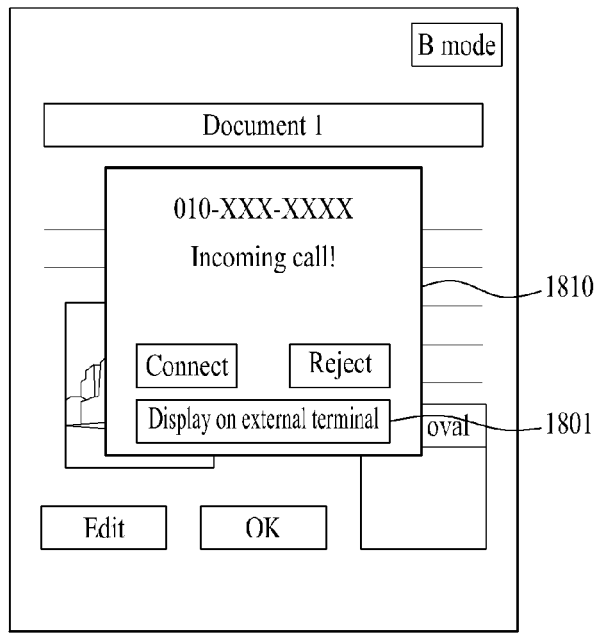
FIGS. 18A to 18D are diagram for displaying signal indication information in an external terminal when a mobile terminal detects a signal related to a deactivated mode according to the present invention.
Figure 18A:
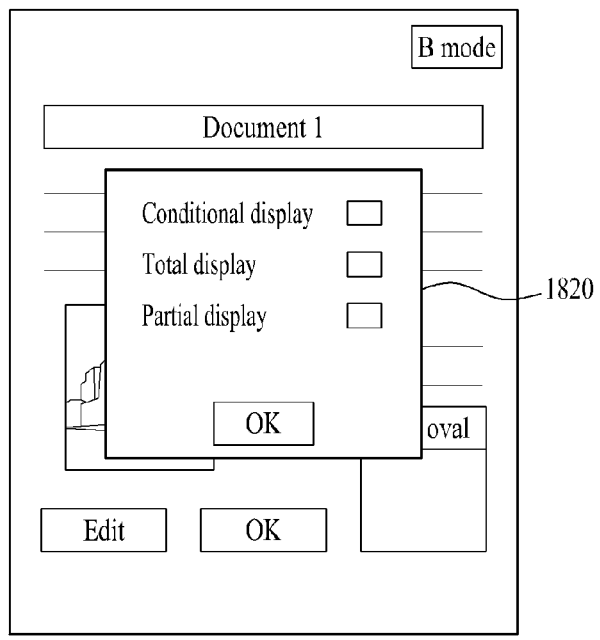

Referring to FIG. 18A, in case of receiving a call signal related to a private mode, the mobile terminal 100 can display an indication information 1810 indicating the call signal reception (FIG. 18A (a)) and displays a window 1820 for enabling a display condition of the indication information 1810 on a sharable terminal to be selected (FIG. 18A (b)). Of course, the display condition selecting process can be omitted. If the display condition selecting process is omitted, the indication information can be displayed on the sharable terminal, which meets a prescribed condition, only.

For instance, the indication information 1810 can include a counterpart information (e.g., a phone number, a name, etc.) on a counterpart having transmitted a call signal, a text indicating that a call signal has been received, a call connect key zone, a call reject key zone and the like. And, the display condition can include a display restriction (e.g., impossible to display indication information on any sharable terminal), a total display (e.g., indication information displayed on all sharable terminals), a partial display (e.g., indication information displayed on a sharable terminal that meets a prescribed condition), and the like. Moreover, a specific part, which is to be displayed on a sharable terminal, of a whole indication information can be included in the display condition. In this case, the specific part can be set per sharable terminal.

Figure 18B:
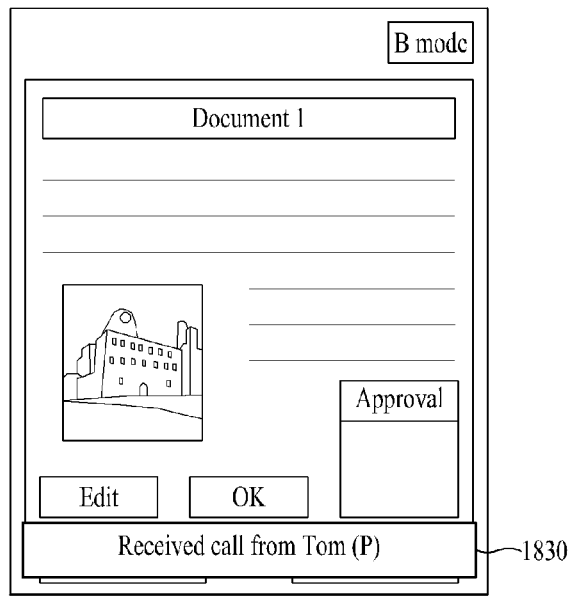
Figure 18C:
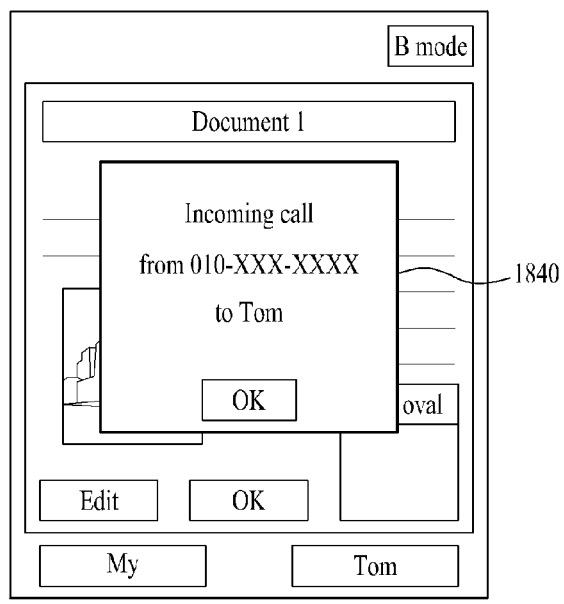
Figure 18D:
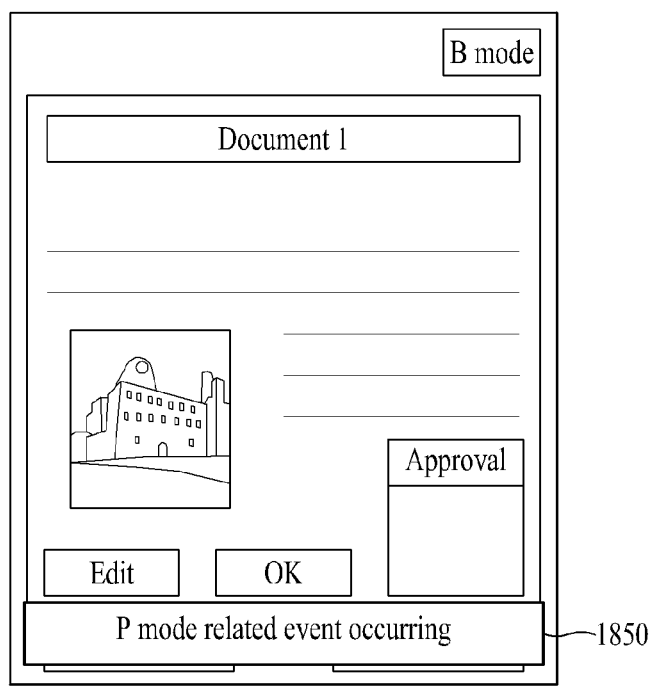

Referring to FIGS. 18B to 18D, the mobile terminal 100 controls a sharable terminal to display an information 1830 indicating a signal type (FIG. 18B), controls a sharable terminal to display an information 1840 indicating a signal type and a counterpart having transmitted a call signal (FIG. 18C), or can control a sharable terminal to display an information 1850 indicating a mode to which a detected signal corresponds (FIG. 18D).

Meanwhile, the mobile terminal 100 can control a sharable terminal to display a further detailed signal indication information if an intimacy with the mobile terminal 100 increases. And, the mobile terminal 100 can set a display extent or type of a signal indication information to be different per sharable terminal.

Referring again to FIG. 12, the mobile terminal 100 can switch a current mode to the second mode corresponding to the signal detected in the detecting step S1250 under the control of the controller 180. As the mobile terminal 100 switches the first mode to the second mode, the mobile terminal 100 deactivates the first mode and activates the second mode.

In particular, when activating the second mode, the mobile terminal 100 can execute a specific application indicated by the detected signal. For instance, if the detected signal is a call reception, the mobile terminal 100 executes a call application. If the detected signal is a message reception, the mobile terminal 100 can execute a message application.

In case of the switching to the second mode, the controller 180 determines whether a conditional access is set on the second mode. When the conditional access is set on the second mode, the current mode can be switched to the second mode only if an authentication procedure is validly performed.

For instance, when the first mode and the second mode are a private mode and a business mode, it can be said that a conditional access is set. Moreover, if the authentication procedure for the switching (or entry) to the second mode is successful, the authentication procedure can be skipped in case of performing a re-switching (or re-entry) to the second mode in the future. For instance, in case of a re-switching for a predetermined period of time (e.g., duty hours, a day, a week, etc.), a re-switching between a terminal-on and a terminal-off, or the like, it is able to skip the authentication procedure.

In the following description, the mode switching in multi-OS environment is explained in detail.

First of all, according to a first multi-OS scheme, while a private mode or a business mode is activated, if a command signal for a mode switching is detected, the mobile terminal 100 can activate the business mode or the private mode. According to a second multi-OS scheme, while a private mode or a business mode is activated, if a command signal for a mode switching is detected, the mobile terminal 100 can activate the business mode or the private mode.

In particular, when a business mode is switched to a private mode, if there exists an application previously executed in the private mode, an executed state of the previously-executed application is entered. If there does not exist an application previously executed in the private mode, HOME state (e.g., first scheme) of the private mode or HOME state (e.g., second scheme) of the business mode can be entered. This is applicable to the switching to the business mode from the private mode as well.

When the first mode is switched to the second mode, under the control of the controller 180, the mobile terminal 100 can control a first mode screen, which was displayed right before the switching to the second mode, to keep being displayed on at least one sharable terminal. In doing so, the mobile terminal 100 can display a screen of the second mode (hereinafter named a second mode screen) in accordance with the switching to the second mode using the display unit 151. This is to keep sharing the mode screen before the switching with another external terminal despite the mode switching.

Moreover, when the first mode screen is set to keep being displayed on the at least one sharable terminal despite the switching to the second mode, the mobile terminal 100 controls the display unit 151 to display a key zone for controlling the first mode screen on a prescribed region of the screen while the second mode screen is displayed (1) or can control the display unit 151 to display the first mode screen and the second mode screen on a first region and a second region of the screen, respectively, in a manner of partitioning the screen into a plurality of regions including the first region and the second region (2), under the control of the controller 180.

This is described in detail with reference to FIGS. 19A to 19C as follows. For clarity and convenience of the following description, assume that the mobile terminal 100 has switched a business mode to a private mode. Assume that a sharable terminal activates the business mode. And, assume that a screen corresponding to Document 1 was displayed as a mode screen of the business mode right before the switching to the private mode.

Figure 19A:
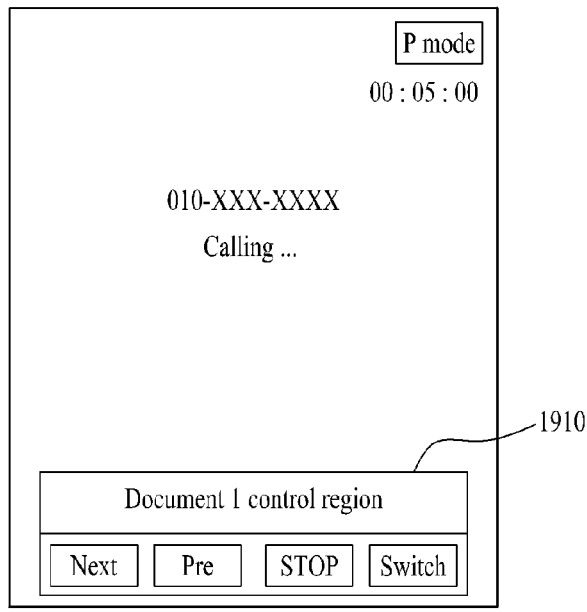
FIGS. 19A to 19C are diagrams of screen configurations for a method of controlling a mode screen in case of switching to another mode, while the mode screen is shared, according to the present invention.
Figure 19B:
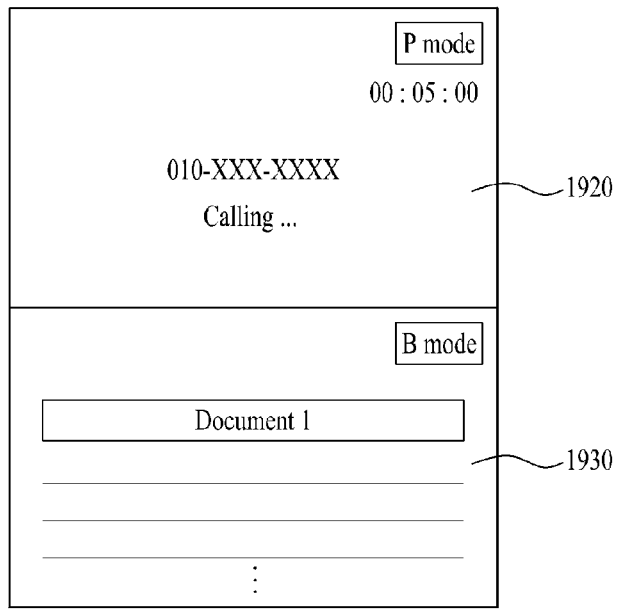
Figure 19C:
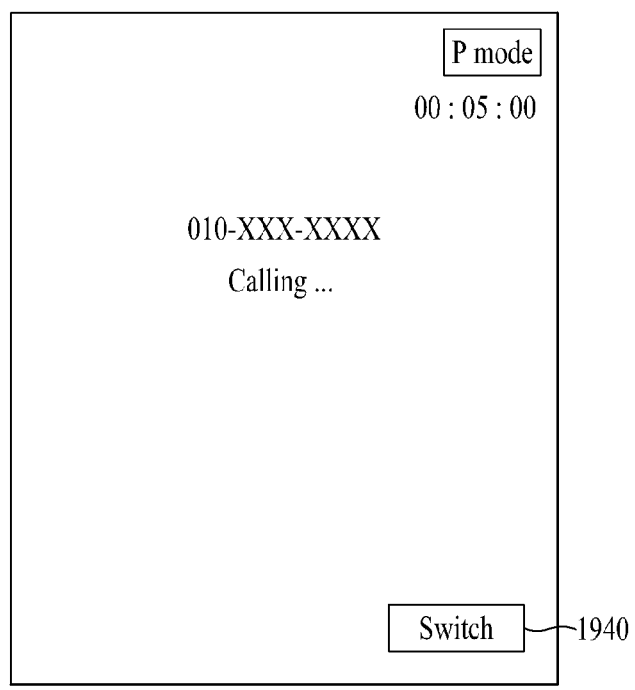

FIGS. 19A to 19C are diagrams of screen configurations for a method of controlling a mode screen in case of switching to another mode, while the mode screen is shared, according to the present invention.

Referring to FIGS. 19A to 19C, as a call signal received in an activated state of a private mode is connected, the mobile terminal performs a speech call and can display a voice call connection screen as a mode screen of the private mode.

In particular, referring to FIG. 19A, while the voice call connection screen is displayed, the mobile terminal 100 can display a key zone 1910 on a prescribed region of the screen to control a display of the screen corresponding to Document 1 in a sharable region. For instance, the key zone 1910 can include a shift key to a next page (Next), a shift key to a previous page (Pre), a display stop key (STOP), a mode switch key (Switch) and the like.

Therefore, a user can input a display control command for the screen corresponding to Document 1 shared with a sharable terminal by manipulating the key zone 1910.

Referring to FIG. 19B, the mobile terminal 100 partitions the screen into a plurality of regions including a first region and a second region and is then able to display the voice call connection screen and the screen corresponding to Document 1 on the first region 1920 and the second region 1930, respectively. In this case, if the first region 1920 is activated, it can be said that the private mode is activated. If the second region 1930 is activated, it can be said that the business mode is activated.

Therefore, as the second region 1930 is activated, the user can input the display control command for the screen corresponding to Document 1 shared with the sharable terminal.

Referring to FIG. 19C, if a key 1940 for receiving an input of a switching command for a switching to the business mode is selected, the mobile terminal 100 switches a current mode to the business mode. As the business mode is activated, the mobile terminal 100 can receive an input of the display command signal for the screen corresponding to Document 1.

In the following description, when a mode screen is shared with a plurality of terminals capable of implementing a plurality of modes, a method of controlling a display of a shared mode screen to correspond to a prescribed level is explained.

Figure 20:
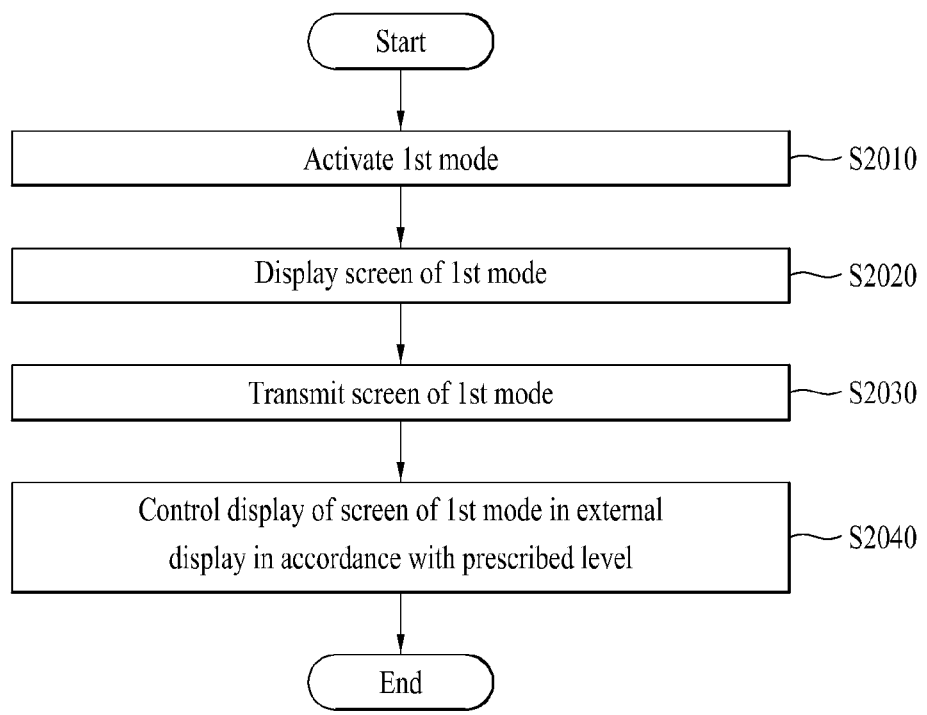
FIG. 20 is a second flowchart for a method of controlling a mode screen display in a mobile terminal according to one embodiment of the present invention.
Figure 21:
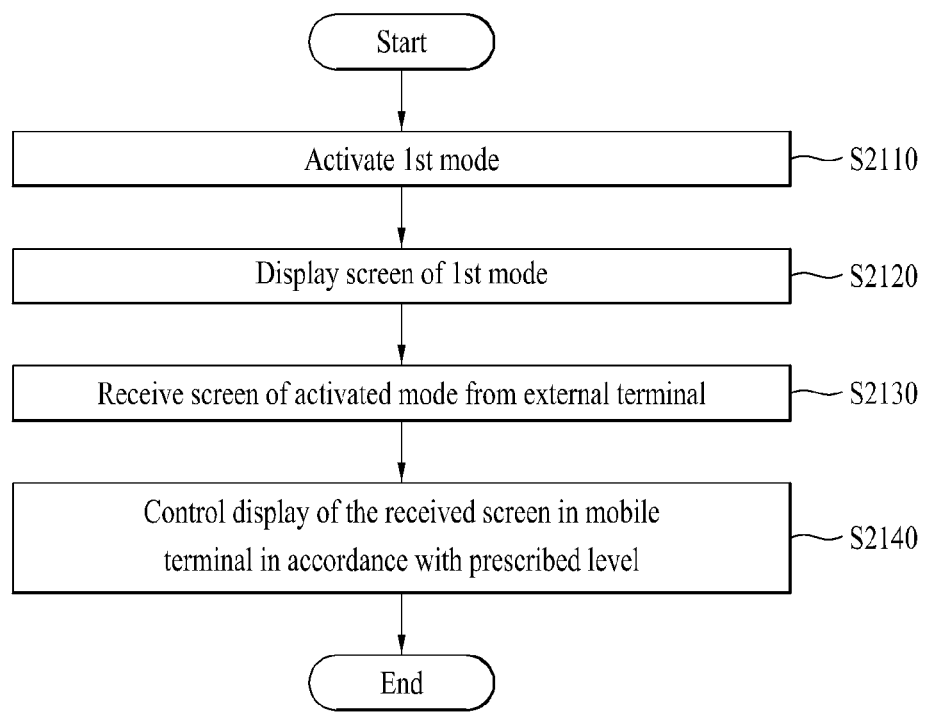
FIG. 21 is a third flowchart for a method of controlling a mode screen display in a mobile terminal according to one embodiment of the present invention.

FIG. 20 is a second flowchart for a method of controlling a mode screen display in a mobile terminal according to one embodiment of the present invention. And, FIG. 21 is a third flowchart for a method of controlling a mode screen display in a mobile terminal according to one embodiment of the present invention. For clarity and convenience of the following description, assume that a plurality of modes include a first mode and a second mode.

Referring to FIG. 20, the mobile terminal 100 transmits a first mode screen of a currently activated first mode using the wireless communication unit 110 under the control of the controller 180 (S2030).

In the transmitting step S2030, the mobile terminal 100 transmits the first mode screen to each of at least one or more sharable terminals to correspond to a prescribed level (1), transmits the first mode screen to the company server 300 to enable the first mode screen to be transmitted to at least one sharable terminal to correspond to a prescribed level (2), or transmits the first mode screen to a sharable terminal collectively to enable a display restriction to be performed by the sharable terminal in accordance with a prescribed level.

In this case, the sharable terminal can include an external terminal capable to sharing a mode screen with the mobile terminal 100 or an external terminal in the course of sharing the mode screen with the mobile terminal 100 (This shall be described in detail later.). The sharable terminal can be in the activated state of the first mode like the mobile terminal 100. In this case, the first mode can include a business mode. In case of attempting to share a mode screen with an external terminal having activated a mode different from its mode, the mobile terminal 100 can control the wireless communication unit 110 to transmit a mode switching request signal to the external terminal in the activated state of the different mode under the control of the controller 180.

The descriptions of the sharable terminal and the mode switching request signal can refer to the former descriptions in this disclosure.

Moreover, the prescribed level can include at least one of a level of a content displayed on the first mode screen, a level of the at least one sharable terminal, and a level of the mobile terminal 100. In particular, the level of the content can include one of a level set on the content itself, a level of an application associated with the content, a level of data associated with the content and the like. The level of the sharable terminal or the mobile terminal can be determined in accordance with an in-company rank, a duty property, a belonging department and the like of a user (or a possessor) of the corresponding terminal.

The mobile terminal 100 controls the first mode screen to be displayed on the at least one sharable terminal to corresponding to the prescribed level (This shall be described in detail later.) under the control of the controller 180 (S2040).

The controlling step S2040 is described in detail as follows.

First of all, according to a first case, the mobile terminal 100 compares a level of the mobile terminal 100 to a level of at least one sharable terminal under the control of the controller 180. In accordance with a result of the comparison, the mobile terminal 100 controls the whole part or potion of a first mode screen not to be displayed on the sharable terminal having the level lower than that of the mobile terminal 100. In accordance with the result of the comparison, the mobile terminal 100 can control the whole part of the first mode screen to be displayed on the sharable terminal having the level equal to or higher than that of the mobile terminal 100.

Secondly, according to a second case, under the control of the controller 180, the mobile terminal 100 determines a level of at least one sharable terminal, controls a first mode screen to be displayed on a terminal having a highest level among the at least one or more sharable terminals, and controls the first mode screen not to be displayed on the rest of the sharable terminals.

Thirdly, according to a third case, under the control of the controller 180, the mobile terminal 100 compares a level of a content displayed on a first mode screen to a level of at least one sharable terminal. In accordance with a result of the comparison, the mobile terminal 100 controls the whole part or portion of the first mode screen not to be displayed on the sharable terminal having a level lower than that of the content. In accordance with the result of the comparison, the mobile terminal 100 controls the entire first mode screen to be displayed on the sharable terminal having the level equal to or higher than that of the content.

Moreover, in the transmitting step S2030, under the control of the controller 180, the mobile terminal 100 controls the wireless communication unit 110 not to transmit the first mode screen to the sharable terminal having the level lower than the level of the mobile terminal 100 (or the level of the content) or to transmit a portion of the first mode screen to correspond to a prescribed level (1). Alternatively, the mobile terminal 100 can control the wireless communication unit 110 to transmit the whole first mode screen to the sharable terminal having the level equal to or higher than the level of the mobile terminal 100 (or the content level) under the control of the controller 180 (2).

This is explained in detail with reference to FIGS. 22 to 24C as follows. For clarity and convenience of the following description, assume that a business mode is activated in the mobile terminal and a plurality of sharable terminals.

Figure 22:
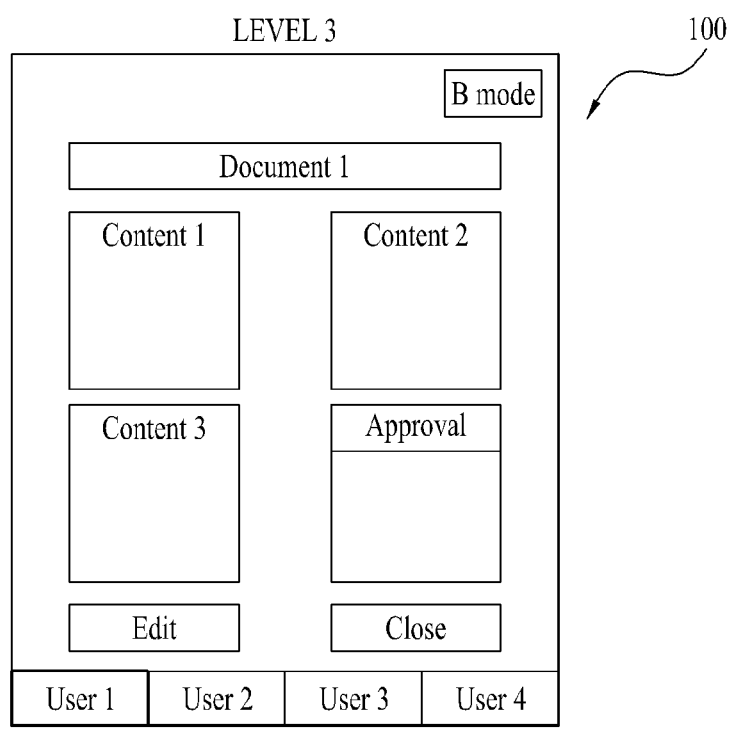
FIG. 22 is a diagram for displaying a mode screen of a currently activated mode in a mobile terminal according to the present invention.

FIG. 22 is a diagram for displaying a mode screen of a currently activated mode in a mobile terminal according to the present invention.

Referring to FIG. 22, the mobile terminal 100 executes a document read/search application. And, a screen (e.g., example of a first mode screen) corresponding to Document 1 is correspondingly displayed. In this case, assume that a level of the mobile terminal 100 or a level of Document 1 displayed on the screen is Level 3.

Figure 23A:
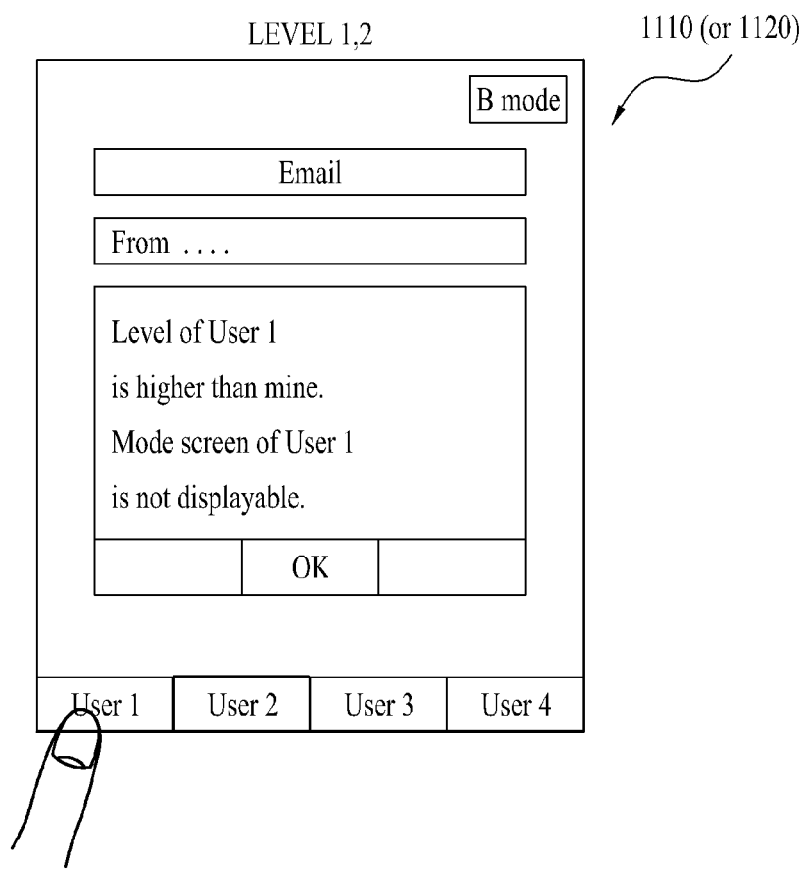
FIG. 23A and FIG. 23B are first diagrams for displaying a mode screen in an external terminal in accordance with a prescribed level according to the present invention.
Figure 23B:
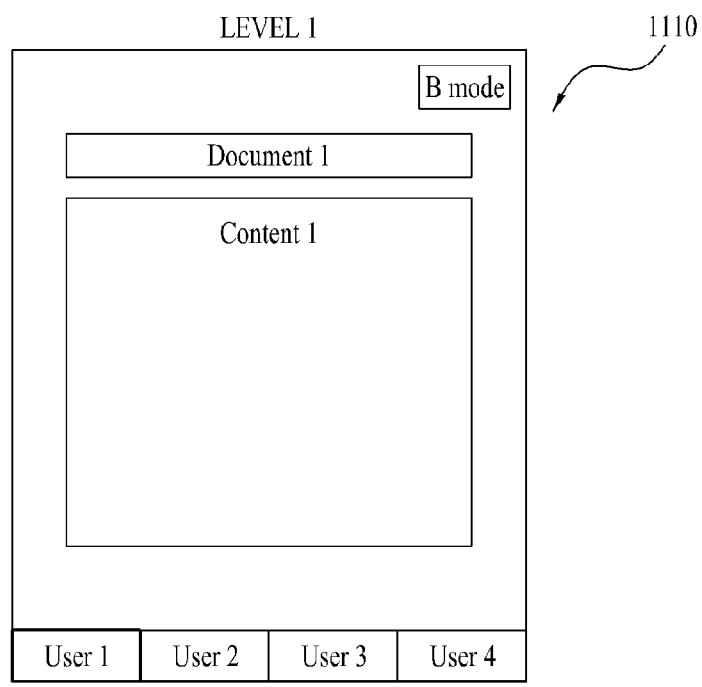
Figure 23B:
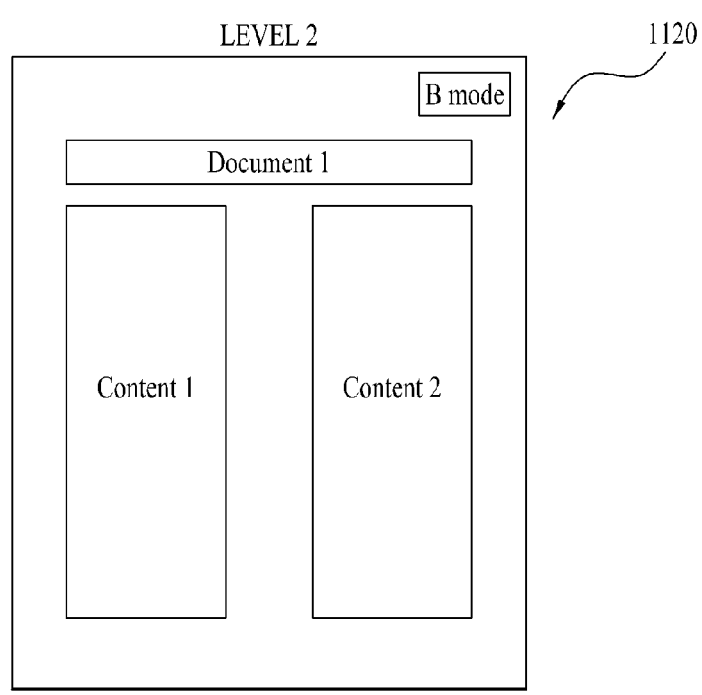

FIG. 23A and FIG. 23B are first diagrams for displaying a mode screen in an external terminal in accordance with a prescribed level according to the present invention.

In FIG. 23A and FIG. 23B, a first mode screen is displayed on a sharable terminal having a level lower than that of the mobile terminal 100 or Document 1. For clarity and convenience of the following description, assume that a level of the sharable terminal is set to Level 1 or Level 2 lower than Level 3.

Referring to FIG. 23A, in case of receiving an input of a display command for a mode screen of the mobile terminal 100, a sharable terminal 1110 or 1120 can output an information indicating that the mode screen of the mobile terminal 100 is not displayable since a level of the mobile terminal 100 or Document 1 is higher than a level of the sharable terminal 1110 or 1120.

Alternatively, the sharable terminal 1110 or 1120 may not display the mode screen of the mobile terminal without outputting the information indicating that the mode screen of the mobile terminal 100 is not displayable.

Referring to FIG. 23B, in displaying the mode screen of the mobile terminal 100, the first sharable terminal 1110 displays a region Content 1 of a screen corresponding to Document 1 to correspond to Level 1 that is the level of the first sharable terminal 1110 (FIG. 23B (a)). And, the second sharable terminal 1120 can display a region Content 1 and a region Content 2 of the screen corresponding to Document 1 to correspond to Level 2 that is the level of the second sharable terminal (FIG. 23B (b)).

Figure 24A:
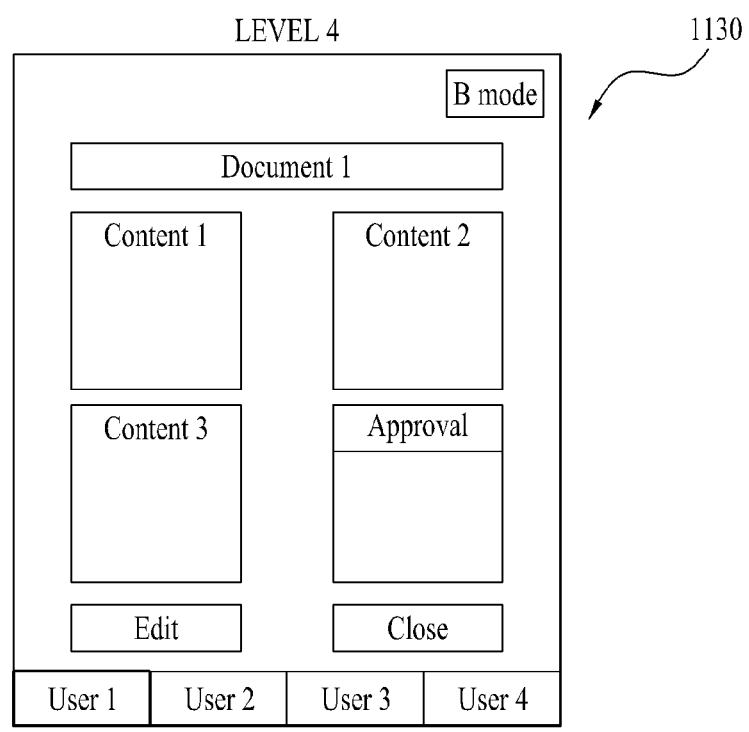
FIGS. 24A to 24C are second diagrams for displaying a mode screen in an external terminal in accordance with a prescribed level according to the present invention.
Figure 24B:
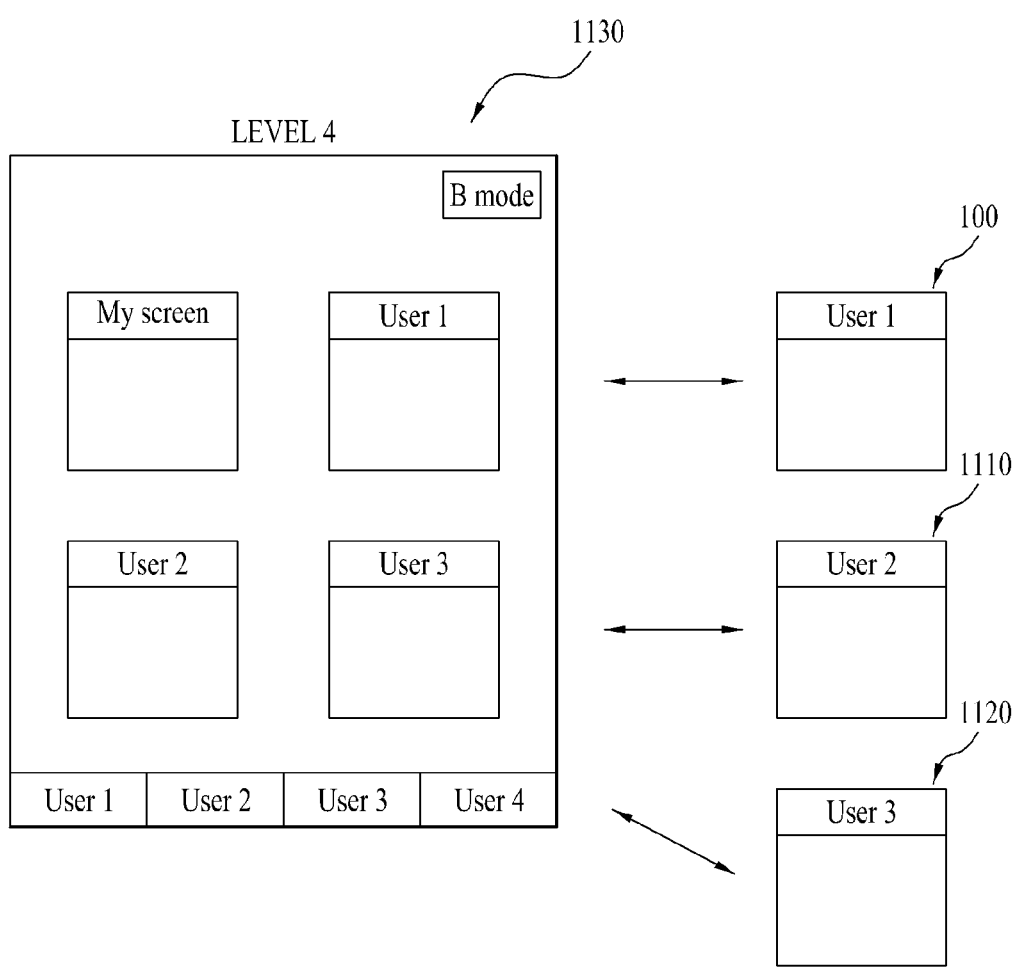
Figure 24C:
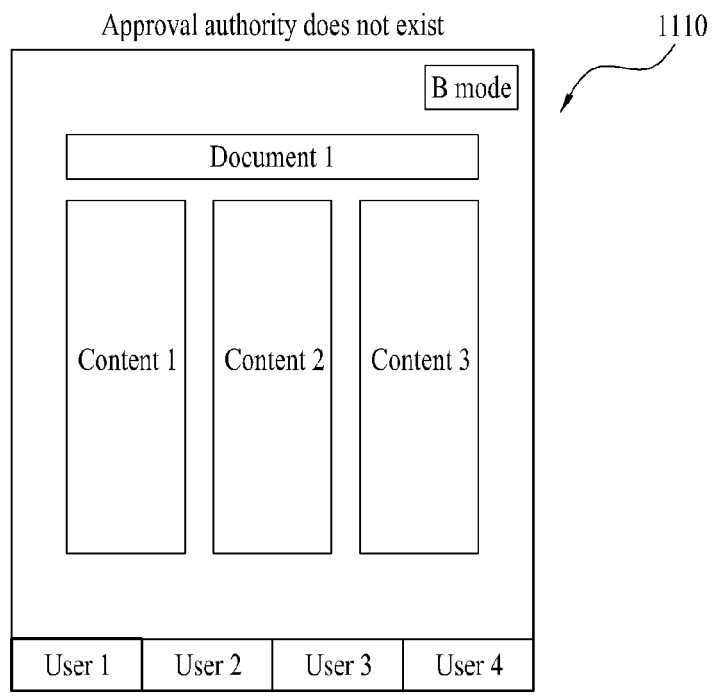
Figure 24C:
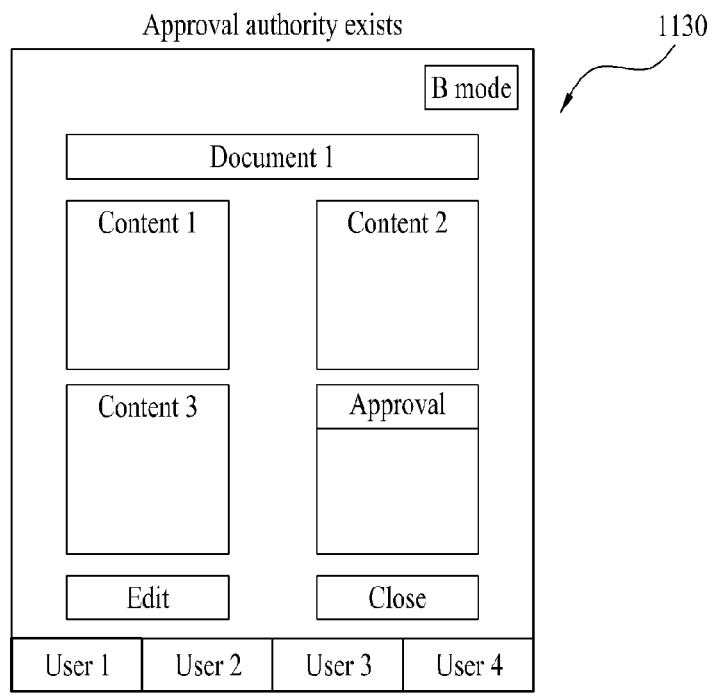

FIGS. 24A to 24C are second diagrams for displaying a mode screen in an external terminal in accordance with a prescribed level according to the present invention.

In FIGS. 24A to 24C, a first mode screen is displayed on a sharable terminal having a level equal to or higher than that of the mobile terminal 100 or Document 1. For clarity and convenience of the following description, assume that a level of the sharable terminal is set to Level 4 higher than a level of the mobile terminal 100 or Document 1. Of course, a level of the sharable terminal can be set to Level 3 equal to a level of the mobile terminal 100 or Document 1.

Referring to FIG. 24A, a third sharable terminal 1130 has a level set to Level 4 higher than a level of the mobile terminal 100. Therefore, the third sharable terminal 1130 can display the whole mode screen of the mobile terminal 100.

Referring to FIG. 24B, since a level of a mode screen of the third sharable terminal 1130 is set to Level 4 that is the highest level among a plurality of sharable terminals (e.g., the mobile terminal 100 and first to third sharable terminals 1110, 1120 and 1130), each of the mobile terminal 100, the first sharable terminal 1110 and the second sharable terminal 1120 can display the mode screen. In doing so, each of the mobile terminal 100, the first sharable terminal 1110 and the second sharable terminal 1120 displays a mode screen of its own only or can display a mode screen of the terminal having the level equal to or lower than that of the corresponding terminal.

Referring to FIG. 24C, when an approval region is included in a screen corresponding to Document 1, regions of the screen corresponding to Document 1 except the approval region are displayed on a sharable terminal 1110 having no approval authority. And, a whole screen corresponding to Document 1 including the approval region can be displayed on the sharable terminal 1130 having the approval authority.

Referring to FIGS. 22 to 24C, each of the mobile terminal 100 and first to third sharable terminals 1110, 1120 and 1130 includes a terminal identity region, in which indicators of terminals (e.g., my terminal or user terminal included) sharing a mode screen are contained, provided to a prescribed region of a screen and can identifiably display the indicator of the terminal corresponding to a currently displayed mode screen. If a specific indicator included in the terminal identity region is selected, a display command signal for the mode screen of the terminal corresponding to the selected specific indicator can be input. Moreover, the indicator corresponding to the terminal having a level higher than a my-terminal level or the terminal, which is displaying a content of a terminal having a level higher than a level of my terminal, is displayed as a selection-impossible state (e.g., blurred, dotted-line box, etc.) or may not be displayed as all.

Of course, each of the mobile terminal 100 and first to third sharable terminals 1110, 1120 and 1130 can display a mode screen of another terminal (i.e., a mode screen provided by another terminal) and the my-mode screen on a single screen or can display the corresponding mode screens in a manner of turning pages.

Referring now to FIG. 20, in the controlling step S2040, when the first mode screen is constructed with at least one or more objects, the mobile terminal 100 can control the at least one object to be displayed on at least one sharable terminal in a manner of being distributed on the at least one sharable terminal to correspond to a prescribed level under the control of the controller 180.

When the first mode screen includes a plurality of objects, a plurality of the objects can be displayed in a manner of being distributed on the mobile terminal 100 and at least one sharable terminal to correspond to a prescribed level. In this case, the objects displayed on the different terminals are different from each other or can be identical to each other entirely or in part.

Moreover, a displayable level or a non-displayable level can be set on each of a plurality of the objects included in the first mode screen. The corresponding object is displayed on the terminal having a level equal to or higher than the set displayable level. Yet, the corresponding object is not displayable on the terminal having a level equal to or lower than the set non-displayable level.

This is explained with reference to FIG. 25A and FIG. 25B as follows. For clarity and convenience of the following description, assume that a content 1 region, a content 2 region, a content 3 region and an approval region are included in a first mode screen.

Figure 25A:
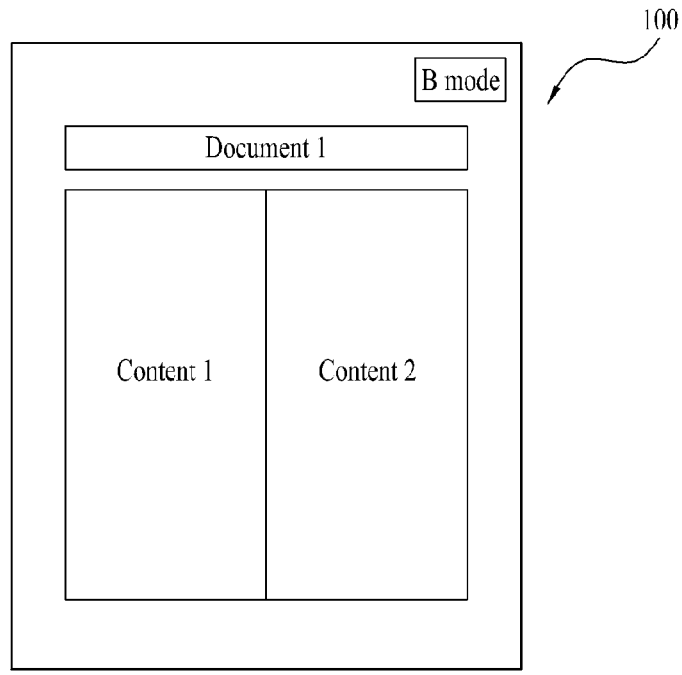
FIG. 25A and FIG. 25B are diagrams for displaying a plurality of objects included in a mode screen on a plurality of terminals in accordance with a prescribed level, respectively, according to the present invention.
Figure 25A:
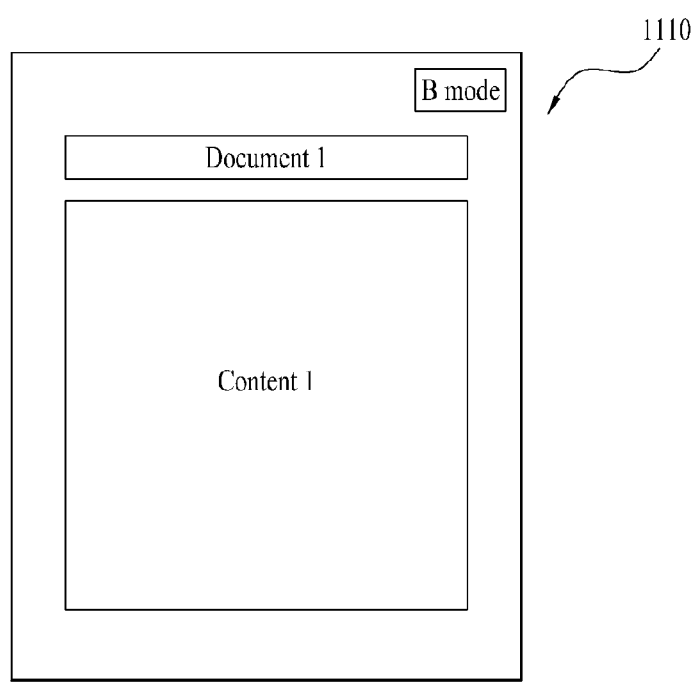
Figure 25B:
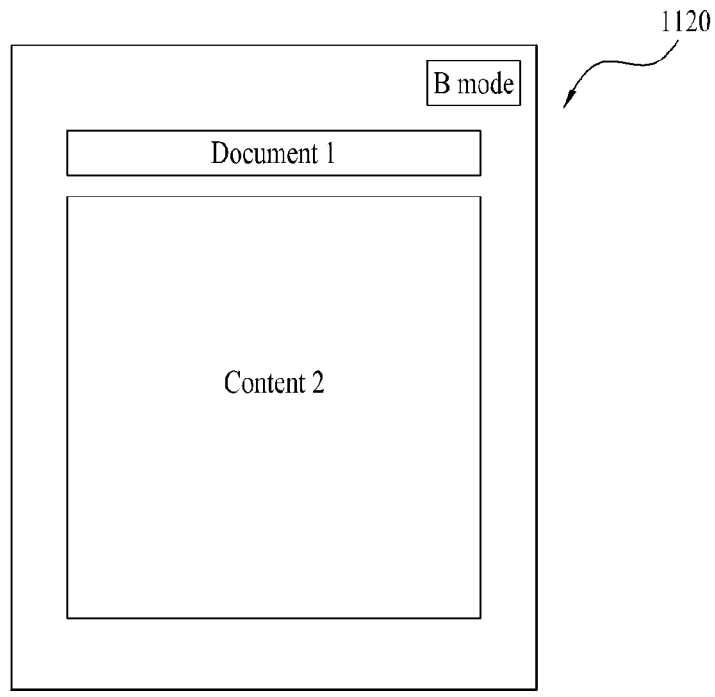
Figure 25B:
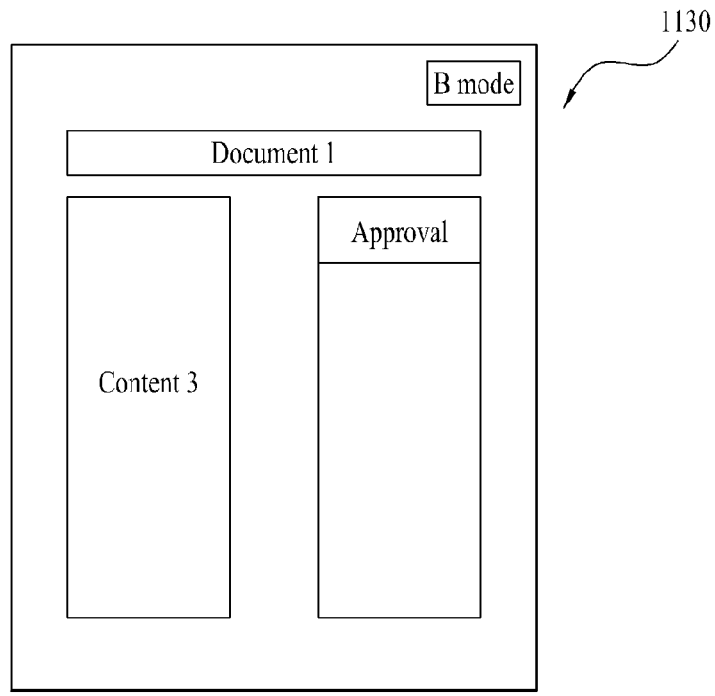

FIG. 25A and FIG. 25B are diagrams for displaying a plurality of objects included in a mode screen on a plurality of terminals in accordance with a prescribed level, respectively, according to the present invention.

Referring to FIG. 25A, the mobile terminal 100 displays a content 1 region and a content 2 region to correspond to its level set to Level 3 (FIG. 25A (a)), while a first sharable terminal 1110 can display the content 1 region to correspond to its level set to Level 1 (FIG. 25A (b)).

Referring to FIG. 25B, a second sharable terminal 1120 displays a content 2 region to correspond to its level set to Level 2 (FIG. 25B (a)), while a third sharable terminal 1130 can display a content 3 region and an approval region to correspond to its level set to Level 4 (FIG. 25B (b)).

Referring now to FIG. 20, in the controlling step S2040, the mobile terminal 100 grants a control authority for the first mode screen to at least one sharable terminal to correspond to a prescribed level and can control the at least one sharable terminal to display a user interface to execute the granted control authority, under the control of the controller 180.

In other words, the control authority can differ per sharable terminal, whereby the user interface to execute the control authority can be configured different. Moreover, the higher the level of the sharable terminal gets, the higher the control authority to be granted becomes.

This is explained in detail with reference to FIGS. 26A to 26C as follows.

Figure 26A:
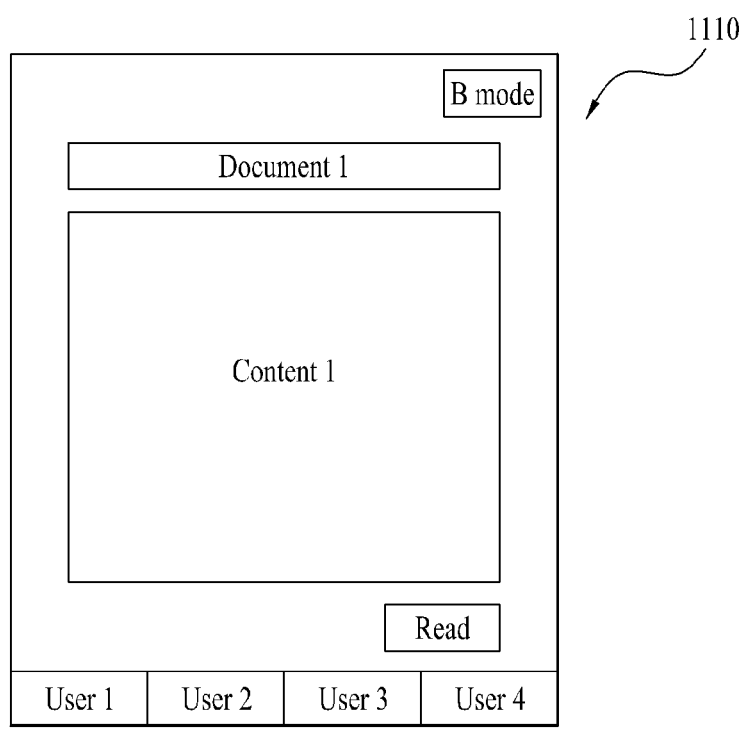
FIGS. 26A to 26C are diagrams of screen configurations for displaying mode screen control authorities of a plurality of external terminals in accordance with a prescribed level, respectively, according to the present invention.
Figure 26B:
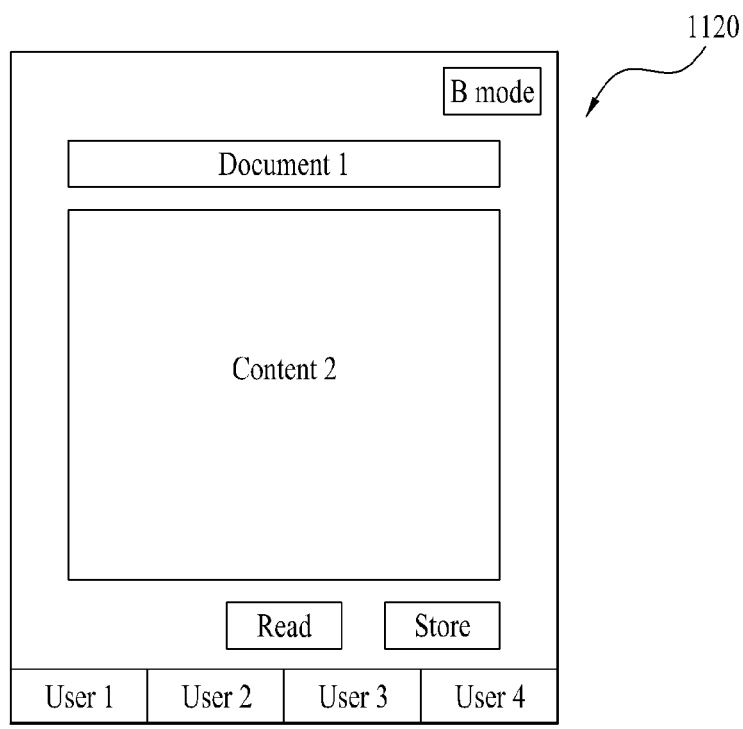
Figure 26C:
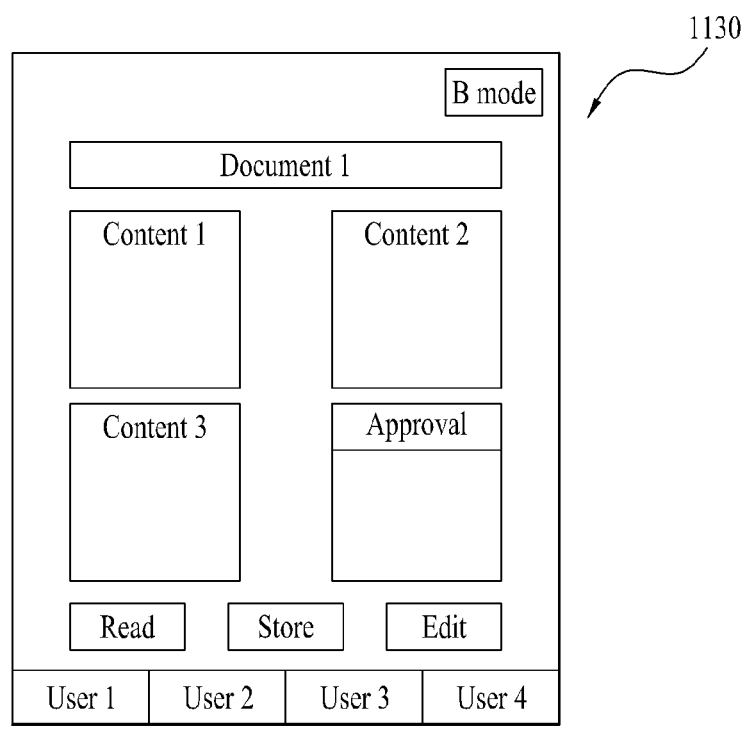

FIGS. 26A to 26C are diagrams of screen configurations for displaying mode screen control authorities of a plurality of external terminals in accordance with a prescribed level, respectively, according to the present invention.

Referring to FIG. 26A, in a first sharable terminal 1110 having a level set to Level 1, a read authority is granted as a control authority for a first mode screen and a key zone (READ) for executing the read authority can be provided to a screen of the first sharable terminal 1110.

Referring to FIG. 26B, in a second sharable terminal 1120 having a level set to Level 2, a read authority and a store authority are granted as control authorities for a first mode screen and a key zone (READ) for executing the read authority and a key zone (STORE) for executing the store authority can be provided to a screen of the second sharable terminal 1120.

Referring to FIG. 26C, in a third sharable terminal 1130 having a level set to Level 4, a read authority, a store authority and an edit authority are granted as control authorities for a first mode screen and a key zone (READ) for executing the read authority, a key zone (STORE) for executing the store authority and a key zone (EDIT) for executing the edit authority can be provided to a screen of the third sharable terminal 1130.

Moreover, the mobile terminal 100 receives a screen of a currently activated mode of at least one sharable terminal using the wireless communication unit 110 and is then able to control the display unit 151 to display the received screen to correspond to a prescribed level under the control of the controller 180. And, the corresponding details can refer to the descriptions with reference to FIG. 21.

In the following description, a reception of a mode screen is explained.

First of all, referring to FIG. 21, the mobile terminal 100 receives a mode screen of a currently activated mode of at least one sharable terminal using the wireless communication unit 110, under the control of the controller 180 (S2130). In this case, regarding the sharable terminal, the former description can be referred to.

In the receiving step S2130, the mobile terminal 100 receives a counterpart mode screen from each of the at least one or more sharable terminals (Case 1), receives a counterpart mode screen of the at least one sharable terminal via the company server 300 (Case 2), or can receive a counterpart mode screen corresponding to a prescribed level from the sharable terminal (Case 3). According to the case 1 or the case 2, the mobile terminal 100 can directly control a display of a counterpart mode screen in accordance with a prescribed level. According to the case 3, the mobile terminal 100 is unable to perform the display control of the counterpart mode screen in accordance with the prescribed level but the sharable terminal can perform the display control of the counterpart mode screen in accordance with the prescribed level.

In this case, the prescribed level can include at least one of a level of a content displayed on the counterpart mode screen, a level of the at least one sharable terminal and a level of the mobile terminal 100. Details of the content level, the level of the sharable terminal and the level of the mobile terminal 100 can refer to the former descriptions.

Subsequently, the mobile terminal 100 controls the display unit 151 to display the received counterpart mode screen to correspond to the prescribed level (described in detail) under the control of the controller 180 (S2140).

In the controlling step S2140, the mobile terminal 100 determines the prescribed level in case of receiving the counterpart mode screen. The mobile terminal 100 is then able to control the counterpart mode screen display in accordance with a result of the prescribed level determination.

This shall be described in detail with reference to FIG. 27A and FIG. 27B as follows.

Figure 27A:
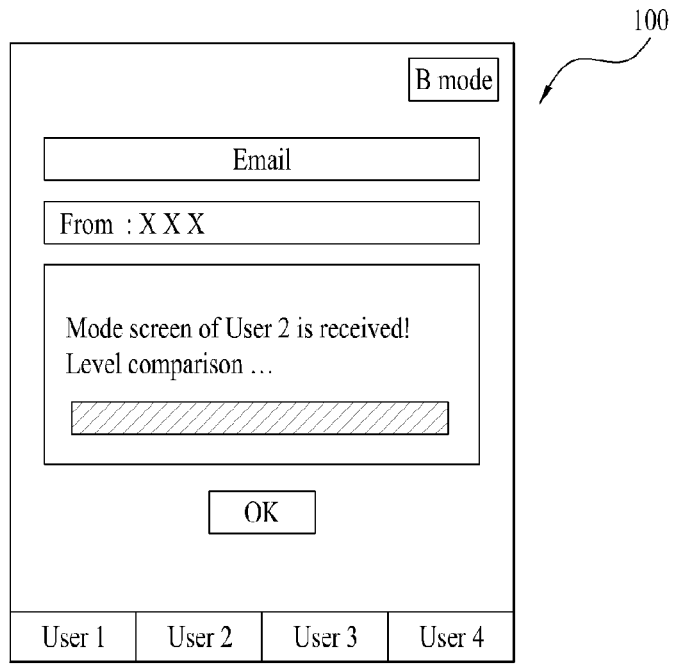
FIG. 27A and FIG. 27B are diagrams of screen configurations for determining a prescribed level when a mobile terminal receives a mode screen of an external terminal according to the present invention.
Figure 27B:
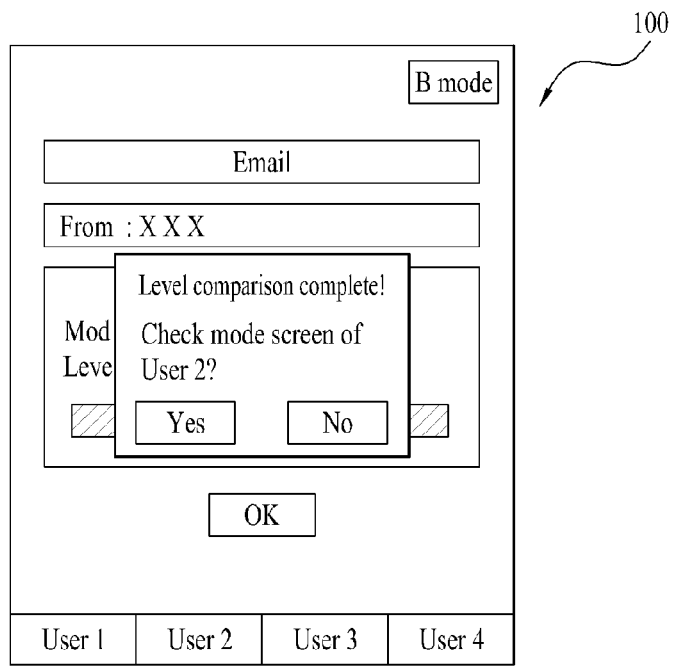

FIG. 27A and FIG. 27B are diagrams of screen configurations for determining a prescribed level when a mobile terminal receives a mode screen of an external terminal according to the present invention.

Referring to FIG. 27A, in case of receiving a counterpart mode screen, the mobile terminal 100 can determine a level of a content included in the received counterpart mode screen, a level of a sharable terminal providing the counterpart mode screen, and a level of the mobile terminal 100.

Referring to FIG. 27B, if the above-described level determination is completed, the mobile terminal 100 enables a user to select whether to check the counterpart mode screen. Alternatively, without such a user selection action, the mobile terminal 100 may or may not display the counterpart mode screen in direct to correspond to the determined level.

Referring now to FIG. 21, the controlling step S2140 is described in detail as follows.

First of all, according to the first case, the mobile terminal 100 compares a level of the mobile terminal 100 to a level of at least one sharable terminal under the control of the controller 180. The mobile terminal 100 controls the display unit 151 to display a whole screen of the sharable terminal having the level equal to or lower than that of the mobile terminal in accordance with a result of the comparison under the control of the controller 180. On the contrary, the mobile terminal 100 controls the display unit 151 not to display a whole or partial screen of the sharable terminal having the level higher than that of the mobile terminal 100 in accordance with a result of the comparison under the control of the controller 180.

For instance, the mobile terminal 100 (e.g., having the level set to Level 3) can display a whole mode screen of the sharable terminal if the level of the sharable terminal is set to Level 1. In another instance, if the level of the sharable terminal is set to Level 4, the mobile terminal 100 may not display a whole or partial part of the mode screen of the sharable terminal. Moreover, a non-displayed portion of the mode screen of the sharable terminal can vary in accordance with the level of the sharable terminal.

According to the second case, the mobile terminal 100 compares a level of the mobile terminal 100 to a level of at least one sharable terminal under the control of the controller 180. If the level of the mobile terminal 100 is higher than that of the at least one sharable terminal, the mobile terminal 100 controls the display unit 151 to display a screen of the at least one sharable terminal under the control of the controller 180. If the level of the mobile terminal 100 is not the highest, the mobile terminal 100 can control the display unit 151 not to display the received counterpart mode screen under the control of the controller 180.

For instance, if the level of the mobile terminal 100 is the highest, the mobile terminal 100 can display the screens of all sharable terminals. If the level of the mobile terminal 100 is not the highest, the mobile terminal 100 displays a mode screen of its own only or can display a screen of the sharable terminal having the level equal to or lower than that of its own.

According to the third case, the mobile terminal 100 compares a level of the content displayed on the received counterpart mode screen to a level of the mobile terminal 100 under the control of the controller 180. If the level of the mobile terminal 100 is lower than that of the content in accordance with a result of the comparison, the mobile terminal 100 controls the display unit 151 not to display a whole or partial part of the counterpart mode screen under the control of the controller 180. On the contrary, if the level of the mobile terminal 100 is equal to or higher than that of the content in accordance with the result of the comparison, the mobile terminal 100 can control the display unit 151 to display the whole part of the counterpart mode screen in accordance with the result of the comparison under the control of the controller 180.

For instance, when the content level is set to Level 4, the mobile terminal 100 (e.g., having the level set to Level 3) does not display the whole counterpart mode screen or may not display a portion of the counterpart mode screen. In this case, the non-displayed portion (or the rest of the displayed counterpart mode screen) can vary in accordance with the content level. If the content level is set to Level 2, the mobile terminal 100 e.g., having the level set to Level 3) can display the whole counterpart mode screen.

Moreover, when the approval region is included in the counterpart mode screen, if the mobile terminal 100 determines that it fails to have an approval authority, the mobile terminal 100 displays the regions of the counterpart mode screen except the approval region under the control of the controller 180. If the mobile terminal 100 determines that it has the approval authority, the mobile terminal 100 can display the whole counterpart mode screen including the approval region under the control of the controller 180. When the counterpart mode screen is constructed with a plurality of objects, the mobile terminal 100 can display the object(s) corresponding to its level under the control of the controller 180. And, the mobile terminal 100 has a control authority corresponding to its level for the counterpart mode screen and is then able to display a user face to execute the control authority, under the control of the controller 180.

Furthermore, the mobile terminal 100 transmits a first mode screen of a currently activated first mode and can control the transmitted first mode screen to be displayed on at least one sharable terminal to correspond to a prescribed level. This can refer to the former description with reference to FIG. 20.

According to the present invention, when mode screens of a plurality of terminals (i.e., the mobile terminal 100 included) are displayed on an external terminal having a mother screen, the mode screens displayed on the mother screen can be controlled in accordance with a prescribed level.

This is described in detail with reference to FIG. 28 as follows. For clarity and convenience of the following description, assume that levels of a plurality of terminals are set to Level 1 to Level 4, respectively.

Figure 28:
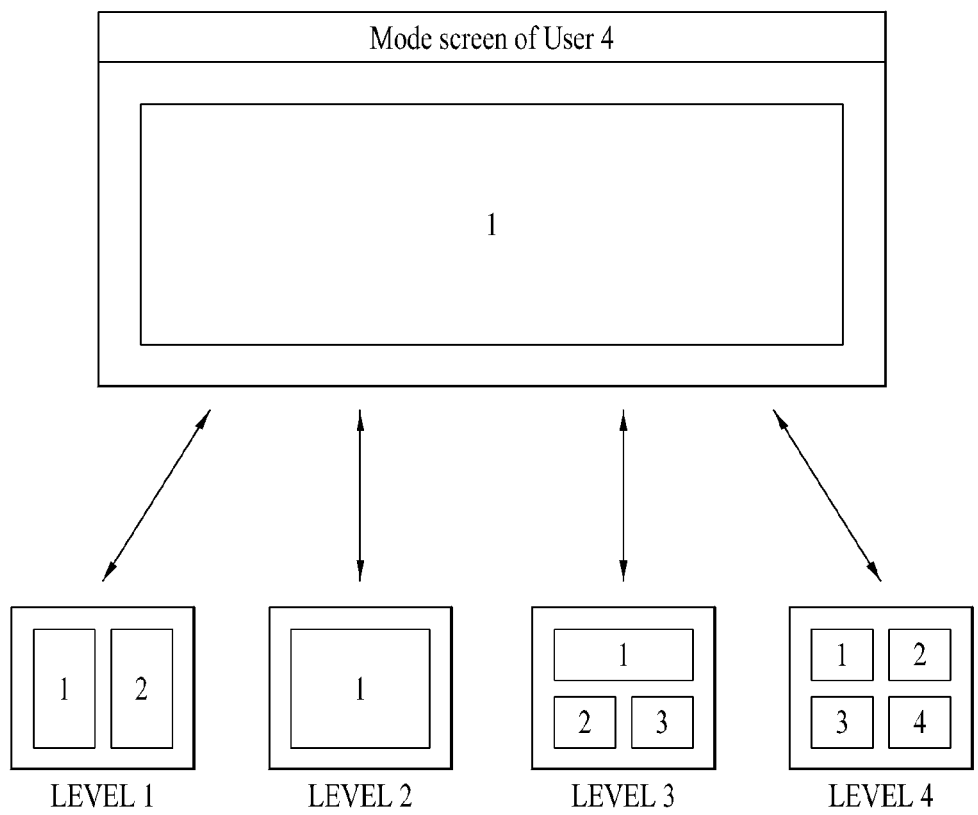
FIG. 28 is a diagram for controlling a mode screen displayed on a mother screen in accordance with a prescribed level when mode screens of a plurality of terminals (mother screen included) are displayed on the mother screen according to the present invention.

FIG. 28 is a diagram for controlling a mode screen displayed on a mother screen in accordance with a prescribed level when mode screens of a plurality of terminals (mother screen included) are displayed on the mother screen according to the present invention.

Referring to FIG. 28, when a mode screen of a random one of a plurality of terminals is displayed on a mother screen, it can display the mode screen on the mother screen to correspond to a lowest level of the plurality of terminals. In particular, a partial region (or a partial substance) of a mode screen, which is allowed for a lowest level, can be displayed only instead of displaying a whole mode screen.

Assuming that a level of an external terminal having a mother screen is set to Level 3, a mode screen displayable on the mother screen can include a mode screen of a terminal having a level lower than or equal to Level 3.

Moreover, while the mobile terminal 100 shares a mode screen of a currently activated first mode with at least one sharable terminal to correspond to a prescribed level, as shown in FIG. 20 and FIG. 21, if a signal related to a second mode (e.g., one example of a deactivated mode) is detected, under the control of the controller 180, the mobile terminal 100 controls a signal indication information not to be displayed on the at least one sharable terminal or can control the signal indication information to be displayed on a specific one of the at least one or more sharable terminals, which meets a prescribed condition, only. For this, the former descriptions relating to the signal detection and the display control of the signal indication information in association with the second mode can be referred to.

According to this disclosure, when a mode screen of each different terminal is displayed per level, a display extent (or a display range) per level can be set by one of a user, a controller 180 and a company server 300.

According to this disclosure, in case of attempting to perform a mode screen sharing at a specific place (e.g., outside a company, etc.), at which the mode screen sharing is not allowed, or a specific time zone (e.g., off-duty hours, etc.), on which the mode screen sharing is not allowed) or attempting to share a mode screen with an external terminal failing in performing a pre-subscription or authentication procedure for a mode screen sharing, the mode screen sharing is not allowed at all (1), a mode screen including a content of a lowest level is allowed to be shared (2), or a mode screen including a content over a prescribed level is not allowed to be shared.

According to this disclosure, when any input action is not received from a user until a predetermined period of time passes after a mode screen sharing, the mode screen sharing is interrupted or a warning announcement or text is outputted before elapse of the predetermined period of time. Therefore, the user can be lead to perform an input action.

According to this disclosure, although it is described that a mode screen can be shared between terminals having activated the same mode (e.g., business mode), the mode screen can be shared with a terminal having activated a different mode (e.g., private mode). For instance, a terminal having activated a different terminal can include a terminal over a predetermined rank or a terminal having a highest rank in company. In this case, the terminal having activated the different mode has a read authority for a mode screen of another terminal or can have a store authority in addition occasionally.

According to this disclosure, the modes mentioned therein can variously include a religion mode, a hobby mode, a school mode and the like per type in addition to a private mode and a business mode. And, a plurality of modes can be set for each type.

According to this disclosure, in determining an application executed per mode, it can designate an application in accordance with a user selection. And, it is also able to automatically designate an application to a corresponding mode in consideration of a property and type of the corresponding application. For instance, assuming that a mode field exists in a data structure of an application, it can designate an application to a corresponding mode defined in the mode field.

According to this disclosure, in each of a plurality of modes, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. And, the user interface provided in each of a plurality of modes can differ in position, shape, size and the like.

Although the mode screen sharing is mentioned in this disclosure, the above-mentioned embodiments is applicable to a sharing of content/data included in a currently displayed screen or a sharing of an application to which content/data included in a currently displayed screen corresponds as well as the mode screen sharing.

According to one embodiment of the present invention, the above-described mode screen display controlling method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

The aforementioned embodiments for the mobile terminal and mode screen display controlling method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

According to one embodiment of the present invention, the above-described mode screen display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, an embodiment of the present invention provides a detailed method of differentiating a shared screen per terminal or approving/disapproving a screen sharing per terminal in accordance with a prescribed reference (particularly, whether a terminal is currently used for a business usage or a private usage).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a communication unit configured to communicate with at least one external terminal;
a memory configured to store at least a first and second operating system including at least first and second modes, respectively; and a controller configured to:
  execute the first operating system and to activate the first mode corresponding to the first operating system,
  display a first information screen on a display corresponding to the activated first mode,
  receive a switching signal indicating the first mode is to be switched to the second mode,
  activate the second mode and deactivate the first mode,
  display a second information screen on the display corresponding to the second mode and that is different than the first information screen,
  selectively transmit information included on the first or second information screen to the at least one external terminal based on a first designated security level related to at least the mobile terminal or information displayed on the first or second information screen, and on a second designated security level related to the at least one external terminal,
  compare the first designated security level to the second designated security level, and
  selectively display information included on the first or second information screen on a display of the at least one external mobile terminal based on a result of the comparison of the first and second designated security levels.

2. The mobile terminal of claim 1, wherein the controller is further configured to receive information indicating the at least one external terminal is authorized to share data with the mobile terminal based on the first and second designated security levels.

3. The mobile terminal of claim 1, wherein the controller is further configured to only display parts of the content included on the first or second information screen on the display of the at least one external mobile terminal that have a designated security level that is greater than or equal to the designated security level of the at least one external terminal.

4. The mobile terminal of claim 1, wherein the at least one external terminal includes a plurality of external terminals, and the controller is further configured to only display the content included on the first or second information screen on external terminals among the plurality of external terminals that have a designated security level that is greater than or equal to the first designated security level related to the at least one of the mobile terminal and content displayed on the first or second information screen.

5. The mobile terminal of claim 1, wherein the controller is further configured to determine what mode the at least one external mobile terminal is operating under, and to control the communication unit to transmit a switching request signal for switching the at least one external terminal to the first mode when the at least one external terminal is operating under the second mode different than the first mode.

6. The mobile terminal of claim 1, wherein the controller is further configured to receive an event signal indicating an event related to the second mode occurring on the mobile terminal, and to selectively display or not display on the display of the at least one external terminal information concerning the event related to the second mode based on a prescribed intimacy the mobile terminal has with the at least one external terminal.

7. The mobile terminal of claim 6, wherein the predetermined intimacy includes at least one of a number of calls or messages transferred between the at least one external terminal and the mobile terminal, the at least one external mobile terminal being included in a friends list set on the mobile terminal, the at least one external terminal being included in a friends list on a social network, and intimate contents included in the received event signal related to the event.

8. The mobile terminal of claim 6, wherein the event signal related to the second mode is generated by at least one of a call transmission/reception, a message transmission/reception, a data transmission/reception via an instant messaging service, a data transmission/reception via a social networking service and a schedule indication.

9. The mobile terminal of claim 1, wherein the controller is further configured to receive information corresponding to an information screen displayed on the at least one external display, and to selectively display contents included on the information screen on the display of the mobile terminal based on a result of the comparison of the first and second designated security levels.

10. A method of controlling a mobile terminal, the method comprising:
  allowing, via a communication unit of the mobile terminal, communication with at least one external terminal;
  storing, in a memory of the mobile terminal, at least a first and second operating system including at least first and second modes, respectively;
  executing, via a controller of the mobile terminal, the first operating system and activating the first mode corresponding to the first operating system;
  displaying, on a display of the mobile terminal, a first information screen corresponding to the activated first mode;
  receiving, via the controller, a switching signal indicating the first mode is to be switched to the second mode;
  activating the second mode and deactivating the first mode via the controller;
  displaying, via the display, a second information screen corresponding to the second mode and that is different than the first information screen;
  selectively transmitting information included on the first or second information screen to the at least one external terminal based on a first designated security level related to at least the mobile terminal or information displayed on the first or second information screen, and on a second designated security level related to the at least one external terminal;
  comparing, via the controller, the first designated security level to the second designated security level; and
  selectively displaying, on a display of the at least one external terminal, information included on the first or second information screen based on a result of the comparison of the first and second designated security levels.

11. The method of claim 10, further comprising:
  receiving, via the controller, information indicating the at least one external terminal is authorized to share data with the mobile terminal based on the first and second designated security levels.

12. The method of claim 10, further comprising:
  displaying, on the display of the external at least one terminal, only parts of the content included on the first or second information screen that have a designated security level that is greater than or equal to the designated security level of the at least one external terminal.

13. The method of claim 10, wherein the at least one external terminal includes a plurality of external terminals, and the method further comprises only displaying the content included on the first or second information screen on external terminals among the plurality of external terminals that have a designated security level that is greater than or equal to the first designated security level related to the at least one of the mobile terminal and content displayed on the first or second information screen.

14. The method of claim 10, further comprising:
determining, via the controller, what mode the at least one external mobile terminal is operating under; and
transmitting, via the communication unit, a switching request signal for switching the at least one external terminal to the first mode when the at least one external terminal is operating under a second mode different than the first mode.

15. The method of claim 10, further comprising:
receiving, via the controller, an event signal indicating an event related to the second mode occurring on the mobile terminal; and
selectively displaying or not displaying on the display of the at least one external terminal information on the display of the mobile terminal concerning the event related to the second mode based on a prescribed intimacy the mobile terminal has with the at least one external terminal.

16. The method of claim 15, wherein the predetermined intimacy includes at least one of a number of calls or messages transferred between the at least one external terminal and the mobile terminal, the at least one external mobile terminal being included in a friends list set on the mobile terminal, the at least one external terminal being included in a friends list on a social network, and intimate contents included in the received event signal related to the event.

17. The method of claim 15, wherein the event signal related to the second mode is generated by at least one of a call transmission/reception, a message transmission/reception, a data transmission/reception via an instant messaging service, a data transmission/reception via a social networking service and a schedule indication.

18. The method of claim 10, further comprising:
receiving, via the controller, information corresponding to an information screen displayed on the at least one external display; and
selectively displaying contents included on the information screen on the display of the mobile terminal based on a result of the comparison of the first and second designated security levels.

* * * * *